United States Patent
Hasegawa

(10) Patent No.: US 9,251,602 B2
(45) Date of Patent: Feb. 2, 2016

(54) PIXEL INTERPOLATION APPARATUS, IMAGING APPARATUS, PIXEL INTERPOLATION PROCESSING METHOD, INTEGRATED CIRCUIT, AND NON-TRANSITORY COMPUTER READABLE STORAGE MEDIUM

(71) Applicant: MEGACHIPS CORPORATION, Osaka-shi (JP)

(72) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/429,909

(22) PCT Filed: Jul. 5, 2013

(86) PCT No.: PCT/JP2013/068561
§ 371 (c)(1),
(2) Date: Mar. 20, 2015

(87) PCT Pub. No.: WO2014/050251
PCT Pub. Date: Apr. 3, 2014

(65) Prior Publication Data
US 2015/0235382 A1 Aug. 20, 2015

(30) Foreign Application Priority Data
Sep. 28, 2012 (JP) .................................. 2012-216697

(51) Int. Cl.
*G06T 7/40* (2006.01)
*G09G 5/00* (2006.01)
*G06K 9/62* (2006.01)
*G06K 9/46* (2006.01)

(52) U.S. Cl.
CPC .............. *G06T 7/408* (2013.01); *G06K 9/4652* (2013.01); *G06K 9/6215* (2013.01); *G09G 5/003* (2013.01)

(58) Field of Classification Search
CPC ............ H04N 2209/046; H04N 5/217; H04N 2209/045; G06T 3/4015
See application file for complete search history.

(56) References Cited

U.S. PATENT DOCUMENTS

| 7,551,214 B2 | 6/2009 | Hasegawa |
| 2006/0114526 A1 | 6/2006 | Hasegawa |

(Continued)

FOREIGN PATENT DOCUMENTS

| JP | 2003-196649 | 7/2003 |
| JP | 2006-024999 A | 1/2006 |
| JP | 2006-186965 A | 7/2006 |
| JP | 2008-219598 | 9/2008 |
| JP | 2009-55281 | 3/2009 |
| JP | 2009-130764 A | 6/2009 |

OTHER PUBLICATIONS

Pei et al., Effective Color Interpolation in CCD Color Filter Arrays Using Signal Correlation, IEEE Transactions on Circuits and Systems for Video Technology, vol. 13, No. 6, Jun. 2003, pp. 503-513.*

(Continued)

*Primary Examiner* — Haixia Du
(74) *Attorney, Agent, or Firm* — Oblon, McClelland, Maier & Neustadt, L.L.P.

(57) ABSTRACT

An imaging apparatus includes an imaging unit, a signal processing unit, and a pixel interpolation processing unit. The apparatus calculates a correlation degree for pairs in two orthogonal directions for an image signal obtained by the imaging unit including a single-chip image sensor having a four-color filter, such as a WRGB color filter, using pixel data in an area around a target pixel, using the correlation degree as a determination criterion in the interpolation. When a color component pixel with an identical color of a color component pixel subjected to pixel interpolation is not located in the direction having the high correlation, the pixel interpolation apparatus changes ratio in a direction orthogonal to the direction having the high correlation by using a pixel value resulting from color space conversion in the direction orthogonal to the direction having the high correlation, and performs pixel interpolation based on the change ratio.

14 Claims, 49 Drawing Sheets

(56) References Cited

U.S. PATENT DOCUMENTS

| | | |
|---|---|---|
| 2008/0218597 A1 | 9/2008 | Cho |
| 2009/0060389 A1 | 3/2009 | Hasegawa et al. |
| 2009/0136153 A1 | 5/2009 | Hasegawa |
| 2012/0293696 A1* | 11/2012 | Tanaka ................. H04N 9/045 348/280 |

OTHER PUBLICATIONS

U.S. Appl. No. 14/556,535, filed Dec. 1, 2014, Moriguchi, et al.

U.S. Appl. No. 14/427,835, filed Mar. 12, 2015, Hiromu Hasegawa.

International Search Report issued Oct. 15, 2013 in PCT/JP2013/068561 filed Jul. 5, 2013.

* cited by examiner

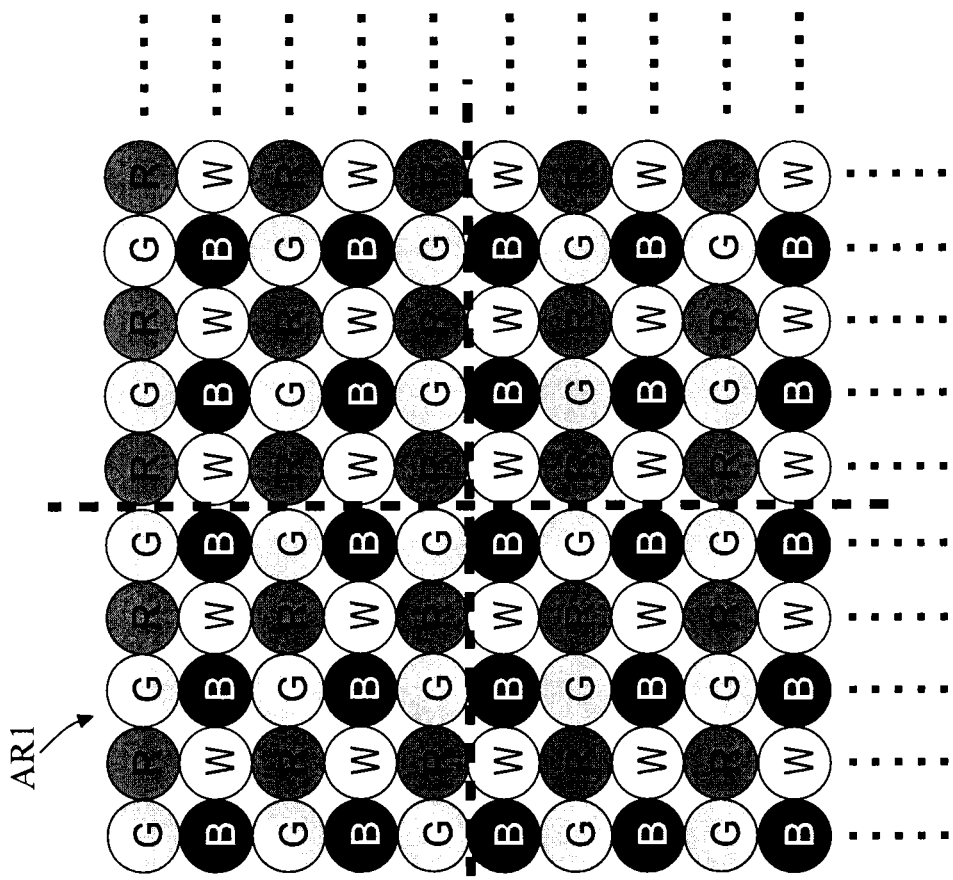

Cd1_gray

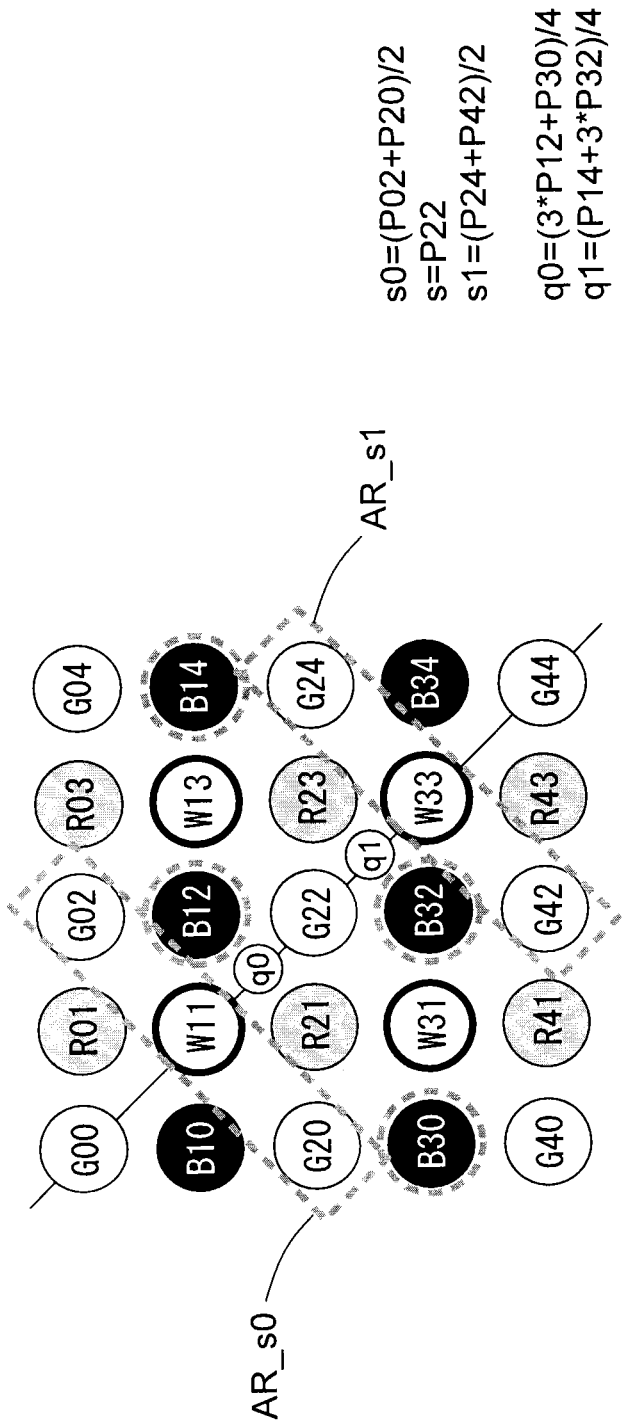

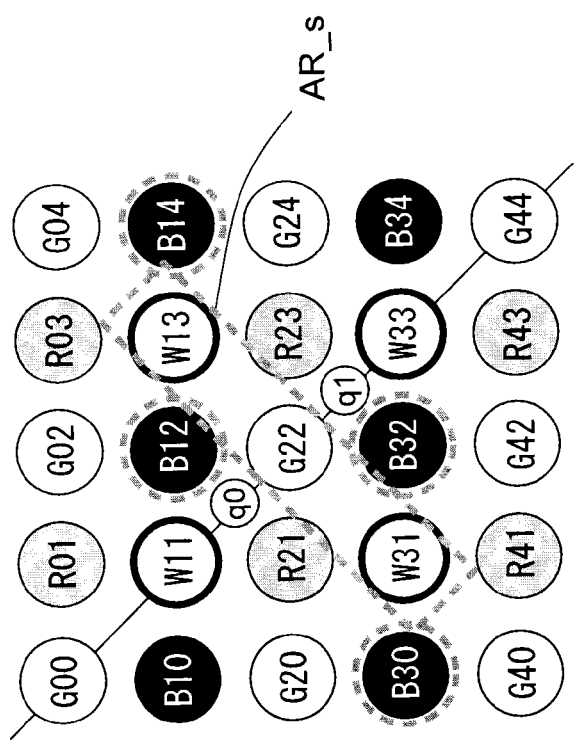

FIG.43B

Central pixel: G   Correlation direction: second diagonal direction s0 = Bgain*B12 + Rgain*R21
s = Wgain*(W13+W31)/2 − Ggain*G22
s1 = Rgain*R23 + Bgain*B32 q0 = (3*P12+P30)/4
q1 = (P14+3*P32)/4

Bout = (q0+q1)/2 − (s0−2*s+s1)*gain s0: W−G component value (R+B component value) of midpoint between P11 and P22
s: W−G component value of P22
s1: W−G component value (R+B component value) of midpoint between P22 and P33
q0: B component value of midpoint between P11 and P22
q1: B component value of midpoint between P22 and P33

PIXEL INTERPOLATION APPARATUS, IMAGING APPARATUS, PIXEL INTERPOLATION PROCESSING METHOD, INTEGRATED CIRCUIT, AND NON-TRANSITORY COMPUTER READABLE STORAGE MEDIUM

TECHNICAL FIELD

The present invention relates to signal processing performed by an imaging apparatus such as a digital camera, and more particularly, to a pixel interpolation technique.

BACKGROUND ART

Image sensors, such as charge-coupled device (CCD) image sensors or complementary metal oxide semiconductor (CMOS) image sensors, incorporated in imaging apparatuses including digital cameras convert light received through color filters to electrical signals by photoelectric conversion, and output the electrical signals as pixel signals. Such color filters include RGB color filters or YMCK color filters. A single-chip image sensor outputs a pixel signal of one color for one pixel. When using the RGB color filters, the image sensor outputs a pixel signal representing one of red (R), green (G), and blue (B) color components for one pixel.

Each pixel signal output from the single-chip color image sensor needs interpolation to generate pixel signals representing the other color components. Such interpolation may be performed using various algorithms. For example, one interpolation method calculates the degree of correlation in the horizontal direction and the degree of correlation in the vertical direction, and uses a pixel located in the direction with a higher correlation to perform pixel interpolation. Another interpolation method may perform weighting in accordance with the distance between a target pixel and its neighboring pixel before such pixel interpolation.

A technique described in Patent Literature 1 differentiates a gray area and a color area in an image obtained by an image sensor with a Bayer array (RGB color filters), and performs pixel interpolation in accordance with the characteristics of the image areas. In particular, the technique in Patent Literature 1 reduces false colors in an area of boundary between a gray area and a color area. For the area of boundary between the gray area and the color area, the technique in Patent Literature 1 determines the direction of correlation with a method intended for a grayscale image area, and performs pixel interpolation with an interpolation method intended for a color image area, thus reducing false colors caused by pixel interpolation.

CITATION LIST

Patent Literature

Patent Literature 1: Japanese Unexamined Patent Publication No. 2006-186965

DISCLOSURE OF INVENTION

Technical Problem

An imaging apparatus may include four color filters, such as a WRGB array of color filters. An imaging apparatus including a single-chip image sensor with the WRGB array of color filters outputs a pixel signal representing one of white (W), red (R), green (G), and blue (B) components for one pixel.

The technique described in Patent Literature 1 should be used for an image sensor with a Bayer array (RGB color filters), and is not directly applicable to a single-chip image sensor with a different pattern of color filters, such as a WRGB array.

In response to this problem, it is an object of the present invention to provide a pixel interpolation apparatus, an imaging apparatus, a program, and an integrated circuit that allow appropriate pixel interpolation processing on an image signal obtained by a single-chip image sensor having four color filters such as a WRGB array.

Solution to Problem

To solve the above problem, a first aspect of the invention provides a pixel interpolation apparatus that performs pixel interpolation processing on an image obtained by an imaging unit. The imaging unit has color filters of four different colors arranged in a predetermined pattern. The pixel interpolation apparatus includes a color saturation evaluation value obtaining unit, a correlation degree obtaining unit, a pixel interpolation method determination unit, and an interpolation unit.

The color saturation evaluation value obtaining unit evaluates color saturation of a predetermined image area of the image, and obtains a color saturation evaluation value for the image area.

The correlation degree obtaining unit obtains degrees of correlation for a plurality of pairs in two directions orthogonal to each other in the image using pixel data for an area around a target pixel.

The pixel interpolation method determination unit determines a pixel interpolation method for the target pixel based on the color saturation evaluation value obtained by the color saturation evaluation value obtaining unit and the degree of correlation obtained by the correlation degree obtaining unit.

The interpolation unit performs pixel interpolation processing on the image with the pixel interpolation method determined by the pixel interpolation method determination unit, and obtains image data in a predetermined color space.

In a case where a direction having a high correlation has been detected based on a degree of correlation, the interpolation unit (1) obtains, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtains a first-color component pixel value of the target pixel based on a first-color component pixel located in the direction having the high correlation and the obtained first change ratio and performs pixel interpolation processing on the target pixel, and (2) obtains, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and performs pixel interpolation processing on the target pixel based on the obtained second change ratio.

When a color component pixel with the same color as the first-color component pixel subjected to pixel interpolation and a second-color component pixel are located in a direction having a high correlation, the pixel interpolation apparatus obtains a first change ratio in the direction having the high correlation by using a pixel value of the second-color component pixel, and obtains a first-color component pixel value of a target pixel based on a first-color component pixel located in the direction having the high correlation and the obtained first change ratio, thereby performing pixel interpolation processing on the target pixel. In other words, this pixel interpolation apparatus performs pixel interpolation processing in a manner to reflect the ratio of change in the correlation direction (direction having a high correlation) that is calculated using a color component pixel different from the color component pixel subjected to pixel interpolation. Thus, this pixel interpolation apparatus performs pixel interpolation processing with higher accuracy than when the pixel interpolation processing is performed by using the average of color component pixel values with the same color in the correlation direction (direction having a high correlation).

When a color component pixel with the same color as the color component pixel subjected to pixel interpolation is not located in the direction having the high correlation, this pixel interpolation apparatus obtains a second change ratio in a direction orthogonal to the direction having the high correlation by using a pixel value resulting from color space conversion in the direction orthogonal to the direction having the high correlation, and performs pixel interpolation processing on the target pixel based on the second change ratio. In other words, this pixel interpolation apparatus obtains the second change ratio in the direction orthogonal to the direction having the high correlation by performing color space conversion, and performs pixel interpolation processing using the obtained second change ratio. This enables the pixel interpolation apparatus to perform pixel interpolation processing with higher accuracy even when the color component pixel with the same color as the color component pixel subjected to pixel interpolation is not located in the direction having the high correlation.

As described above, the pixel interpolation apparatus can perform appropriate pixel interpolation processing on an image signal obtained by a single-chip image sensor having four color filters such as a WRGB color filter array.

A second aspect of the invention provides the pixel interpolation apparatus of the first aspect of the invention in which the correlation degree obtaining unit obtains a degree of correlation in a horizontal direction, a degree of correlation in a vertical direction, a degree of correlation in a first diagonal direction, and a degree of correlation in a second diagonal direction orthogonal to the first diagonal direction in the image.

This pixel interpolation apparatus performs the pixel interpolation processing using the degree of correlation in the horizontal direction, the degree of correlation in the vertical direction, the degree of correlation in the first diagonal direction, and the degree of correlation in the second diagonal direction orthogonal to the first diagonal direction in the image.

The first diagonal direction preferably forms an angle of 45 degrees with the horizontal direction or the vertical direction.

A third aspect of the invention provides the pixel interpolation apparatus of one of the first to second aspects of the invention in which the color saturation evaluation value obtaining unit evaluates color saturation of an image area of 5×5 pixels including a central target pixel, and obtains a color saturation evaluation value for the image area. The correlation degree obtaining unit obtains the degree of correlation in the image area of 5×5 pixels including the central target pixel.

This pixel interpolation apparatus can evaluate the color saturation and obtain the degree of correlation by using an image area of 5×5 pixels. The use of the image area of 5×5 pixels allows processing to be performed in four patterns in total in which the target pixel is one of the four color components W, R, G, and B.

A fourth aspect of the invention provides the pixel interpolation apparatus of one of the first to third aspects of the invention in which when a color component pixel with a color identical to a color of a color component pixel subjected to pixel interpolation is not located in the direction having the high correlation, the interpolation unit obtains a color component pixel value having an identical hue by performing color space conversion in a direction orthogonal to the direction having the high correlation, obtains a change ratio of the obtained color component pixel value in the direction orthogonal to the direction having the high correlation as the second change ratio, and performs pixel interpolation processing on the target pixel based on the obtained second change ratio.

This pixel interpolation apparatus obtains the change ratio (second change ratio) in the direction orthogonal to the correlation direction (direction with a high correlation) by using the color component pixel value with the same hue resulting from color space conversion. This pixel interpolation apparatus performs pixel interpolation processing on the target pixel based on the obtained change ratio (second change ratio), thus allowing the pixel interpolation apparatus to perform pixel interpolation processing with higher accuracy.

Color component pixel values having an identical hue (with the same hue) refer to pixel values the corresponding points of which are on a straight line, in a three-dimensional color space, extended from a basis vector defined in the three-dimensional color space. Examples of the color component pixel value having an identical hue (or with the same hue) include a W−R component pixel value, a W−G component pixel value, and a W−B component pixel value in a color space of an additive color model, or a W−Ye component value, a W−M component value, and a W−Cy component value in a color space of a subtractive color model. In the model, Ye is a yellow component value, M is a magenta component value, and Cy is a cyan component value.

The W−Ye component pixel value, the W−M component pixel value, and the W−Cy component pixel value are calculated by using the formulae below.

$W = Y = R\text{gain} \times R + G\text{gain} \times G + B\text{gain} \times B$ $R\text{gain} = 0.299$ $G\text{gain} = 0.587$ $B\text{gain} = 0.114$ $Ye\text{gain} \times Ye = R\text{gain} \times R + G\text{gain} \times G$ $M\text{gain} \times M = R\text{gain} \times R + B\text{gain} \times B$ $Cy\text{gain} \times Cy = G\text{gain} \times G + B\text{gain} \times B$ In these formulae, Y(W) is a luminance component signal, R is an R-component signal, G is a G-component signal, and B is a B-component signal. For example, the W−Ye component is equivalent to the B-component in the above formula. In other words, the W−Ye component pixel value is calculated as W−Yegain×Ye, and the B-component pixel value is calculated as Bgain×B. The same calculation applies to the W−M component pixel value and the W−Cy component pixel value.

A fifth aspect of the invention provides the pixel interpolation apparatus of the fourth aspect of the invention in which the interpolation unit calculates the second change ratio of the color component pixel value having the identical hue obtained by performing color space conversion based on a Laplacian component value of the color component pixel value.

This pixel interpolation apparatus calculates the change ratio (third change ratio) in the direction orthogonal to the direction having the high correlation of the color component pixel value based on the Laplacian component value of the color component pixel value having the identical hue resulting from color space conversion.

A sixth aspect of the invention provides the pixel interpolation apparatus of one of the first to third aspects of the invention in which the color filters are in a WRGB array. When a color component pixel with a color identical to a color of a color component pixel subjected to pixel interpolation is not located in the direction having the high correlation, the interpolation unit performs color space conversion in a direction orthogonal to the direction having the high correlation to obtain a color component pixel value of one of a W−R component pixel value, a W−G component pixel value, and a W−B component pixel value, and obtains a change ratio of the obtained color component pixel value in the direction orthogonal to the direction having the high correlation as the second change ratio, and performs pixel interpolation processing on the target pixel based on the obtained second change ratio.

This pixel interpolation apparatus obtains the change ratio (second change ratio) in the direction orthogonal to the correlation direction (direction having a high correlation) by using the color component pixel value of one of the W−R component pixel value, the W−G component pixel value, and the W−B component pixel value resulting from color space conversion. The pixel interpolation apparatus then performs pixel interpolation processing on the target pixel based on the obtained change ratio (second change ratio), and thus performs pixel interpolation processing with higher accuracy.

The W−R component pixel value, the W−G component pixel value, and the W−B component pixel value are calculated by using the formulae below.

$W = Y = R\text{gain} \times R + G\text{gain} \times G + B\text{gain} \times B$ $R\text{gain} = 0.299$ $G\text{gain} = 0.587$ $B\text{gain} = 0.114$ In these formulae, Y(W) is a luminance component signal, R is an R-component signal, G is a G-component signal, and B is a B-component signal. For example, the W−R component is equivalent to the G+B-component in the above formula. In other words, the W−R component pixel value is calculated as W−Rgain×R, and the G+B-component pixel value is calculated as Ggain×G+Bgain×B. The same calculation applies to the W−G component pixel value and the W−B component pixel value.

A seventh aspect of the invention provides the pixel interpolation apparatus of the sixth aspect of the invention in which the interpolation unit uses a Laplacian component value of a color component pixel value (one of the W−R component pixel value, the W−G component pixel value, and the W−B component pixel value) to calculate the change ratio (third change ratio), which is used to calculate the second change ratio of the color component pixel value of one of the W−R component pixel value, the W−G component pixel value, and the W−B component pixel value based on the Laplacian component value of the color component pixel value.

This pixel interpolation apparatus calculates the change ratio (third change ratio) in the direction orthogonal to the direction with the high correlation of the color component pixel value by using the Laplacian component value of the color component pixel value (one of the W−R component pixel value, the W−G component pixel value, and the W−B component pixel value)

The W−R component pixel value may be a G+B component pixel value. The W−G component pixel value may be an R+B component pixel value. The W−B component pixel value may be an R+G component pixel value.

An eighth aspect of the invention provides the pixel interpolation apparatus of the fifth or seventh aspect of the invention in which when a color component pixel with a color identical to a color of a first color component pixel subjected to pixel interpolation is not located in the direction having the high correlation, the interpolation unit obtains a first color component value Pout of the target pixel by using the formula below:

$P\text{out} = (P1 + P2)/2 - \text{Lap} \times \text{gain}$, where, in the direction orthogonal to the correlation direction, pos1 is a position of the target pixel, pos0 and pos2 are positions across the target pixel, P1 is a first-color component pixel value at the position pos0, P2 is a first-color component pixel value at the position pos2, Lap is a Laplacian component value calculated from a pixel value of a color component pixel other than a first-color component pixel calculated from the positions pos0, pos1, and pos2, and gain is a gain for adjusting the Laplacian component value.

This pixel interpolation apparatus subtracts the value resulting from gain adjustment of the Laplacian component value from the average of the pixel values of the pixels at the positions across the target pixel (pos0 and pos2) to obtain the pixel value of the target pixel (the first component pixel value subjected to pixel interpolation). This pixel interpolation apparatus may adjust the gain for the Laplacian component value in accordance with, for example, the optical characteristics of the imaging unit (e.g., the optical characteristics of the image sensor or optical filters) to perform pixel interpolation processing with higher accuracy.

A first color component pixel may not be located at the position pos0. When a first color component pixel is not located at the position pos0, a first color component pixel (first color component pixel value) at the position pos0 may be obtained through, for example, internal division processing using pixels (first color component pixels) located in the correlation direction.

A first color component pixel may not be located at the position pos2. When a first color component pixel is not located at the position pos2, a first color component pixel (first color component pixel value) at the position pos2 may be obtained through, for example, internal division processing using pixels (first color component pixels) located in the correlation direction.

A ninth aspect of the invention provides the pixel interpolation apparatus of one of the first to eighth aspects of the invention in which the interpolation unit interpolates a pixel value with the first color component of the target pixel by subtracting a Laplacian component value calculated from pixel values of a plurality of pixels with the second color component arranged in a correlation direction having a high degree of correlation determined by the pixel interpolation method determination unit from an average of pixel values of two pixels with the first color component that are adjacent across the target pixel in the correlation direction.

This pixel interpolation apparatus performs pixel interpolation processing that responds to changes in the correlation direction in units of pixels. The pixel interpolation apparatus can thus perform pixel interpolation processing with a higher accuracy.

The first color component is one of the W, R, G, and B components. The second color component is a color component other than the first color component. The second color component may not be one of the W, R, G, and B components or may be another color component (e.g., a W−R-component, a B+G-component, a W−G-component, or a W−B-component).

A tenth aspect of the invention provides the pixel interpolation apparatus of the ninth aspect of the invention in which the interpolation unit interpolates the pixel value with the first color component of the target pixel by subjecting the Laplacian component value to gain adjustment, and subtracting the Laplacian component value that has undergone the gain adjustment from the average of the pixel values of the two pixels with the first color component that are adjacent across the target pixel.

This pixel interpolation apparatus performs pixel interpolation processing by adjusting the Laplacian component value, and can thus adjust the Laplacian component value in accordance with the optical characteristics of the imaging unit (e.g., the optical characteristics of the image sensor or the optical filters) to perform pixel interpolation processing with a higher quality.

A eleventh aspect of the invention includes an imaging unit and the pixel interpolation apparatus of one of the first to eighth aspects of the invention.

The imaging unit has color filters of four different colors arranged in a predetermined pattern. The imaging unit obtains an image signal from subject light.

This achieves an imaging apparatus including the pixel interpolation apparatus of one of the first to eighth aspects of the invention.

An twelfth aspect of the invention provides a program enabling a computer to implement a pixel interpolation processing method for performing pixel interpolation on an image obtained by an imaging unit. The imaging unit has color filters of four different colors arranged in a predetermined pattern. The pixel interpolation processing method includes a color saturation evaluation value obtaining process, a correlation degree obtaining process, a pixel interpolation method determination process, and an interpolation process.

The color saturation evaluation value obtaining process evaluates color saturation of a predetermined image area of the image, and obtains a color saturation evaluation value for the image area.

The correlation degree obtaining process obtains degrees of correlation for a plurality of pairs in two directions orthogonal to each other in the image using pixel data for an area around a target pixel.

The pixel interpolation method determination process determines a pixel interpolation method for the target pixel based on the color saturation evaluation value obtained by the color saturation evaluation value obtaining process and the degree of correlation obtained by the correlation degree obtaining process.

The interpolation process performs pixel interpolation processing on the image with the pixel interpolation method determined by the pixel interpolation method determination process, and obtains image data in a predetermined color space.

In a case where a direction having a high correlation has been detected based on the degree of correlation, the step of performing pixel interpolation processing includes (1) obtaining, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtaining a pixel value of a first-color component pixel of the target pixel based on a first-color component pixel located in the direction having the high correlation and the obtained first change ratio and performing pixel interpolation processing on the target pixel, and (2) obtaining, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and performing pixel interpolation processing on the target pixel based on the obtained second change ratio.

The program has the same advantageous effects as the pixel interpolation apparatus of the first aspect of the present invention.

A thirteenth aspect of the invention provides an integrated circuit that performs pixel interpolation processing on an image obtained by an imaging unit. The imaging unit has color filters of four different colors arranged in a predetermined pattern and includes at least white component pixels. The integrated circuit includes a color saturation evaluation value obtaining unit, a correlation degree obtaining unit, a pixel interpolation method determination unit, an interpolation unit, and a color space conversion unit.

The color saturation evaluation value obtaining unit evaluates color saturation of a predetermined image area of the image, and obtains a color saturation evaluation value for the image area.

The correlation degree obtaining unit obtains degrees of correlation for a plurality of pairs in two directions orthogonal to each other in the image using pixel data for an area around a target pixel.

The pixel interpolation method determination unit determines a pixel interpolation method for the target pixel based on the color saturation evaluation value obtained by the color saturation evaluation value obtaining unit and the degree of correlation obtained by the correlation degree obtaining unit.

The interpolation unit performs pixel interpolation processing on the image with the pixel interpolation method determined by the pixel interpolation method determination unit, and obtains image data in a predetermined color space.

In a case where a direction having a high correlation has been detected based on the degree of correlation, the interpolation unit (1) obtains, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtains a pixel value of a first-color component pixel of the target pixel based on a first-color component pixel located in the direction having the high correlation and the obtained first change ratio and performs pixel interpolation processing on the target pixel, and (2) obtains, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and performs pixel interpolation processing on the target pixel based on the obtained second change ratio.

The integrated circuit has the same advantageous effects as the pixel interpolation apparatus of the first aspect of the present invention.

Advantageous Effects

The pixel interpolation apparatus, the imaging apparatus, the program, and the integrated circuit of the present invention allow appropriate pixel interpolation processing on an image signal obtained by a single-chip image sensor having color filters such as a WRGB color filter array.

BRIEF DESCRIPTION OF THE DRAWINGS

FIG. 2 is a diagram describing pixels in a WRGB array.

FIG. 43A is a diagram describing pixel interpolation in the second diagonal direction (for a color image area) for an image area including a G-pixel in the center.

FIG. 43B is a diagram describing pixel interpolation in the second diagonal direction (for a color image area) for an image area including a G-pixel in the center.

DESCRIPTION OF THE PREFERRED EMBODIMENTS

First Embodiment

A first embodiment will now be described with reference to the drawings.

1.1 Structure of Imaging Apparatus

Figure 1A:
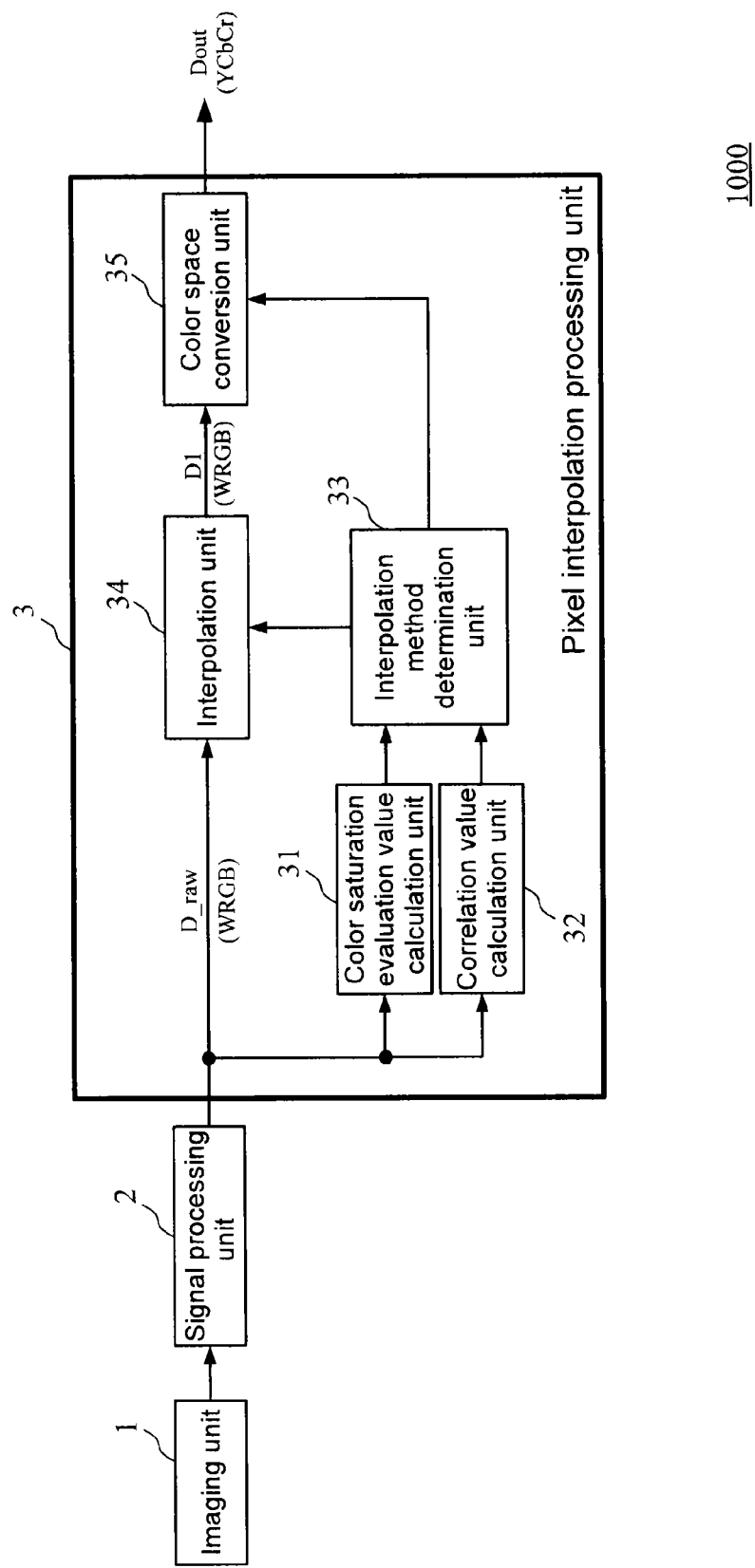
FIG. 1A is a schematic diagram of an imaging apparatus 1000 according to a first embodiment.

FIG. 1A is a schematic diagram of an imaging apparatus 1000 according to a first embodiment.

As shown in FIG. 1A, the imaging apparatus 1000 includes an imaging unit 1, a signal processing unit 2, and a pixel interpolation processing unit 3. The imaging unit 1 converts light from a subject through photoelectric conversion to obtain image signals. The signal processing unit 2 performs predetermined signal processing on the image signals obtained by the imaging unit 1. The pixel interpolation processing unit 3 performs pixel interpolation processing on the image signals that have undergone the predetermined signal processing performed by the signal processing unit 2.

The imaging unit 1 includes an optical system, a WRGB color filter array, and an image sensor.

The optical system, including one or more lenses, collects light from a subject, and focuses the subject light onto the surface of the image sensor. The optical system may be capable of exposure adjustment and focus adjustment.

The WRGB array of color filters includes four color filters, or the color filters for a W-component, an R-component, a G-component, and a B-component. The WRGB array has a predetermined pattern. The color filters in the WRGB array are arranged on the imaging surface of the image sensor. The W-component color filter may be a colorless transparent filter, or may be no filter. A pixel located under the W-component filter only needs a pixel signal for the W-component, which is a luminance signal. Thus, no filter may be arranged above such a pixel that needs a pixel signal for the W-component.

The image sensor has a plurality of pixels. The image sensor converts subject light, which has been collected by the optical system and focused onto the imaging surface through the WRGB array of color filters, by photoelectric conversion to generate image signals (electrical signals). The image sensor generates a W-component pixel signal through a pixel for obtaining a W-component, and generates an R-component pixel signal through a pixel for obtaining an R-component. The image sensor also generates a G-component pixel signal through a pixel for obtaining a G-component, and generates a B-component pixel signal through a pixel for obtaining a B-component. The image sensor outputs the pixel signals generated through those pixels (the W-component pixel signal, R-component pixel signal, G-component pixel signal, and B-component pixel signal) to the signal processing unit 2 as image signals.

The signal processing unit 2 receives the image signals output from the imaging unit 1, and subjects the input image signals to predetermined signal processing (e.g., gain adjustment, white balance adjustment, and gamma correction). The signal processing unit 2 outputs the image signals that have undergone the predetermined signal processing to the pixel interpolation processing unit 3 as image signals D_raw.

As shown in FIG. 1A, the pixel interpolation processing unit 3 includes a color saturation evaluation value calculation unit 31, a correlation value calculation unit 32, a pixel interpolation method determination unit 33, an interpolation unit 34, and a color space conversion unit 35.

The color saturation evaluation value calculation unit 31 receives an image signal D_raw output from the signal processing unit 2 (a single image, or a one-frame image formed using the image signal D_raw, hereafter expressed as an image D_raw). The color saturation evaluation value calculation unit 31 calculates a color saturation evaluation value L for a target pixel (processing target pixel) in the image D_raw, and further normalizes the color saturation evaluation value L using a predetermined function to obtain a color saturation evaluation coefficient KL ($0 \le KL \le 1$) (described in detail later). The color saturation evaluation value calculation unit 31 then outputs the color saturation evaluation coefficient KL obtained for each pixel included in the image D_raw to the pixel interpolation method determination unit 33.

The correlation value calculation unit 32 receives an image signal D_raw output from the signal processing unit 2. For the target pixel in the image D_raw (processing target pixel), the correlation value calculation unit 32 calculates the eight correlation values below (described in detail later):

(A1) a vertical direction correlation value Cv_color for a color image area (A2) a horizontal direction correlation value Ch_color for a color image area (A3) a first diagonal direction correlation value Cd1_color for a color image area (A4) a second diagonal direction correlation value Cd2_color for a color image area (B1) a vertical direction correlation value Cv_gray for a grayscale image area (B2) a horizontal direction correlation value Ch_gray for a grayscale image area (B3) a first diagonal direction correlation value Cd1_gray for a grayscale image area (B4) a second diagonal direction correlation value Cd2_gray for a grayscale image area The correlation value calculation unit 32 outputs the eight correlation values calculated for each pixel in the image D_raw to the pixel interpolation method determination unit 33.

The pixel interpolation method determination unit 33 receives the color saturation evaluation coefficient KL for each pixel output from the color saturation evaluation value calculation unit 31 and the correlation values for each pixel output from the correlation value calculation unit 32. The pixel interpolation method determination unit 33 determines the correlation direction and the pixel interpolation method for each pixel based on the color saturation evaluation coefficient KL and the correlation values (described in detail later). The pixel interpolation method determination unit 33 outputs information about the correlation direction and the pixel interpolation method determined for each pixel to the interpolation unit 34. The pixel interpolation method determination unit 33 outputs information about the correlation direction determined for each pixel to the color space conversion unit 35.

The interpolation unit 34 receives the image signals D_raw output from the signal processing unit 2 and information about the correlation direction and the pixel interpolation method determined for each pixel output from the pixel interpolation method determination unit 33. The interpolation unit 34 performs pixel interpolation processing for each pixel in the image D_raw to allow each of all the pixels to have the W-component, the R-component, the G-component, and the B-component using the correlation direction and the pixel interpolation method determined by the pixel interpolation method determination unit 33 (described in detail later). The interpolation unit 34 outputs image signals resulting from the pixel interpolation processing (image signals in which each of all the pixels included an image formed by the image signals has the W-component, the R-component, the G-component, and the B-component) to the color space conversion unit 35 as image signals D1.

The color space conversion unit 35 receives the image signals D1 output from the interpolation unit 34 and information about the correlation direction output from the pixel interpolation method determination unit 33. The color space conversion unit 35 converts the image signals D1, which are signals in the WRGB color space, to signals in the YCbCr color space. The color space conversion unit 35 outputs the image signals resulting from the color space conversion as image signals Dout.

As shown in FIG. 1, the color space conversion unit 35 includes a luminance signal obtaining unit 351, a selection signal generation unit 352, a luminance signal output unit 353, subtracters 354 and 356, and gain adjustment units 355 and 357.

The luminance signal obtaining unit 351 receives an R-component signal, a G-component signal, and a B-component signal output from the interpolation unit 34. The luminance signal obtaining unit 351 obtains a luminance signal Y0 by using the input R-component signal, G-component signal, and B-component signal, and outputs the luminance signal Y0 to the luminance signal output unit 353.

The selection signal generation unit 352 receives information about the correlation direction for each pixel output from the pixel interpolation method determination unit 33, and generates a selection signal based on the correlation direction. The selection signal generation unit 352 outputs the generated selection signal to the luminance signal output unit 353.

The luminance signal output unit 353 receives the luminance signal Y0 output from the luminance signal obtaining unit 351 and the W-color component signal W output from the interpolation unit 34, and the selection signal output from the selection signal generation unit 352. The luminance signal output unit 353 generates a luminance signal Yout using the luminance signal Y0 and the W-color component signal W in accordance with the selection signal, and outputs the luminance signal Yout.

The subtracter 354 receives the luminance signal Yout output from the luminance signal output unit 353 and the B-component signal output from the interpolation unit 34, and performs subtraction to obtain a B−Y signal (=B-component signal−luminance signal Yout), and outputs the obtained B−Y signal to the gain adjustment unit 355.

The gain adjustment unit 355 subjects the B−Y signal output from the subtracter 354 to predetermined gain adjustment to obtain a Cb signal, and outputs the obtained Cb signal.

The subtracter 356 receives the luminance signal Yout output from the luminance signal output unit 353 and the R-component signal output from the interpolation unit 34, and performs subtraction to obtain an R−Y signal (=R-component signal−luminance signal Yout), and outputs the obtained R−Y signal to the gain adjustment unit 357.

The gain adjustment unit 357 subjects the R−Y signal output from the subtracter 356 to predetermine gain adjustment to obtain a Cr signal, and outputs the obtained Cr signal.

1.2 Operation of Imaging Apparatus

The imaging apparatus 1000 with the above structure will now be described.

FIG. 2 shows an example of an array pattern of W-component color filters, R-component color filters, G-component color filters, and B-component color filters included in the WRGB color filter array 11. As shown in FIG. 2, the WRGB color filter array includes one row in which green filters and red filters are arranged alternately in the order of G, R, G, R, . . . , and the next row in which blue filters and white filters (or no filters) are arranged alternately in the order of B, W, B, W, . . . .

Notation for Pixels in WRGB Array

Figure 3:
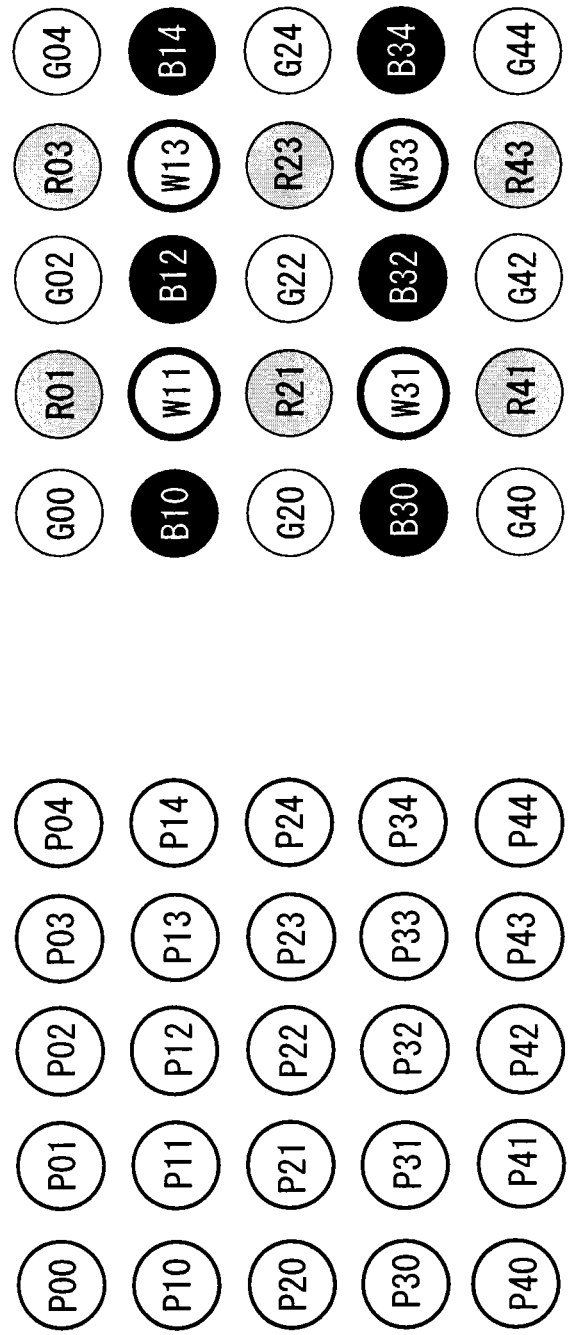
FIG. 3 shows a matrix area of 5×5 pixels.

The notation for pixels in the WRGB array will now be described. FIG. 3(a) shows a matrix area of 5×5 pixels. In FIG. 3(a), P represents a pixel without showing its color component W, R, G, or B. FIG. 3(b) shows each pixel labeled with its color component. In the figure, R represents a pixel with a red component, G represents a pixel with a green component, B represents a pixel with a blue component, and W represents a pixel with a white component.

The symbols P, W, R, G, and B are numbered with their first digit indicating the row number of the pixel in the matrix area, and their second digit indicating the column number of the pixel in the matrix area. For example, FIG. 3(b) shows a matrix area of pixel array consisting of 25 pixels P00 to P44 including a target pixel P22, in which the central pixel P22 (G22) is a green component pixel (corresponding to an area AR1 consisting of 5×5 pixels in FIG. 2). The other figures also show the pixel arrays in the same manner as described above. The symbols P, W, R, G, and B in the embodiment and in the formulae therein may each represent the pixel value. For example, P11 represents the pixel at the first row and the first column, and also indicates the pixel value of the pixel at the first row and the first column.

Light from a subject is collected by the optical system (not shown) included in the imaging unit 1, and then enters the image sensor (not shown) included in the imaging unit 1 through the WRGB color filter array 11 arranged on the imaging surface. Hereafter, the WRGB color filter array 11 has the array pattern shown in FIG. 2.

The image sensor in the imaging unit 1 converts the entering subject light for each pixel into an electrical signal (pixel signal) through photoelectric conversion. More specifically, the image sensor obtains a W-component pixel value at a W-component pixel, an R-component pixel value at an R-component pixel, a G-component pixel value at a G-component pixel, and a B-component pixel value at a B-component pixel. The image signal obtained through the above processing (image signal in which each pixel included in an image formed by the image signal has one of the W-component pixel value, the R-component pixel value, the G-component pixel value, and the B-component pixel value) is output from the imaging unit 1 to the signal processing unit 2.

The signal processing unit 2 subjects the image signal obtained by the imaging unit 1 to predetermined signal processing (e.g., gain adjustment, white balance adjustment, and gamma correction). The image signal (image signal D_raw) resulting from the predetermined signal processing is output to the color saturation evaluation value calculation unit 31, the correlation value calculation unit 32, and the interpolation unit 34 included in the pixel interpolation processing unit 3.

The color saturation evaluation value calculation unit 31 calculates a color saturation evaluation value for each pixel based on the image signal D_raw (image D_raw) output from the signal processing unit 2, and normalizes the color saturation evaluation value L using a predetermined function to obtain a color saturation evaluation coefficient KL (0≤KL≤1). This process will now be described in detail below.

1.2.1 Calculating Color Saturation Evaluation Value

The color saturation evaluation value calculation unit 31 sets an image area of 5×5 pixels including a target pixel as the center (hereafter referred to as a matrix area) in the input image D_raw. The color saturation evaluation value calculation unit 31 analyzes the distribution of color components in the set matrix area to calculate the color saturation evaluation value for the matrix area (the color saturation evaluation value for the target pixel).

More specifically, the color saturation evaluation value calculation unit 31 calculates six evaluation values (1) to (6) below for the matrix area including the target pixel, and sets the smallest one of the six evaluation values as the color saturation evaluation value L.

(1) an average color component difference evaluation value diff_ave_color (2) an overall evaluation value g1_color (3) a vertical direction evaluation value v_color (4) a horizontal direction evaluation value h_color (5) a first diagonal direction evaluation value d1_color (6) a second diagonal direction evaluation value d2_color The process for calculating the evaluation values (1) to (6) will be described below.

(1) Average Color-Component Difference Evaluation Value Diff_Ave_Color

The process for calculating the average color component difference evaluation value diff_ave_color will now be described with reference to FIG. 4 and FIG. 5.

The color saturation evaluation value calculation unit 31 classifies the matrix area into four patterns. More specifically, the color saturation evaluation value calculation unit 31 classifies the matrix area into the four patterns: a matrix area in which the central pixel is a green component pixel (hereafter, a G-pixel), a matrix area in which the central pixel is a red component pixel (hereafter, an R-pixel), and a matrix area in which the central pixel is a blue component pixel (hereafter, a B-pixel), and a matrix area in which the central pixel is a white component pixel (hereafter, a W-pixel).

Figure 4:
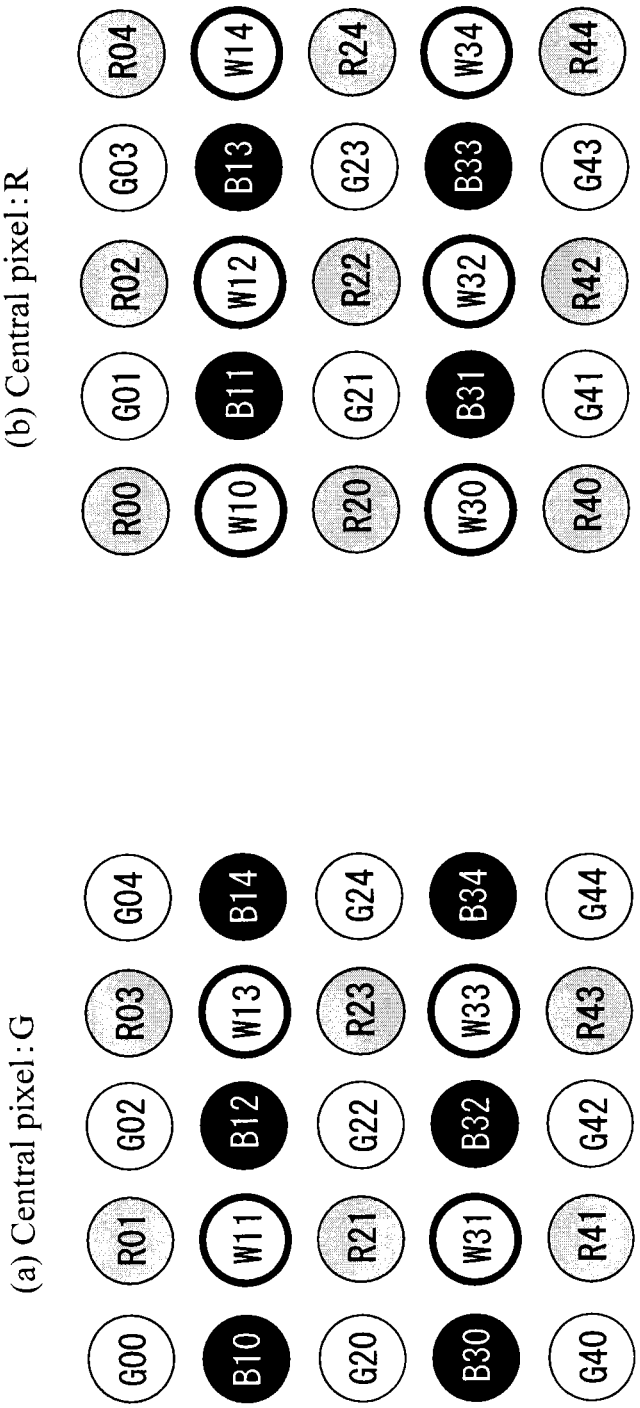
FIG. 4 shows a matrix area of 5×5 pixels.

FIG. 4(*a*) shows a matrix area in which the central pixel is a G-pixel. FIG. 4(*b*) shows a matrix area in which the central pixel is an R-pixel.

Figure 5:
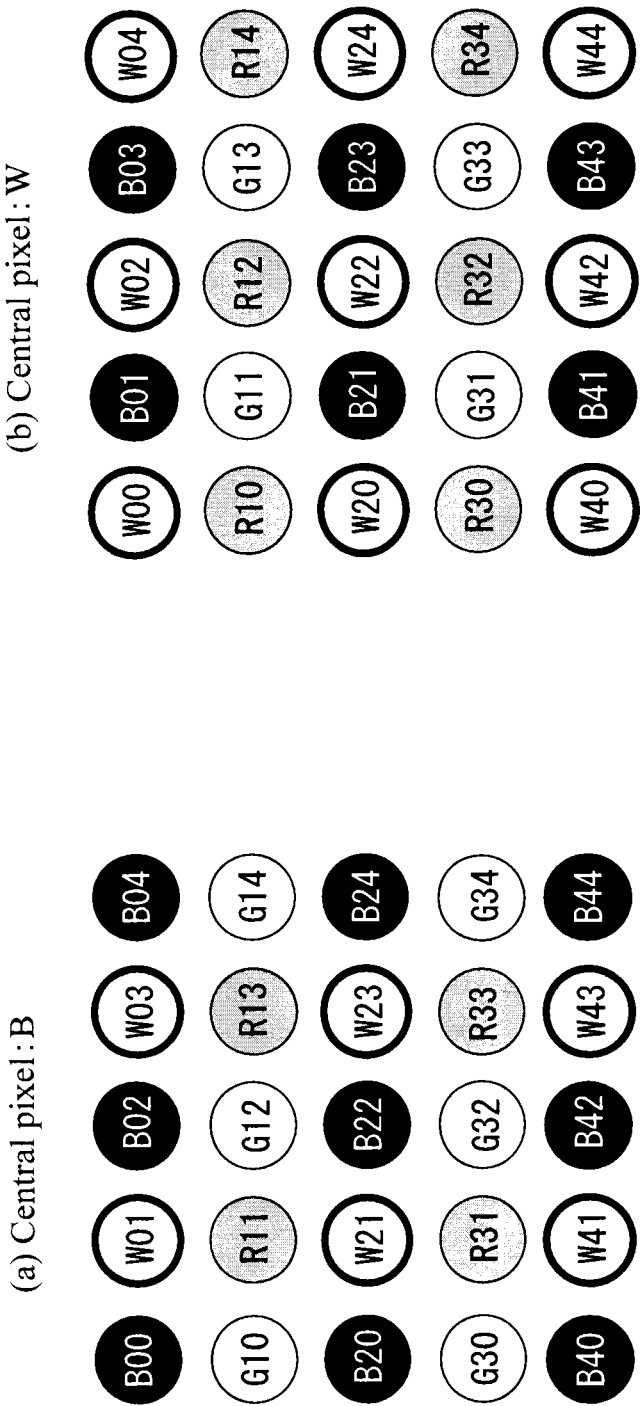
FIG. 5 shows a matrix area of 5×5 pixels

FIG. 5(*a*) is a matrix area in which the central pixel is a B-pixel. FIG. 5(*b*) is a matrix area in which the central pixel is a W-pixel.

1-1 When the Central Pixel is G-Pixel

When the central pixel is a G-pixel as shown in FIG. 4(*a*), the color saturation evaluation value calculation unit 31 calculates an average Wave of the pixel values of W-pixels, an average Gave of the pixel values of G-pixels, an average Rave of the pixel values of R-pixels, and an average Bave of the pixel values of B-pixels in an area of 3×3 pixels including the central pixel through the processing corresponding to the formulae below.

$$Wave=(W11+W13+W31+W33)/4$$

$$Gave=G22$$

$$Rave=(R21+R23)/2$$

$$Bave=(B12+B32)/2$$

The color saturation evaluation value calculation unit 31 calculates the average color component difference evaluation value diff_ave_color through the processing corresponding to the formula below.

$$\text{diff\_ave\_color}=abs(Gave-Rave)+abs(Gave-Bave)$$

In this formula, abs(x) is a function that returns the absolute value of x.

1-2 When the Central Pixel is R-Pixel

When the central pixel is an R-pixel as shown in FIG. 4(*b*), the color saturation evaluation value calculation unit 31 calculates an average Wave of the pixel values of W-pixels, an average Gave of the pixel values of G-pixels, an average Rave of the pixel values of R-pixels, and an average Bave of the pixel values of B-pixels in an area of 3×3 pixels including the central pixel through the processing corresponding to the formulae below.

$$Wave=(W12+W32)/2$$

$$Gave=(G21+G23)/2$$

$$Rave=R22$$

$$Bave=(B11+B13+B31+B33)/4$$

The color saturation evaluation value calculation unit 31 calculates the average color component difference evaluation value diff_ave_color through the processing corresponding to the formula below.

$$\text{diff\_ave\_color}=abs(Gave-Rave)+abs(Gave-Bave)$$

In this formula, abs(x) is a function that returns the absolute value of x.

1-3 When the Central Pixel is B-Pixel

When the central pixel is a B-pixel as shown in FIG. 5(*a*), the color saturation evaluation value calculation unit 31 calculates an average Wave of the pixel values of W-pixels, an average Gave of the pixel values of G-pixels, an average Rave of the pixel values of R-pixels, and an average Bave of the pixel values of B-pixels in an area of 3×3 pixels including the central pixel through the processing corresponding to the formulae below.

$$Wave=(W21+W23)/2$$

$$Gave=(G12+G32)/2$$

$$Rave=(R11+R13+R31+R33)/4$$

$$Bave=B22$$

The color saturation evaluation value calculation unit 31 calculates the average color component difference evaluation value diff_ave_color through the processing corresponding to the formula below.

$$\text{diff\_ave\_color}=abs(Gave-Rave)+abs(Gave-Bave)$$

In this formula, abs(x) is a function that returns the absolute value of x.

1-4 When the Central Pixel is W-Pixel

When the central pixel is a W-pixel as shown in FIG. 5(b), the color saturation evaluation value calculation unit 31 calculates an average Wave of the pixel values of W-pixels, an average Gave of the pixel values of G-pixels, an average Rave of the pixel values of R-pixels, and an average Bave of the pixel values of B-pixels in an area of 3×3 pixels including the central pixel through the processing corresponding to the formulae below.

$$Wave = W22$$

$$Gave = (G11+G13+G31+G33)/4$$

$$Rave = (R12+R32)/2$$

$$Bave = (B21+B23)/2$$

The color saturation evaluation value calculation unit 31 calculates the average color component difference evaluation value diff_ave_color through the processing corresponding to the formula below.

$$\text{diff\_ave\_color} = \text{abs}(Gave-Rave) + \text{abs}(Gave-Bave)$$

In this formula, abs(x) is a function that returns the absolute value of x.

(2) Overall Evaluation Value g1_Color

The process for calculating the overall evaluation value g1_color will now be described.

The color saturation evaluation value calculation unit 31 calculates the overall evaluation value g1_color through the processing corresponding to the formula below for an area including the central pixel of any color component (or for any color filter arranged on the central pixel).

$$g1\_color = (\text{abs}(P11-P22) + \text{abs}(P12-P22) + \text{abs}(P13-P22) + \text{abs}(P21-P22) + \text{abs}(P23-P22) + \text{abs}(P31-P22) + \text{abs}(P32-P22) + \text{abs}(P33-P22))/8$$

(3) Vertical Direction Evaluation Value v_Color

Figure 6:
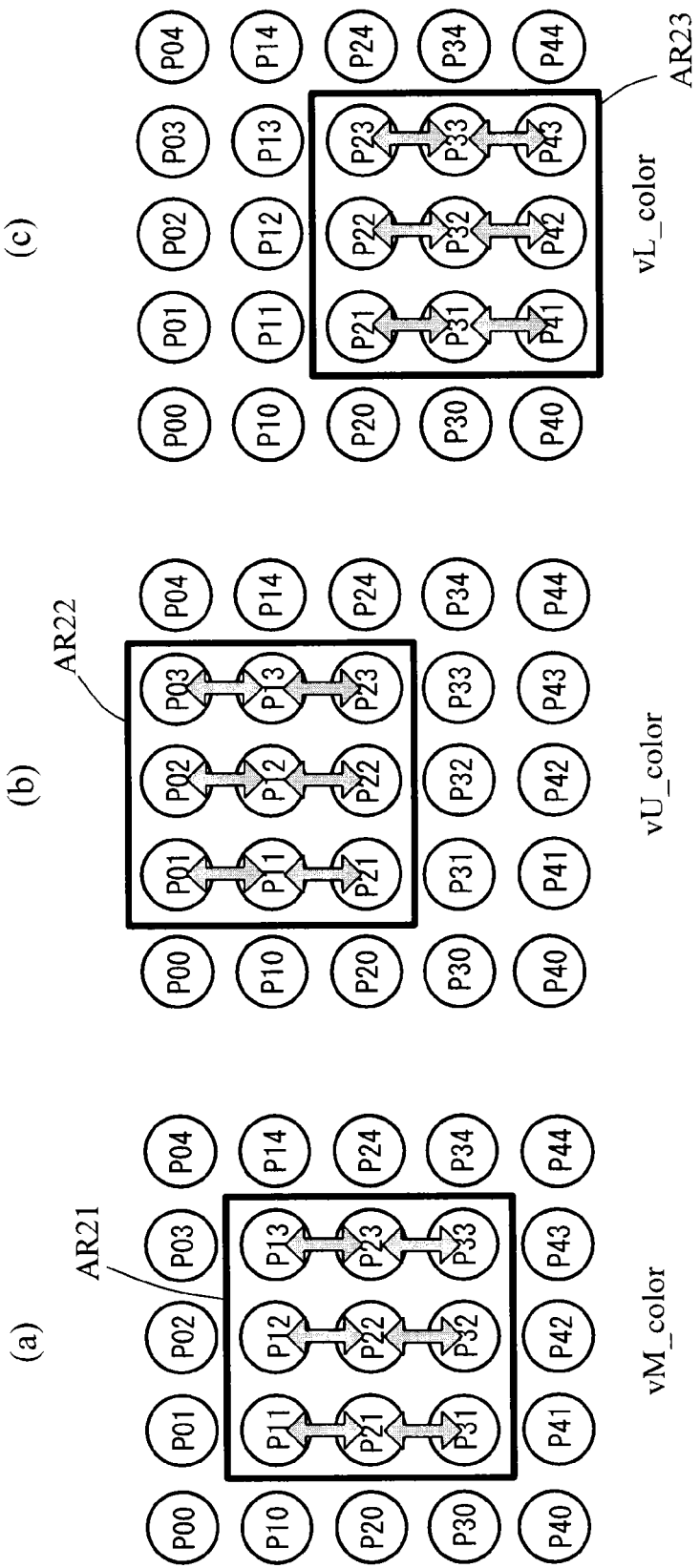
FIG. 6 is a diagram describing a process for obtaining an evaluation value in a vertical direction.

The process for calculating the vertical direction evaluation value v_color with reference to FIG. 6.

As shown in FIG. 6(a), the color saturation evaluation value calculation unit 31 calculates a first vertical direction evaluation value vM_color in an area AR21 of 3×3 pixels including a pixel P22 as the central pixel through the processing corresponding to the formula below.

$$vM\_color = (\text{abs}(P11-P21) + \text{abs}(P21-P31) + (\text{abs}(P12-P22) + \text{abs}(P22-P32)) \times 2 + \text{abs}(P13-P23) + \text{abs}(P23-P33))/8$$

The above formula includes a term multiplied by a coefficient of 2 to smooth the cumulative ratio of differences between pixels. The four pixels P11, P31, P13, and P33 are pixels with the first color component. The two pixels P21 and P23 are pixels with the second color component. The two pixels P12 and P32 are pixels with the third color component. The pixel P22 alone is a pixel with the fourth color component. The term (the first color component pixel–the second color component pixel) includes four operations. The term (the third color component pixel–the fourth color component pixel) includes two operations. Thus, the term (abs(P12–P22)+abs(P22–P32)) is multiplied by 2. The coefficient used for the multiplication should not be limited to 2, and may be another value.

As shown in FIG. 6(b), the color saturation evaluation value calculation unit 31 calculates a second vertical direction evaluation value vM_color in an area AR22 of 3×3 pixels including a pixel P12 as the central pixel through the processing corresponding to the formula below.

$$vU\_color = (\text{abs}(P01-P11) + \text{abs}(P11-P21) + (\text{abs}(P02-P12) + \text{abs}(P12-P22)) \times 2 + \text{abs}(P03-P13) + \text{abs}(P13-P23))/8$$

The above formula includes a term multiplied by a coefficient of 2 for the same reason as described for the processing for calculating the first vertical direction evaluation value vM_color.

As shown in FIG. 6(c), the color saturation evaluation value calculation unit 31 calculates a third vertical direction evaluation value vL_color in an area AR23 of 3×3 pixels including a pixel P32 as the central pixel through the processing corresponding to the formula below.

$$vL\_color = (\text{abs}(P21-P31) + \text{abs}(P31-P41) + (\text{abs}(P22-P32) + \text{abs}(P32-P42)) \times 2 + \text{abs}(P23-P33) + \text{abs}(P33-P43))/8$$

The above formula includes a term multiplied by a coefficient of 2 for the same reason as described for the processing for calculating the first vertical direction evaluation value vM_color.

The color saturation evaluation value calculation unit 31 calculates a vertical direction evaluation value v_color by subjecting the first to third vertical direction evaluation values obtained through the above processing to the processing corresponding to the formula below.

$$v\_color = \min(vM\_color, vU\_color, vL\_color)$$

In this formula, min( ) is a function that returns a minimum value of the elements.

(4) Horizontal Direction Evaluation Value h_Color

Figure 7:
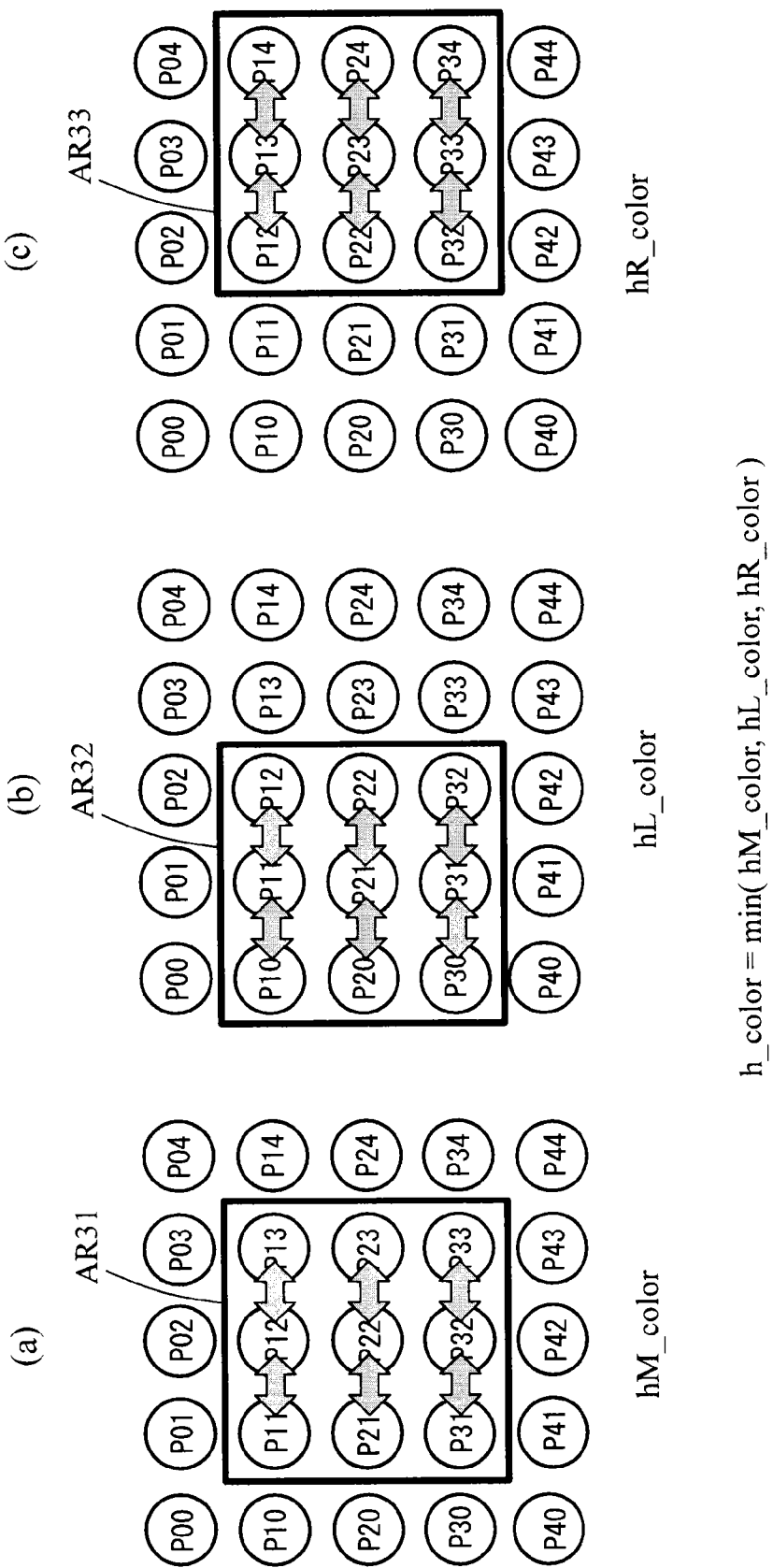
FIG. 7 is a diagram describing a process for obtaining an evaluation value in a horizontal direction.

The process for calculating the horizontal direction evaluation value h_color will now be described with reference to FIG. 7.

As shown in FIG. 7(a), the color saturation evaluation value calculation unit 31 calculates a first horizontal direction evaluation value hM_color in an area AR31 of 3×3 pixels including a pixel P22 as the central pixel through the processing corresponding to the formula below.

$$hM\_color = (\text{abs}(P11-P12) + \text{abs}(P12-P13) + (\text{abs}(P21-P22) + \text{abs}(P22-P23)) \times 2 + \text{abs}(P31-P32) + \text{abs}(P32-P33))/8$$

The above formula includes a term multiplied by a coefficient of 2 to smooth the cumulative ratio of differences between pixels. The four pixels P11, P31, P13, and P33 are pixels with the first color component. The two pixels P21 and P23 are pixels with the second color component. The two pixels P12 and P32 are pixels with the third color component. The pixel P22 alone is a pixel with the fourth color component. The term (the first color component pixel–the third color component pixel) includes four operations. The term (the second color component pixel–the fourth color component pixel) includes two operations. Thus, the term (abs(P21–P22)+abs(P22–P23)) is multiplied by 2. The coefficient used for the multiplication should not be limited to 2, and may be another value.

As shown in FIG. 7(b), the color saturation evaluation value calculation unit 31 calculates a second horizontal direction evaluation value hL_color in an area AR32 of 3×3 pixels including a pixel P21 as the central pixel through the processing corresponding to the formula below.

$$hL\_color = (\text{abs}(P10-P11) + \text{abs}(P11-P12) + (\text{abs}(P20-P21) + \text{abs}(P21-P22)) \times 2 + \text{abs}(P30-P31) + \text{abs}(P31-P32))/8$$

The above formula includes a term multiplied by a coefficient of 2 for the same reason as described for the processing for calculating the first horizontal direction evaluation value hM_color.

As shown in FIG. 7(c), the color saturation evaluation value calculation unit 31 calculates a third horizontal direction evaluation value hR_color in an area AR33 of 3×3 pixels including a pixel P23 as the central pixel through the processing corresponding to the formula below.

$$hR\_color = (abs(P12-P13) + abs(P13-P14) + (abs(P22-P23) + abs(P23-P24)) \times 2 + abs(P32-P33) + abs(P33-P34))/8$$

The above formula includes a term multiplied by a coefficient of 2 for the same reason as described for the processing for calculating the first horizontal direction evaluation value hM_color.

The color saturation evaluation value calculation unit 31 calculates a horizontal evaluation value h_color by subjecting the first to third horizontal direction evaluation values obtained through the above processing corresponding to the formula below.

$$h\_color = \min(hM\_color, hL\_color, hR\_color)$$

In this formula, min( ) is a function that returns a minimum value of the elements.

(5) First Diagonal Direction Evaluation Value d1_Color

The process for calculating the first diagonal direction evaluation value d1_color will now be described with reference to FIG. 8.

Figure 8:
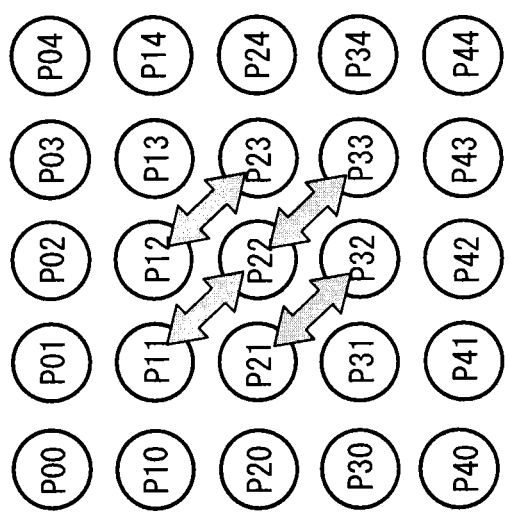
FIG. 8 is a diagram describing a process for obtaining an evaluation value in a first diagonal direction.

As shown in FIG. 8, the color saturation evaluation value calculation unit 31 calculates the first diagonal direction evaluation value d1_color through the processing corresponding to the formula below in an area consisting of seven pixels P11, P12, P21, P22, P23, P32, and P33 surrounding a central pixel P22.

$$d1\_color = (abs(P12-P23) + abs(P11-P22) + abs(P22-P33) + abs(P21-P32))/4$$

(6) Second Diagonal Direction Evaluation Value d2_Color

The process for calculating the second diagonal direction evaluation value d2_color will now be described with reference to FIG. 9.

Figure 9:
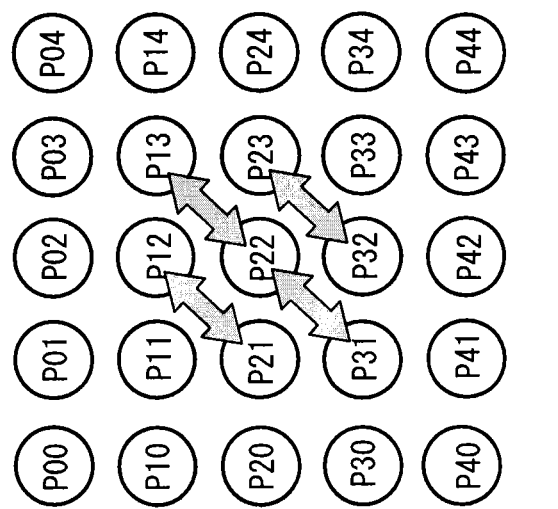
FIG. 9 is a diagram describing a process for obtaining an evaluation value in a second diagonal direction.

As shown in FIG. 9, the color saturation evaluation value calculation unit 31 calculates the second diagonal direction evaluation value d2_color through the processing corresponding to the formula below in an area consisting of seven pixels P12, P13, P21, P22, P23, P31, and P32 surrounding a central pixel P22.

$$d2color = (abs(P12-P21) + abs(P13-P22) + abs(P22-P31) + abs(P23-P32))/4$$

After the processing described above, the color saturation evaluation value calculation unit 31 calculates a color saturation evaluation value L through the processing corresponding to the formula below.

$$L = \min(diff\_ave\_color, g1\_color, v\_color, h\_color, d1\_color, d2\_color)$$

In this formula, min( ) is a function that returns a minimum value of the elements.

The color saturation evaluation value calculation unit 31 uses, as the color saturation evaluation value L, the smallest one of the six evaluation values: (1) the average color component difference evaluation value diff_ave_color, (2) the overall evaluation value g1_color, (3) the vertical direction evaluation value v_color, (4) the horizontal direction evaluation value h_color, (5) the first diagonal direction evaluation value d1_color, and (6) the second diagonal direction evaluation value d2_color.

Figure 10:
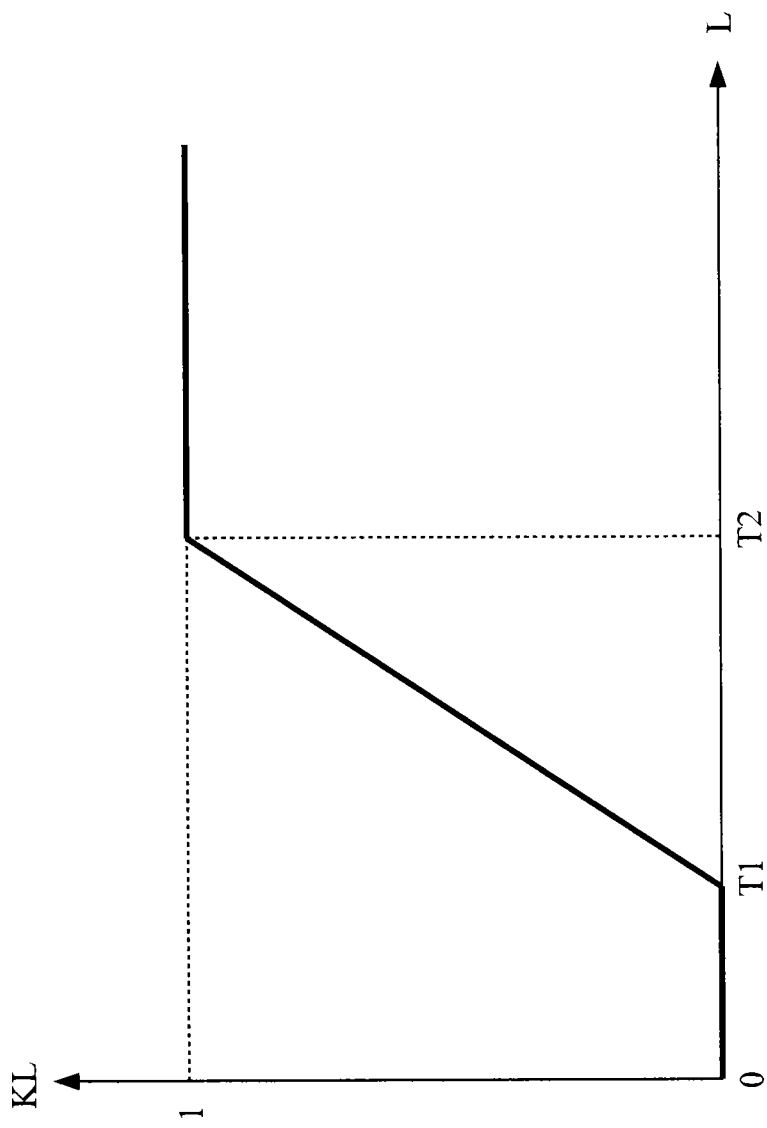
FIG. 10 is a diagram showing the relationship between a color saturation evaluation value L and a color saturation evaluation coefficient KL.

The color saturation evaluation value calculation unit 31 calculates a color saturation evaluation coefficient KL by normalizing the color saturation evaluation value L for the target pixel obtained through the above processing. FIG. 10 is a diagram showing the input and output characteristics of an example function to calculate the color saturation evaluation coefficient KL by normalizing the color saturation evaluation value L for the target pixel. The color saturation evaluation value calculation unit 31 calculates the color saturation evaluation coefficient KL using, for example, two thresholds T1 and T2 through the processing corresponding to the formula below.

$$KL = f(L)$$

The function f(x) is set in the manner below.
When $x \leq T1$, $f(x) = 0$.
When $T1 \leq x \leq T2$, $f(x) = (x-T1)/(T2-T1)$.
When $x \geq T2$, $f(x) = 1$.

The function f(x) should not be limited to the above function, but may be another function that converts the color saturation evaluation value L into a value in a range of 0 to 1 (e.g., a function to cause the color saturation evaluation coefficient to substantially increase monotonically in accordance with the color saturation evaluation value L).

The above processing converts the color saturation evaluation value L to the color saturation evaluation coefficient KL satisfying $0 \leq KL \leq 1$.

The two thresholds T1 and T2 are set as values around the boundary between a grayscale image area (an image area with low color saturation) and a color image area (an image area with high color saturation). Although the thresholds T1 and T2 can be set to optimum values based on experimental results or experience, it is preferred that the thresholds are variable parameters determined in accordance with the characteristics of an input image. The characteristics of the input image are determined by the imaging conditions of the imaging apparatus 1000 including the exposure time and the aperture value. The characteristics of the input image may include the characteristics of the image sensors (the CCD image sensor or the CMOS image sensor) or the optical characteristics of the lens.

The color saturation evaluation coefficient KL calculated by the color saturation evaluation value calculation unit 31 as described above is output to the pixel interpolation method determination unit 33.

1.2.2 Calculating Correlation Values

The correlation value calculation unit 32 calculates correlation values intended for a color image area (correlation values for an image area with high color saturation) and correlation values intended for a grayscale image area (correlation values for an image area with low color saturation) for each pixel based on the image signal D_raw (image D_raw) output from the signal processing unit 2. The processing will be described below.

1.2.2.1 Calculating Correlation Values for Color Image Area

The process for calculating the correlation values for a color image area will now be described.

For a target pixel in an image D_raw (processing target pixel) output from the signal processing unit 2, the correlation value calculation unit 32 calculates the four correlation values intended for a color image area described below.

(A1) a vertical direction correlation value Cv_color for a color image area (A2) a horizontal direction correlation value Ch_color for a color image area (A3) a first diagonal direction correlation value Cd1_color for a color image area (A4) a second diagonal direction correlation value Cd2_color for a color image area The process for calculating the correlation values (A1) to (A4) for a color image area will now be described.

(A1) Vertical Direction Correlation Value Cv_Color for Color Image Area

First, the process for calculating the vertical direction correlation value Cv_color for a color image area will now be described with reference to FIG. 11.

Figure 11:
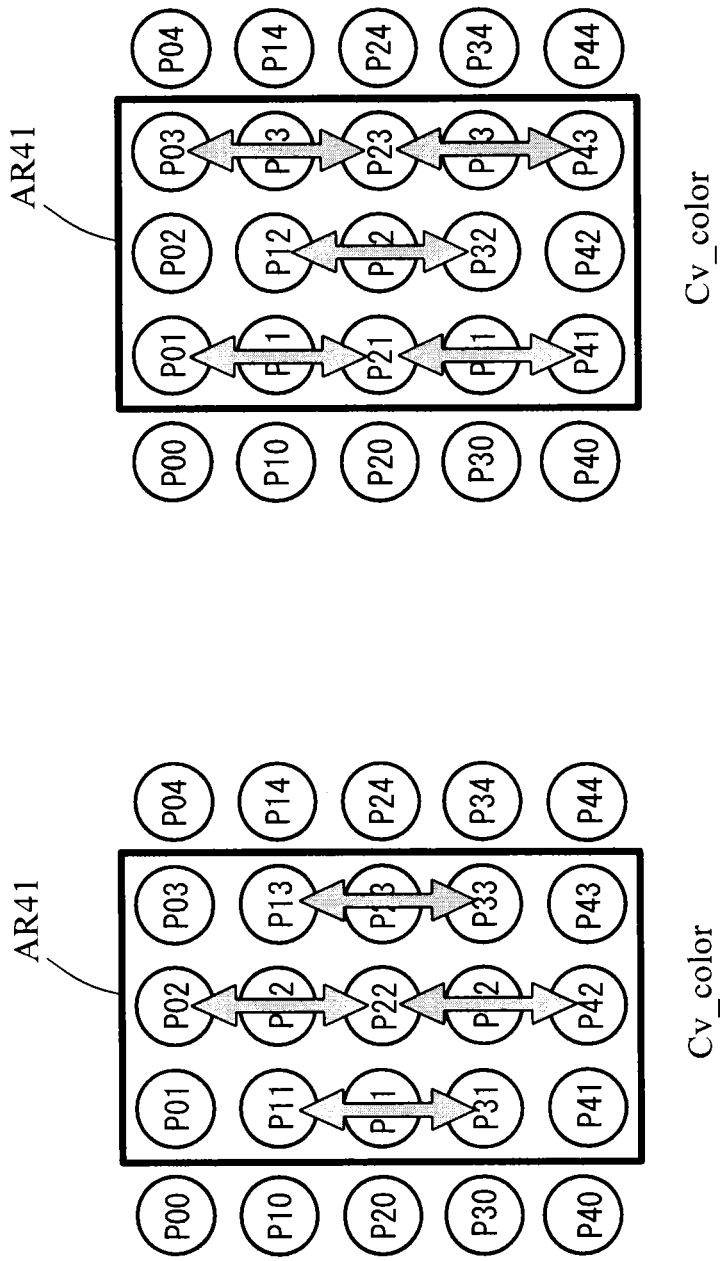
FIG. 11 is a diagram describing a process for calculating a vertical direction correlation value Cv_color intended for a color image area.

FIG. 11 is a diagram describing the process for calculating the vertical direction correlation value Cv_color for a color image area. FIG. 11 shows a matrix area of 5×5 pixels including a central pixel P22 as the center. In the figure, two pixels pointed by each of the two-headed arrows are pixels to be used for subtraction.

As shown in FIG. 11, the correlation value calculation unit 32 calculates a difference in absolute value between the pixel values of vertically adjacent pixels with the same color included in an area AR41 consisting of pixels P01 to P03, P11 to P13, P21 to P23, P31 to P33, and P41 to P43. The correlation value calculation unit 32 calculates the average (weighted average) of the calculated absolute value differences. More specifically, the correlation value calculation unit 32 calculates the vertical direction correlation value Cv_color for a color image area through the processing corresponding to the formulae below.

$$\text{sum}=\text{abs}(P02-P22)+\text{abs}(P22-P42)+\text{abs}(P11-P31)+\text{abs}(P13-P33)+\text{abs}(P12-P32)\times 2+(\text{abs}(P01-P21)+\text{abs}(P21-P41)+\text{abs}(P03-P23)+\text{abs}(P23-P43))/2$$

$$Cv\_\text{color}=\text{sum}/8$$

In the above formula, abs(P12−P32) is multiplied by a coefficient of 2, and (abs(P01−P21)+abs(P21−P41)+abs(P03−P23)+abs(P23−P43)) is multiplied by a coefficient of ½. This multiplication is for weighting in accordance with the distance from the central pixel (the distance on the image). The coefficient for the multiplication (weighting coefficient) should not be limited to the above value, but may be another value.

(A2) Horizontal Direction Correlation Value Ch_Color for Color Image Area

The process for calculating the horizontal direction correlation value Ch_color for a color image area will now be described with reference to FIG. 12.

Figure 12:
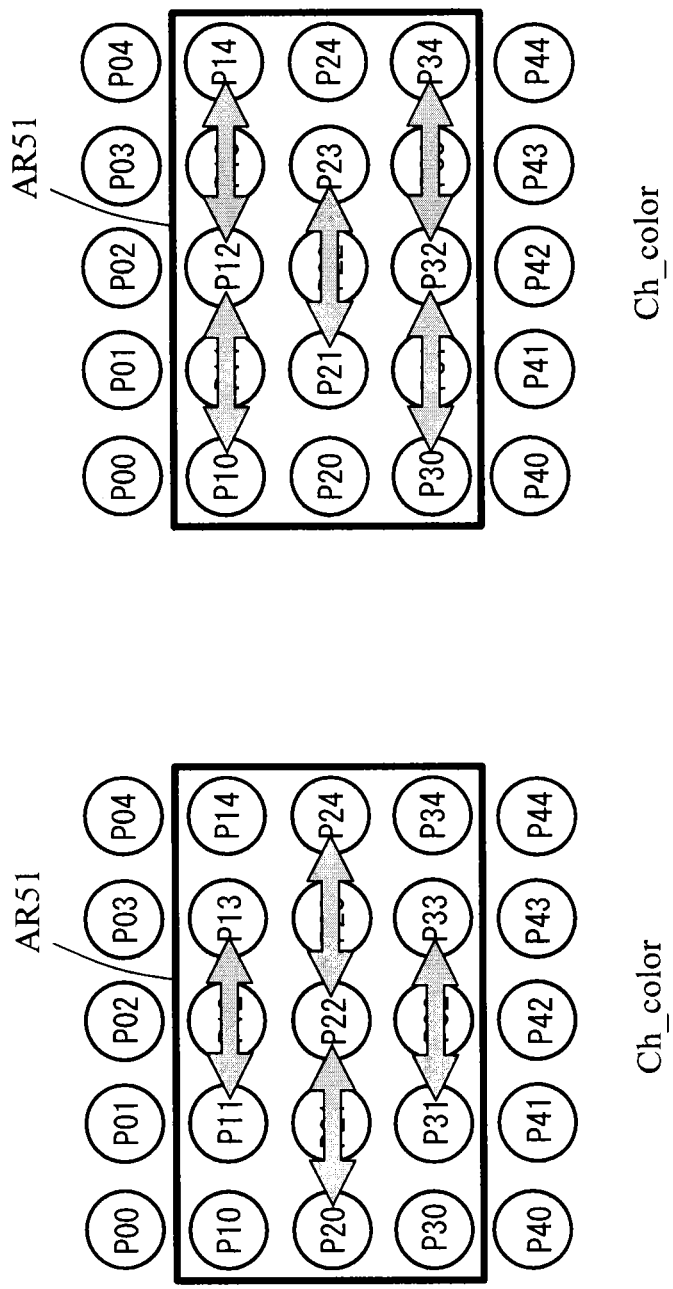
FIG. 12 is a diagram describing a process for calculating a horizontal direction correlation value Ch_color intended for a color image area.

FIG. 12 is a diagram describing the process for calculating the horizontal direction correlation value Ch_color for a color image area. FIG. 12 shows a matrix area of 5×5 pixels including a central pixel P22 as the center. In the figure, two pixels pointed by each of the two-headed arrows are pixels to be used for subtraction.

As shown in FIG. 12, the correlation value calculation unit 32 calculates a difference in absolute value between the pixel values of horizontally adjacent pixels with the same color included in an area AR51 consisting of pixels P10 to P14, P20 to P24, and P30 to P34. The correlation value calculation unit 32 calculates the average (weighted average) of the calculated absolute value differences. More specifically, the correlation value calculation unit 32 calculates the horizontal correlation value Ch_color for a color image area through the processing corresponding to the formulae below.

$$\text{sum}=\text{abs}(P20-P22)+\text{abs}(P22-P24)+\text{abs}(P11-P13)+\text{abs}(P31-P33)+(\text{abs}(P10-P12)+\text{abs}(P12-P14)+\text{abs}(P30-P32)+\text{abs}(P32-P34))/2+\text{abs}(P21-P23)\times 2$$

$$Ch\_\text{color}=\text{sum}/8$$

In the above formula, abs(P21−P23) is multiplied by a coefficient of 2, and (abs(P10−P12)+abs(P12−P14)+abs(P30−P32)+abs(P32−P34)) is multiplied by a coefficient of ½. This multiplication is for weighting in accordance with the distance from the central pixel (the distance on the image). The coefficient for the multiplication (weighting coefficient) should not be limited to the above value, but may be another value.

(A3) First Diagonal Direction Correlation Value Cd1_Color for Color Image Area

The process for calculating the first diagonal direction correlation value Cd1_color for a color image area will now be described with reference to FIG. 13.

Figure 13:
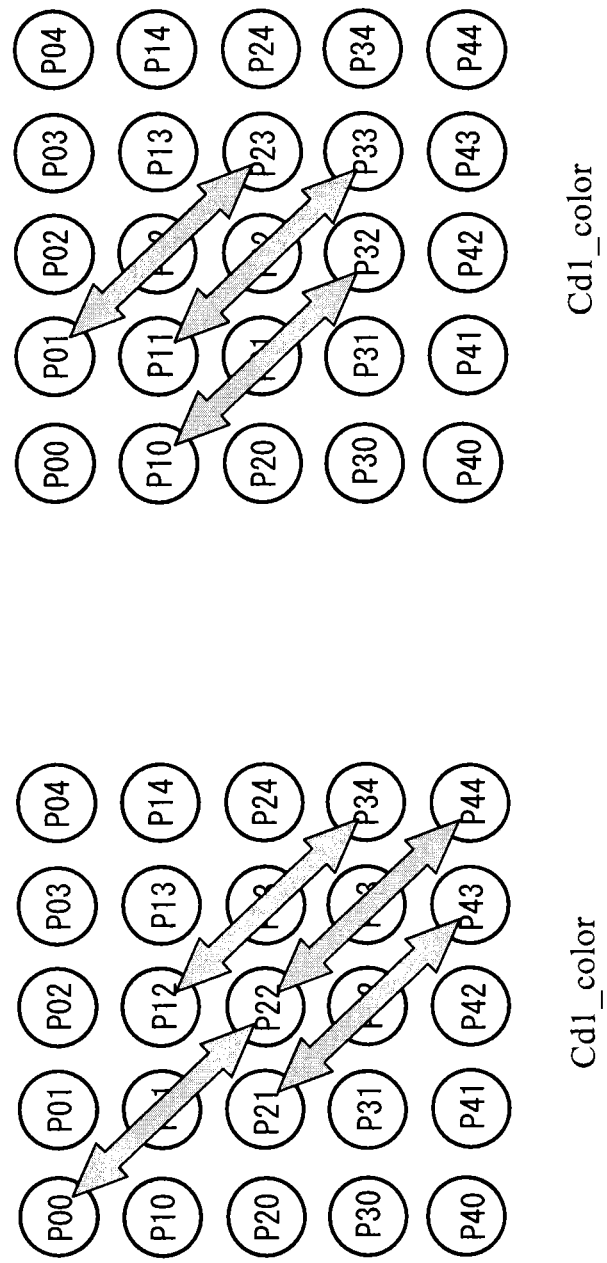
FIG. 13 is a diagram describing a process for calculating a first diagonal direction correlation value Cd1_color intended for a color image area.

FIG. 13 is a diagram describing the process for calculating the first diagonal direction correlation value Cd1_color for a color image area. FIG. 13 shows a matrix area of 5×5 pixels including a central pixel P22 as the center. In the figure, two pixels pointed by each of the two-headed arrows are pixels to be used for subtraction.

As shown in FIG. 13, the correlation value calculation unit 32 calculates a difference in absolute value between the pixel values of adjacent pixels with the same color in the first diagonal direction, and calculates the average (weighted average) of the calculated absolute value differences. More specifically, the correlation value calculation unit 32 calculates the first diagonal direction correlation value Ch1_color for a color image area through the processing corresponding to the formulae below.

$$\text{sum}=\text{abs}(P00-P22)+\text{abs}(P22-P44)+\text{abs}(P11-P33)\times 2+\text{abs}(P12-P34)+\text{abs}(P10-P32)+\text{abs}(P01-P23)+\text{abs}(P21-P43))$$

$$Cd1\_\text{color}=\text{sum}/8$$

In the above formula, abs(P11−P33) is multiplied by a coefficient of 2. This multiplication is for weighting in accordance with the distance from the central pixel (the distance on the image). The coefficient for the multiplication (weighting coefficient) should not be limited to the above value, but may be another value.

(A4) Second Diagonal Direction Correlation Value Cd2_Color for Color Image Area

The process for calculating the second diagonal direction correlation value Cd2_color for a color image area will now be described with reference to FIG. 14.

Figure 14:
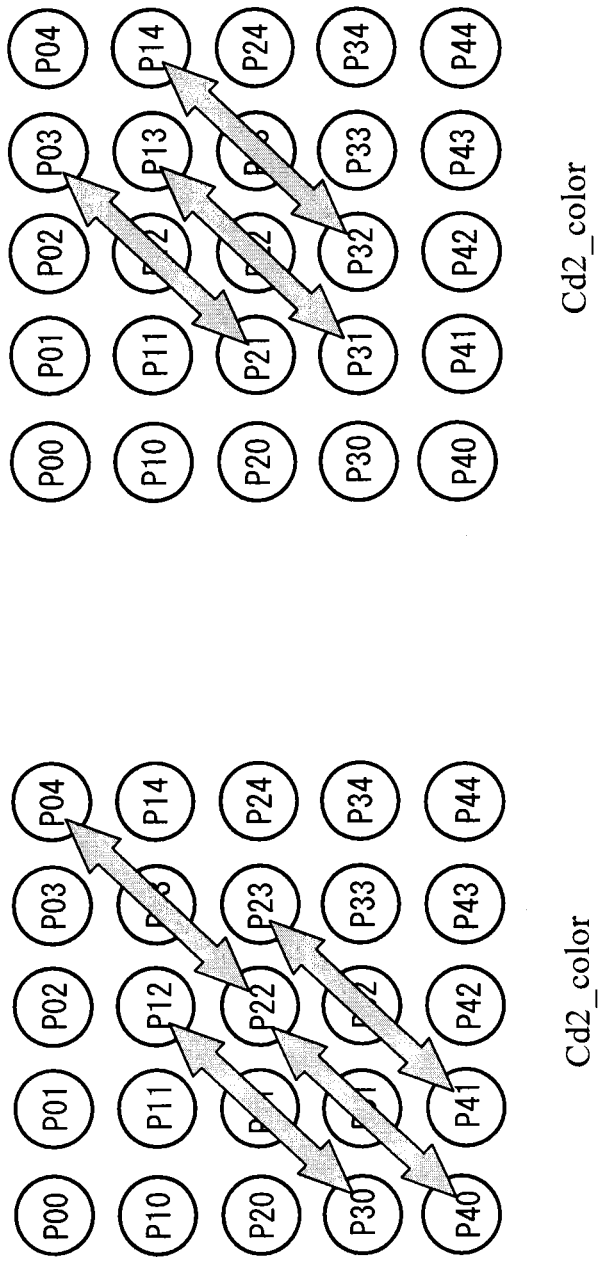
FIG. 14 is a diagram describing a process for calculating a second diagonal direction correlation value Cd2_color intended for a color image area.

FIG. 14 is a diagram describing the process for calculating the second diagonal direction correlation value Cd2_color for a color image area. FIG. 14 shows a matrix area of 5×5 pixels including a central pixel P22 as the center. In the figure, two pixels pointed by each of the two-headed arrows are pixels to be used for subtraction.

As shown in FIG. 14, the correlation value calculation unit 32 calculates a difference in absolute value between the pixel values of adjacent pixels with the same color in the second diagonal direction, and calculates the average (weighted average) of the calculated absolute value differences. More specifically, the correlation value calculation unit 32 calculates the second diagonal direction correlation value Cd2_color for a color image area through the processing corresponding to the formulae below.

$$\text{sum}=\text{abs}(P04-P22)+\text{abs}(P22-P40)+\text{abs}(P13-P31)\times 2+\text{abs}(P12-P30)+\text{abs}(P14-P32)+\text{abs}(P03-P21)+\text{abs}(P23-P41)$$

$$Cd2\_\text{color}=\text{sum}/8$$

In the above formula, abs(P13−P31) is multiplied by a coefficient of 2. This multiplication is for weighting in accordance with the distance from the central pixel (the distance on the image). The coefficient for the multiplication (weighting coefficient) should not be limited to the above value, but may be another value.

1.2.2.2 Calculating Correlation Values for Grayscale Image Area

The process for calculating the correlation values for a grayscale image area will now be described.

For a target pixel in the image D_raw (processing target pixel) output from the signal processing unit 2, the correlation value calculation unit 32 calculates the four correlation values intended for a grayscale image area described below.

(B1) a vertical direction correlation value Cv_gray for a grayscale image (B2) a horizontal direction correlation value Ch_gray for a grayscale image (B3) a first diagonal direction correlation value Cd1_gray for a grayscale image (B4) a second diagonal direction correlation value Cd2_gray for a grayscale image The process for calculating the correlation values (B1) to (B4) for a grayscale image area will now be described.

(B1) Vertical Direction Correlation Value Cv_Gray for Grayscale Image

The process for calculating the vertical direction correlation value Cv_gray for a grayscale image will now be described with reference to FIG. 15.

Figure 15:
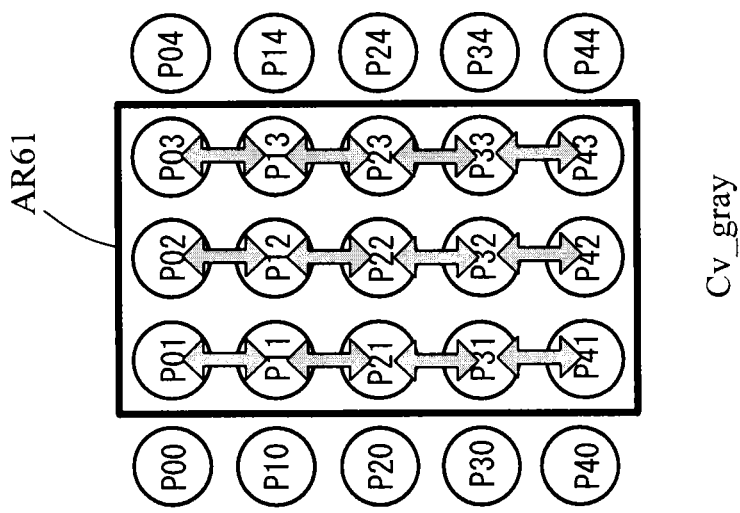
FIG. 15 is a diagram describing a process for calculating a vertical direction correlation value Cv_gray intended for a grayscale image area.

FIG. 15 is a diagram describing the process for calculating the vertical direction correlation value Cv_gray for a grayscale image area. FIG. 15 shows a matrix area of 5×5 pixels including a central pixel P22 as the center. In the figure, two pixels pointed by each of the two-headed arrows are pixels to be used for subtraction.

As shown in FIG. 15, the correlation value calculation unit 32 calculates a difference in absolute value between the pixel values of vertically adjacent pixels included in an area AR61 consisting of pixels P01 to P03, P11 to P13, P21 to P23, P31 to P33, and P41 to P43. The correlation value calculation unit 32 calculates the average (weighted average) of the calculated absolute value differences. More specifically, the correlation value calculation unit 32 calculates the vertical direction correlation value Cv_gray for a grayscale image area through the processing corresponding to the formulae below.

$$\text{sum}=\text{abs}(P02-P12)+\text{abs}(P12-P22)+\text{abs}(P22-P32)+\\\text{abs}(P32-P42)+\text{abs}(P01-P11)+\text{abs}(P11-P21)+\\\text{abs}(P21-P31)+\text{abs}(P31-P41)+\text{abs}(P03-P13)+\\\text{abs}(P13-P23)+\text{abs}(P23-P33)+\text{abs}(P33-P43)$$

$$Cv\_\text{gray}=\text{sum}/6$$

(B2) Horizontal Direction Correlation Value Ch_Gray for Grayscale Image

The process for calculating the horizontal direction correlation value Ch_gray for a grayscale image will now be described with reference to FIG. 16.

Figure 16:
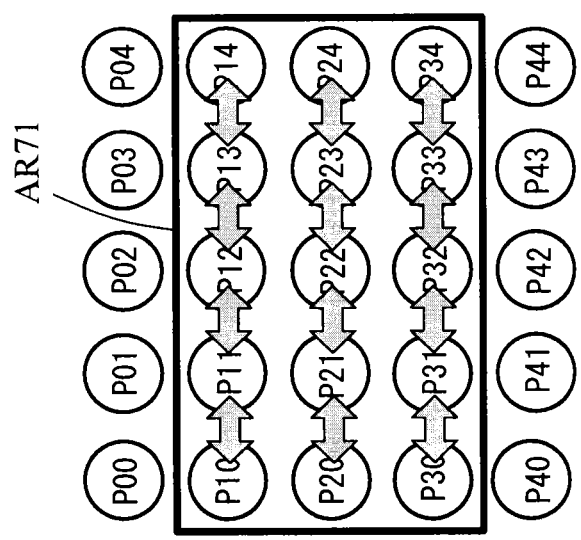
FIG. 16 is a diagram describing a process for calculating a horizontal direction correlation value Ch_gray intended for a grayscale image area.

FIG. 16 is a diagram describing the process for calculating the horizontal direction correlation value Ch_gray for a grayscale image area. FIG. 16 shows a matrix area of 5×5 pixels including a central pixel P22 as the center. In the figure, two pixels pointed by each of the two-headed arrows are pixels to be used for subtraction.

As shown in FIG. 16, the correlation value calculation unit 32 calculates a difference in absolute value between the pixel values of vertically adjacent pixels included in an area AR71 consisting of pixels P10 to P14, P20 to P24, and P30 to P34. The correlation value calculation unit 32 calculates the average (weighted average) of the calculated absolute value differences. More specifically, the correlation value calculation unit 32 calculates the vertical direction correlation value Ch_gray for a grayscale image area through the processing corresponding to the formulae below.

$$\text{sum}=\text{abs}(P20-P21)+\text{abs}(P21-P22)+\text{abs}(P22-P23)+\\\text{abs}(P23-P24)+\text{abs}(P10-P11)+\text{abs}(P11-P12)+\\\text{abs}(P12-P13)+\text{abs}(P13-P14)+\text{abs}(P30-P31)+\\\text{abs}(P31-P32)+\text{abs}(P32-P33)+\text{abs}(P33-P34)$$

$$Ch\_\text{gray}=\text{sum}/6$$

(B3) First Diagonal Direction Correlation Value Cd1_Gray for Grayscale Image

The process for calculating the first diagonal direction correlation value Cd1_gray for a grayscale image will now be described with reference to FIG. 17.

Figure 17:
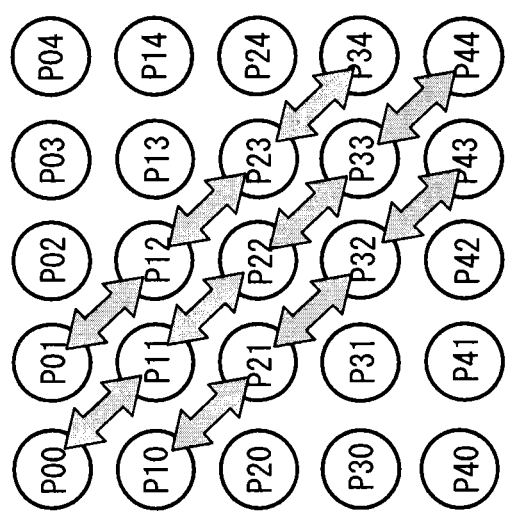
FIG. 17 is a diagram describing a process for calculating a first diagonal direction correlation value Cd1_gray intended for a grayscale image area.

FIG. 17 is a diagram describing the process for calculating the horizontal direction correlation value Cd1_gray for a grayscale image area. FIG. 17 shows a matrix area of 5×5 pixels including a central pixel P22 as the center. In the figure, two pixels pointed by each of the two-headed arrows are pixels to be used for subtraction.

As shown in FIG. 17, the correlation value calculation unit 32 calculates a difference in absolute value between the pixel values of adjacent pixels in the first diagonal direction. The correlation value calculation unit 32 calculates the average (weighted average) of the calculated absolute value differences. More specifically, the correlation value calculation unit 32 calculates the first diagonal direction correlation value Cd1_gray for a grayscale image area through the processing corresponding to the formulae below.

$$\text{sum}=\text{abs}(P00-P11)+\text{abs}(P11-P22)+\text{abs}(P22-P33)+\\\text{abs}(P33-P44)+\text{abs}(P10-P21)+\text{abs}(P21-P32)+\\\text{abs}(P32-P43)+\text{abs}(P01-P12)+\text{abs}(P12-P23)+\\\text{abs}(P23-P34)$$

$$Cd1\_\text{gray}=\text{sum}/5$$

(B4) Second Diagonal Direction Correlation Value Cd2_Gray for Grayscale Image

The process for calculating the second diagonal direction correlation value Cd2_gray for a grayscale image will now be described with reference to FIG. 18.

Figure 18:
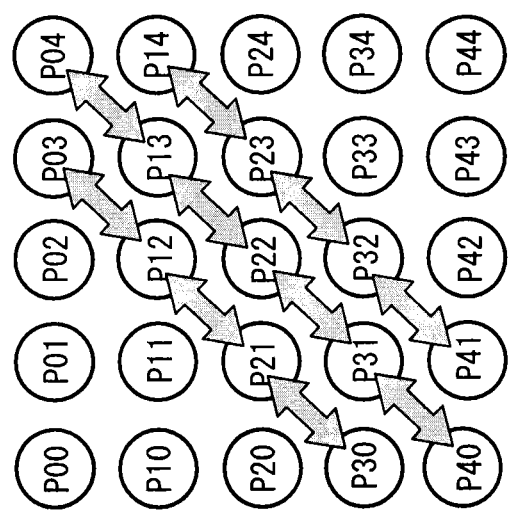
FIG. 18 is a diagram describing a process for calculating a second diagonal direction correlation value Cd2_gray intended for a grayscale image area.

FIG. 18 is a diagram describing the process for calculating the second diagonal direction correlation value Cd2_gray for a grayscale image area. FIG. 18 shows a matrix area of 5×5 pixels including a central pixel P22 as the center. In the figure, two pixels pointed by each of the two-headed arrows are pixels to be used for subtraction.

As shown in FIG. 18, the correlation value calculation unit 32 calculates a difference in absolute value between the pixel values of adjacent pixels in the second diagonal direction. The correlation value calculation unit 32 calculates the average (weighted average) of the calculated absolute value differences. More specifically, the correlation value calculation unit 32 calculates the second diagonal direction correlation value Cd2_gray for a grayscale image area through the processing corresponding to the formulae below.

$$\text{sum}=\text{abs}(P04-P13)+\text{abs}(P13-P22)+\text{abs}(P22-P31)+\\\text{abs}(P31-P40)+\text{abs}(P03-P12)+\text{abs}(P12-P21)+\\\text{abs}(P21-P30)+\text{abs}(P14-P23)+\text{abs}(P23-P32)+\\\text{abs}(P32-P41)$$

$$Cd2\_\text{gray}=\text{sum}/5$$

The process shown in FIG. 15 (the process for calculating the vertical direction correlation value for a grayscale image area) and the process shown in FIG. 16 (the process for calculating the horizontal direction correlation value for a grayscale image area) differ from the process shown in FIG. 17 (the process for calculating the first diagonal direction correlation value for a grayscale image area) and the process shown in FIG. 18 (the process for calculating the second diagonal direction correlation value for a grayscale image area) in the distance between the pixels to be used for subtraction. The above calculations do not include multiplication by coefficients to correct the differing distances between pixels because such differences are not very large. Alternatively, the above process (the process for calculating the grayscale image area correlation value) may include weighting of the pixel difference values in accordance with the distances between pixels (e.g., the pixel difference values may be multiplied by the second root of 2).

The correlation values for a grayscale image area are calculated using the same scale as the correlation values for a color image area to allow easy comparison between the correlation values. More specifically, the processes shown in FIGS. 15 to 18 use the distance between adjacent pixels for the distance between pixels to be processed. Thus, the formulae used in calculating the correlation values for a grayscale image area include the multiplication of each pixel difference by 2 to adjust the scale to the scale used in calculating the correlation values for a color image area. The formulae for calculating the correlation values for a grayscale image area thus include the final value of multiplication (⅙ and ⅕) that is twice the inverse of the cumulative number. However, the correlation direction in a grayscale image area is determined using only correlation values for a grayscale image area. Thus, this determination may not need such scale adjustment.

The correlation values for a color image area (Cv_color, Ch_color, Cd1_color, and Cd2_color) and the correlation values for a grayscale image area (Cv_gray, Ch_gray, Cd1_gray, and Cd2_gray) calculated by the correlation value calculation unit 32 as described above are output to the pixel interpolation method determination unit 33.

1.2.3 Processing Performed by Interpolation Method Determination Unit 33
Selecting Correlation Determination Method and Pixel Interpolation Method The pixel interpolation method determination unit 33 selects a correlation determination method and a pixel interpolation method for each pixel based on the relationship between the color saturation evaluation coefficient KL calculated by the color saturation evaluation value calculation unit 31 and the thresholds TH1 and TH2 (TH1≤TH2).

More specifically, selecting the correlation determination method refers to selecting from (1) determining the correlation direction using the correlation values for a grayscale image area, (2) determining the correlation direction using the correlation values for a color image area, or (3) determining the correlation direction using the correlation values selected based on combinations of the grayscale image area correlation values and the color image area correlation values.

Selecting the pixel interpolation method refers to selecting either a pixel interpolation method intended for a grayscale image area or a pixel interpolation method intended for a color image area.

Figure 19:
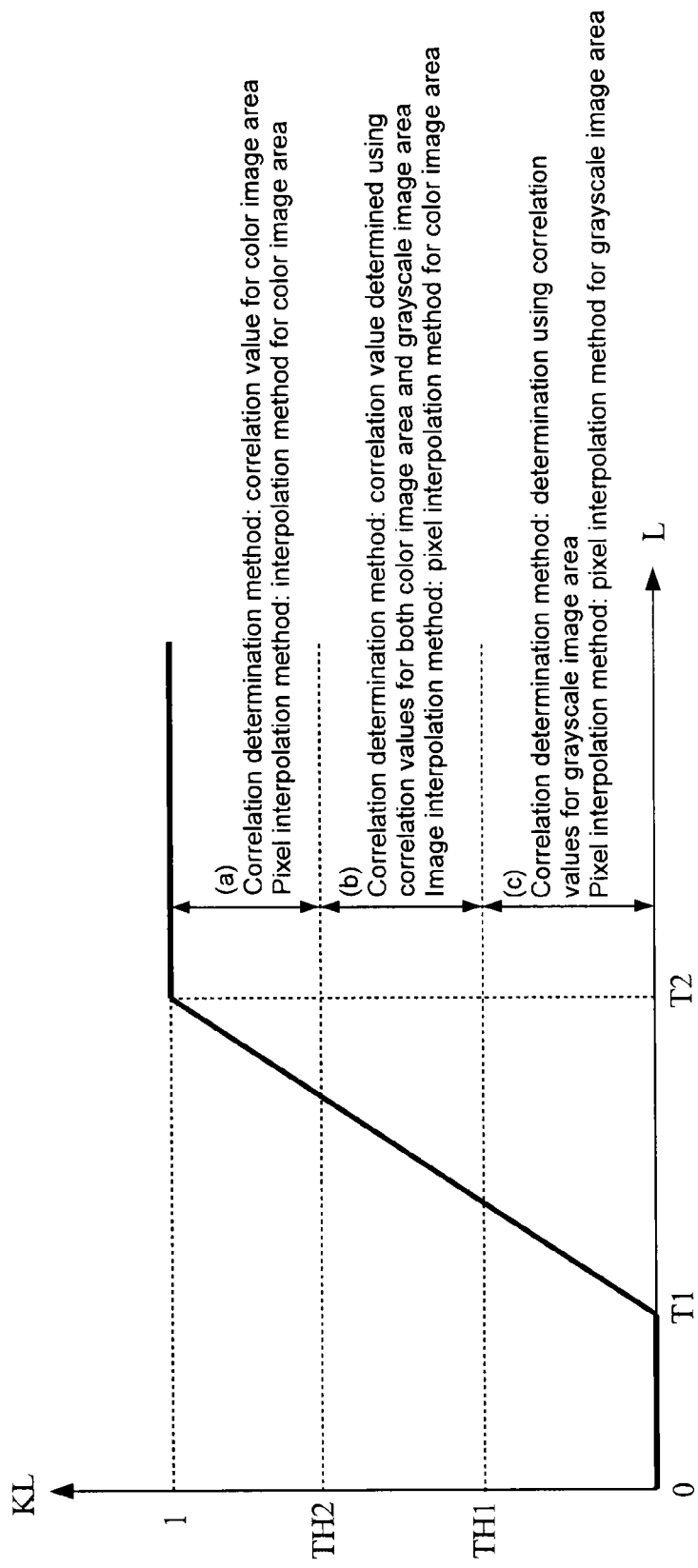
FIG. 19 shows combinations of correlation determination methods and pixel interpolation methods to be selected based on the relationship between a color saturation evaluation coefficient KL and thresholds TH1 and TH2.

FIG. 19 shows combinations of correlation determination methods and pixel interpolation methods to be selected based on the relationship between the color saturation evaluation coefficient KL and the thresholds TH1 and TH2. As shown in FIG. 15, the correlation determination methods and the pixel interpolation methods are specifically classified into combinations (a) to (c) described below.

(a) When KL>TH2
Correlation Determination Method: The correlation direction is determined by using the correlation values for a color image area.

Pixel Interpolation Method: The pixel interpolation method intended for a color image area is used.

(b) When TH1<KL≤TH2
Correlation Determination Method: The correlation direction is determined by using the correlation values selected based on combinations of the correlation values for a color image area and the correlation values for a grayscale image area.

Pixel Interpolation Method: The pixel interpolation method intended for a color image area is used.

(c) When KL≤TH1
Correlation Determination Method: The correlation direction is determined by using the correlation values for a grayscale image area.

Pixel Interpolation Method: The pixel interpolation method intended for a grayscale image area is used.

Information about the pixel interpolation method determined for each pixel is output from the pixel interpolation method determination unit 33 to the interpolation unit 34.

1.2.3.1—Process for Determining Correlation Direction
Selecting Correlation Values for Determination The pixel interpolation method determination unit 33 selects the correlation values Cv, Ch, Cd1, and Cd2 for determination based on (1) color image area correlation values Cv_color, Ch_color, Cd1_color, and Cd2_color in four directions and (2) grayscale image area correlation values Cv_gray, Ch_gray, Cd1 gray, and Cd2_gray in four directions, which are calculated by the correlation value calculation unit 32. The correlation values for determination are used to determine the correlation direction of a target pixel (processing target pixel) (the correlation direction to be referenced in pixel interpolation processing).

(a) Determination Correlation Values when KL>TH2

The pixel interpolation method determination unit 33 uses the correlation values intended for a color image area as the correlation values Cv, Ch, Cd1, and Cd2 for determination. More specifically, the pixel interpolation method determination unit 33 uses the values as described below.

$Cv = Cv\_color$ $Ch = Ch\_color$ $Cd1 = Cd1\_color$ $Cd2 = Cd2\_color$ (c) Determination Correlation Values when KL≤TH1

The pixel interpolation method determination unit 33 uses the correlation values intended for a grayscale image area as the correlation values Cv, Ch, Cd1, and Cd2 for determination. More specifically, the pixel interpolation method determination unit 33 uses the values as described below.

$Cv = Cv\_gray$ $Ch = Ch\_gray$ $Cd1 = Cd1\_gray$ $Cd2 = Cd2\_gray$ (b) Determination Correlation Values when TH1<KL≤TH2

In this case, the pixel interpolation method determination unit 33 uses the correlation values intended for a grayscale image area and the correlation values intended for a color image area in combination to determine the correlation values Cv, Ch, Cd1, and Cd2 for determination. This method for determining the correlation values will now be described with reference to the flowcharts of FIGS. 20 and 21.

Figure 20:
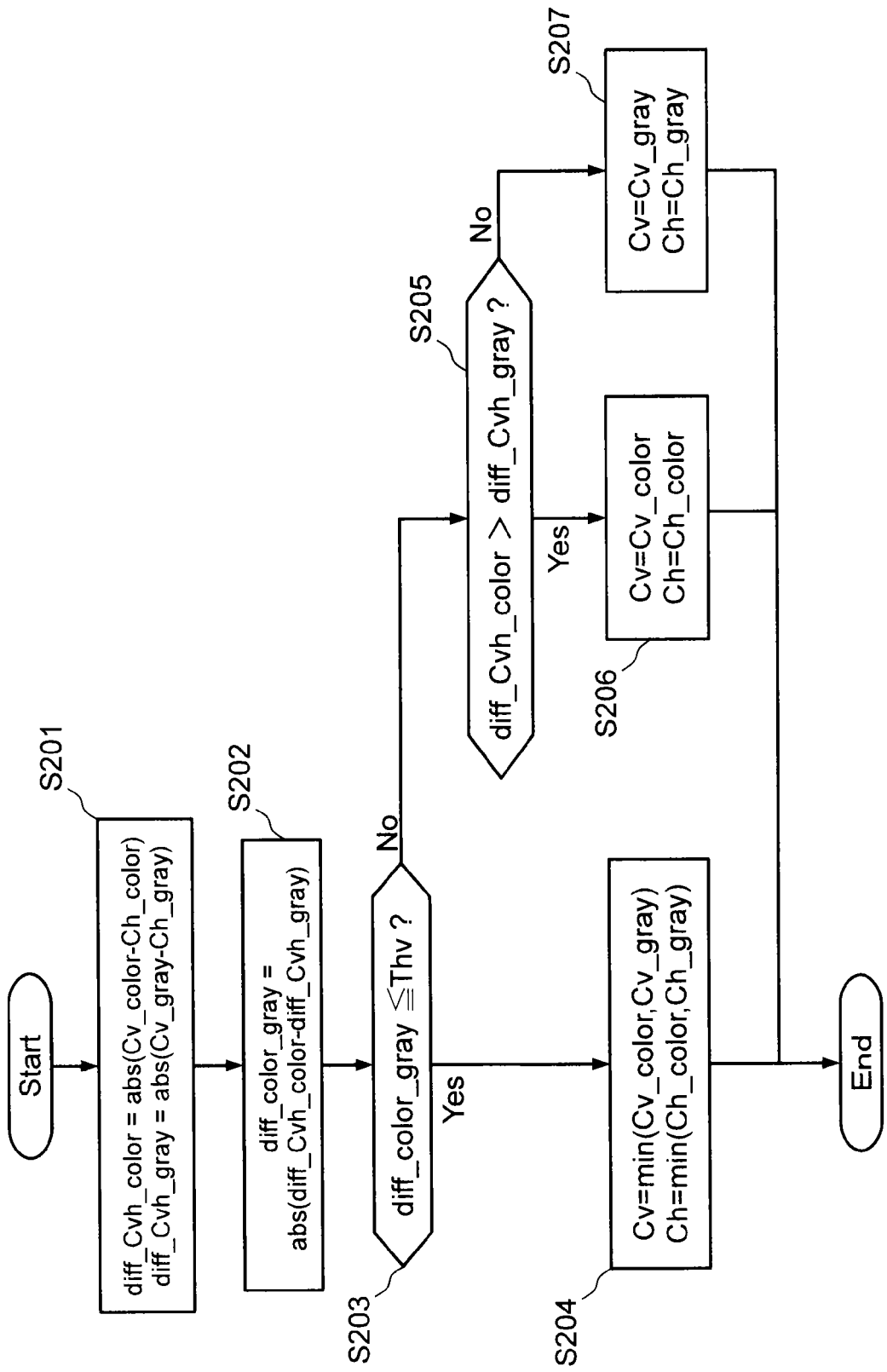
FIG. 20 is a flowchart of a method for calculating correlation values Cv and Ch used for determination.

The method for determining the determination correlation values Cv and Ch will first be described with reference to the flowchart of FIG. 20.

S201:

In step S201, the pixel interpolation method determination unit 33 calculates an absolute value diff_Cvh_color of a difference between the correlation values Cv_color and Ch_color intended for a color image area with the formula below.

diff_Cvh_color=abs(Cv_color−Ch_color)

The pixel interpolation method determination unit 33 further calculates an absolute value diff_Cvh_gray of a difference between the correlation values Cv_gray and Ch_gray intended for a grayscale image area with the formula below.

diff_Cvh_gray=abs(Cv_gray−Ch_gray)

S202:

In step S202, the pixel interpolation method determination unit 33 calculates an absolute value diff_color_gray of a difference between the difference absolute value diff_Cvh_color and the difference absolute value diff_Cvh_gray with the formula below.

diff_color_gray=abs(diff_Cvh_color−diff_Cvh_gray)

S203:

In step S203, the pixel interpolation method determination unit 33 compares the difference absolute value diff_color_gray calculated in step S202 with the threshold Thv.

When diff_color_gray≤Thv, the pixel interpolation method determination unit 33 advances the processing to step S204. In any other cases, the pixel interpolation method determination unit 33 advances the processing to step S205.

S204:

In step S204, the pixel interpolation method determination unit 33 obtains the determination correlation values Cv and Ch through the processing corresponding to the formulae below.

Cv=min(Cv_color,Cv_gray)

Ch=min(Ch_color,Ch_gray)

In these formulae, min( ) is a function that returns a minimum value of the elements.

S205 to S207:

In step S205, the pixel interpolation method determination unit 33 determines whether the difference absolute value diff_Cvh_color is greater than the difference absolute value diff_Cvh_gray.

When diff_Cvh_color>diff_Cvh_gray, the pixel interpolation method determination unit 33 sets Cv=Cv_color and Ch=Ch_color (step S206).

In any cases other than when diff_Cvh_color>diff_Cvh_gray, the pixel interpolation method determination unit 33 sets Cv=Cv_gray and Ch=Ch_gray (step S207).

Through the above processing, the pixel interpolation method determination unit 33 selects (determines) the determination correlation values Cv and Ch.

When the difference absolute value diff_color_gray is equal to or less than the threshold THv in the above processing, the difference between the difference absolute value diff_Cvh_color and the difference absolute value diff_Cvh_gray is small. This condition may be satisfied when no strong correlation is detected in the vertical direction and the horizontal direction.

In this case, the pixel interpolation method determination unit 33 compares the correlation values intended for a grayscale image area and intended for a color image area for each of the vertical direction and the horizontal direction, and selects the smaller correlation value or specifically selects the value indicating a higher correlation (step S204).

When the difference absolute value diff_color_gray is greater than the threshold THv in the above processing, the difference between the difference absolute value diff_Cvh_color and the difference absolute value diff_Cvh_gray is large. This condition may be satisfied when a strong correlation is detected in either the vertical direction or the horizontal direction.

In this case, the pixel interpolation method determination unit 33 compares the difference absolute value diff_Cvh_color and the difference absolute value diff_Cvh_gray, and selects the correlation value with a greater difference absolute value (steps S205 to S207).

Figure 21:
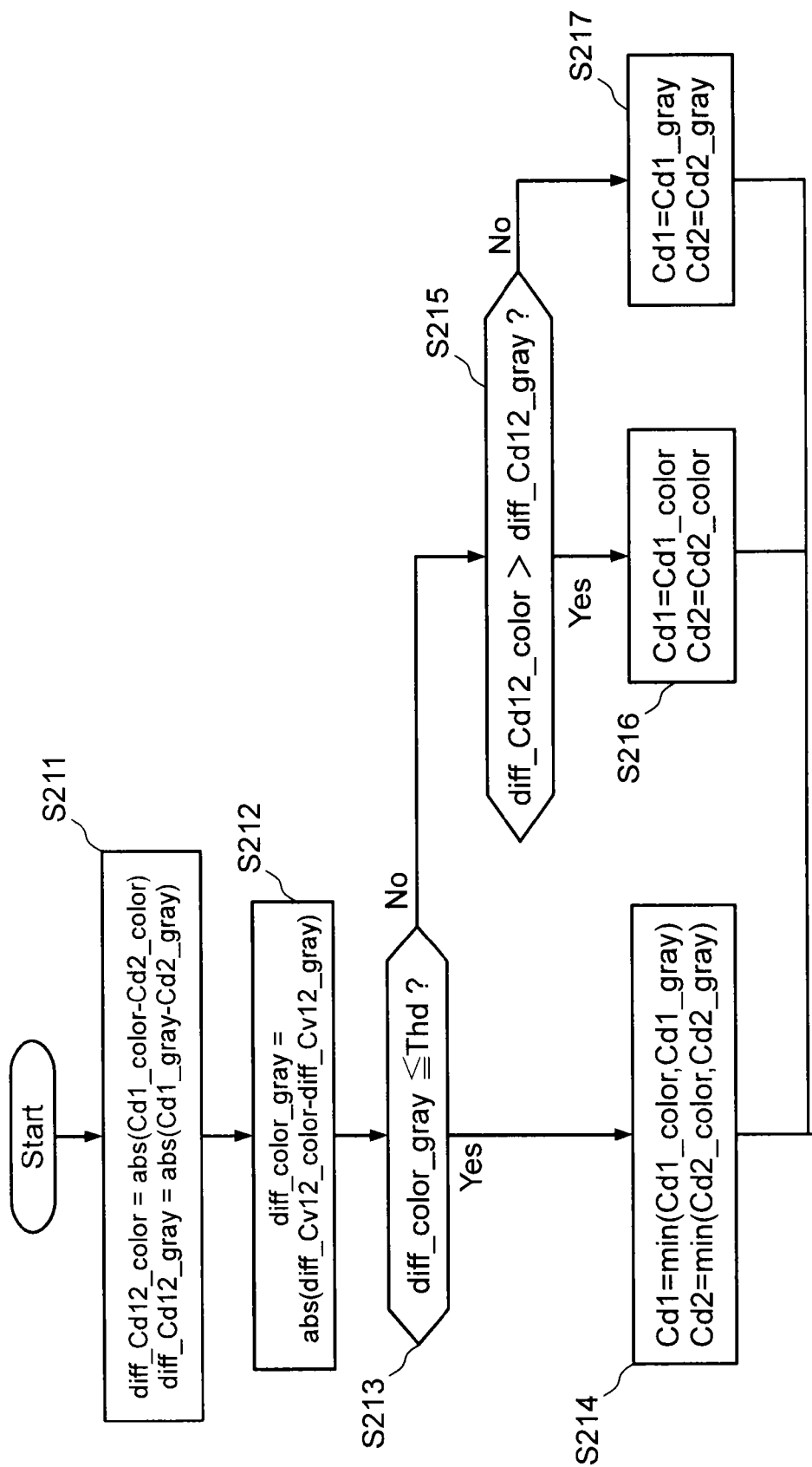
FIG. 21 is a flowchart of a method for calculating correlation values Cd1 and Cd2 used for determination.

The method for determining the determination correlation values Cd1 and Cd2 will now be described with reference to the flowchart of FIG. 21.

S211:

In step S211, the pixel interpolation method determination unit 33 calculates the difference absolute value diff_Cd12_color between the correlation values Cd1_color and Cd2_color for a color image area with the formula below.

diff_Cd12_color=abs(Cd1_color−Cd2_color)

The pixel interpolation method determination unit 33 further calculates an absolute value diff_Cd12_gray of a difference between the correlation values Cd1_gray and Cd2_gray for a grayscale image area with the formula below.

diff_Cd12_gray=abs(Cd1_gray−Cd2_gray)

S212:

In step S212, the pixel interpolation method determination unit 33 calculates an absolute value diff_color_gray of a difference between the difference absolute value diff_Cd12_color and the difference absolute value diff_Cd12_gray with the formula below.

diff_color_gray=abs(diff_Cd12_color−diff_Cd12_gray)

S213:

In step S213, the pixel interpolation method determination unit 33 compares the difference absolute value diff_color_gray calculated in step S212 with the threshold Thd.

When diff_color_gray≤Thd, the pixel interpolation method determination unit 33 advances the processing to step S214. In any other cases, the pixel interpolation method determination unit 33 advances the processing to step S215.

S214:

In step S214, the pixel interpolation method determination unit 33 obtains the determination correlation values Cd1 and Cd2 through the processing corresponding to the formulae below.

Cd1=min(Cd1_color,Cd1_gray)

Cd2=min(Cd2_color,Cd2_gray)

In these formulae, min( ) is a function that returns a minimum value of the elements.

S215 to S217:

In step S215, the pixel interpolation method determination unit 33 compares the difference absolute value diff_Cd12_color with the difference absolute value diff_Cd12_gray.

When diff_Cd12_color>diff_Cd12_gray, the pixel interpolation method determination unit 33 sets Cd1 and Cd2 to satisfy the following: Cd1=Cd1_color and Cd2=Cd2_color (step S216).

In any cases other than when diff_Cd12_color>diff_Cd12_gray, the pixel interpolation method determination unit 33 sets Cd1 and Cd2 to satisfy the following: Cd1=Cd1_gray and Cd2=Cd2_gray (step S217).

Through the above processing, the pixel interpolation method determination unit 33 selects (determines) the determination correlation values Cd1 and Cd2.

When the difference absolute value diff_color_gray is equal to or less than the threshold THd in the above processing, the difference between the difference absolute value diff_Cd12_color and the difference absolute value diff_Cd12_gray is small. This condition may be satisfied when no strong correlation is detected in the first diagonal direction and the second diagonal direction.

In this case, the pixel interpolation method determination unit 33 compares the correlation values intended for a grayscale image area and the correlation values intended for a color image area for each of the first diagonal direction and the second diagonal direction, and selects the smaller correlation value or specifically selects the value indicating a higher correlation (step S214).

When the difference absolute value diff_color_gray is greater than the threshold THd in the above processing, the difference between the difference absolute value diff_Cd12_color and the difference absolute value diff_Cd12_gray is large. This condition may be satisfied when a strong correlation is detected in either the first diagonal direction or the second diagonal direction.

In this case, the pixel interpolation method determination unit 33 compares the difference absolute value diff_Cd12_color with the difference absolute value diff_Cd12_gray, and selects the correlation value with a greater difference absolute value (steps S215 to S217).

Through the above processing, the pixel interpolation method determination unit 33 uses the correlation values intended for a grayscale image area and the correlation values intended for a color image area in combination to determine the determination correlation values Cv, Ch, Cd1, and Cd2 (the determination correlation values when TH1<KL≤TH2).

Through the above calculations, the pixel interpolation method determination unit 33 selects (determines) the determination correlation values Cv, Ch, Cd1, and Cd2 in each of the above cases (a), (b), and (c).

As described above, the correlation determination methods and the pixel interpolation methods are classified into three patterns based on the relationship between the evaluation coefficient KL and the thresholds TH1 and TH2. Unlike a method using one threshold to determine a grayscale image area (image area with low color saturation) and a color image area (image area with high color saturation), this method using the two thresholds TH1 and TH2 reduces sudden changes of the pixel interpolation processing method in a boundary area between a grayscale image area and a color image area. This effectively reduces perceived strangeness that may occur in an image area around the boundary between a grayscale image area and a color image area in an image that has undergone pixel interpolation processing.

An image area around the boundary between a grayscale image area and a color image area contains RGB components with substantially equal values, which may vary only slightly. The correlations are thus determined by focusing on such small variations between the R, G, and B components. The calculation of correlation values thus uses pixels arranged nearest possible to one another without differentiating the R, G, and B components. Alternatively, the calculation may focus on any variations between the R, G, and B components to calculate the correlation values by differentiating the R, G, and B components. These two approaches are used in combination to select optimum correlation values. This improves the accuracy of determination of the correlation direction. In contrast, pixel interpolation neglecting variations between the RGB components and assuming the image as a grayscale image area may cause false colors. To prevent this, the imaging apparatus 1000 performs pixel interpolation processing intended for a color image area.

For convenience of processing, the present embodiment uses the color saturation evaluation coefficient KL, which is obtained by normalizing the color saturation evaluation value L, and compares the color saturation evaluation coefficient KL with the thresholds TH1 and TH2 to determine whether the image area is a grayscale image area or a color image area. The embodiment simply needs comparing between the color saturation evaluation value L and the two thresholds to determine whether the image area is a grayscale image area or a color image area.

Process for Determining Correlation Direction for Each Pixel

Figure 22:
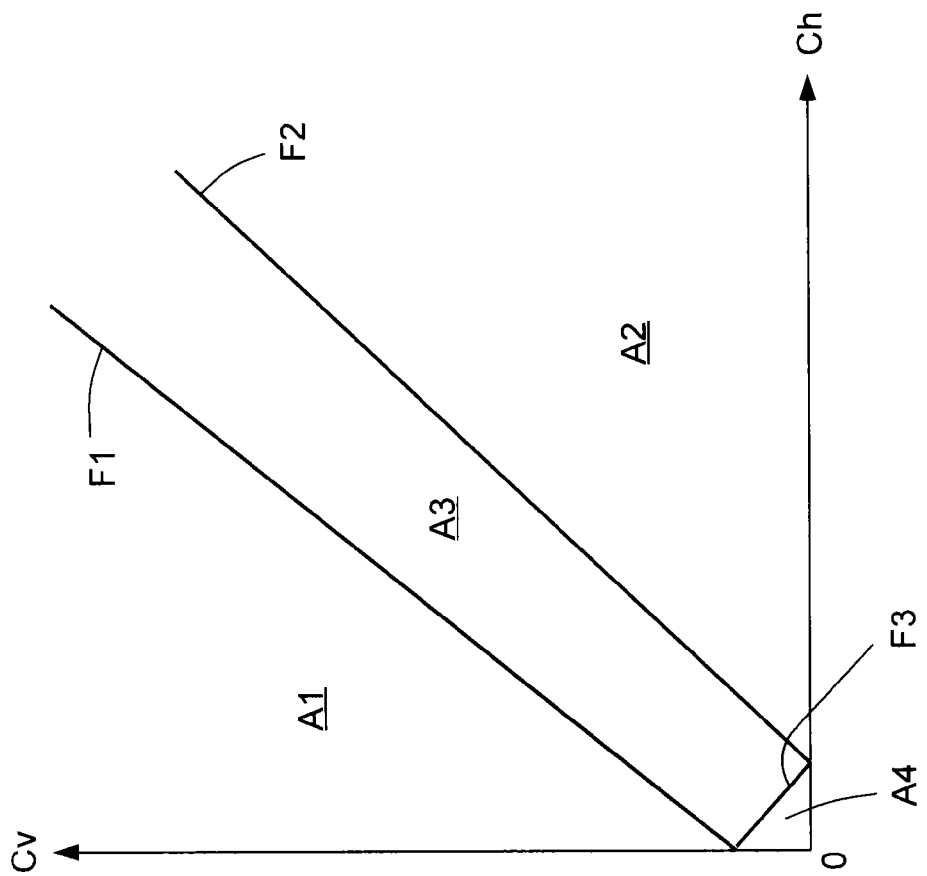
FIG. 22 is a relationship diagram determining the direction of correlation based on the correlation values Cv and Ch used for determination.
Figure 23:
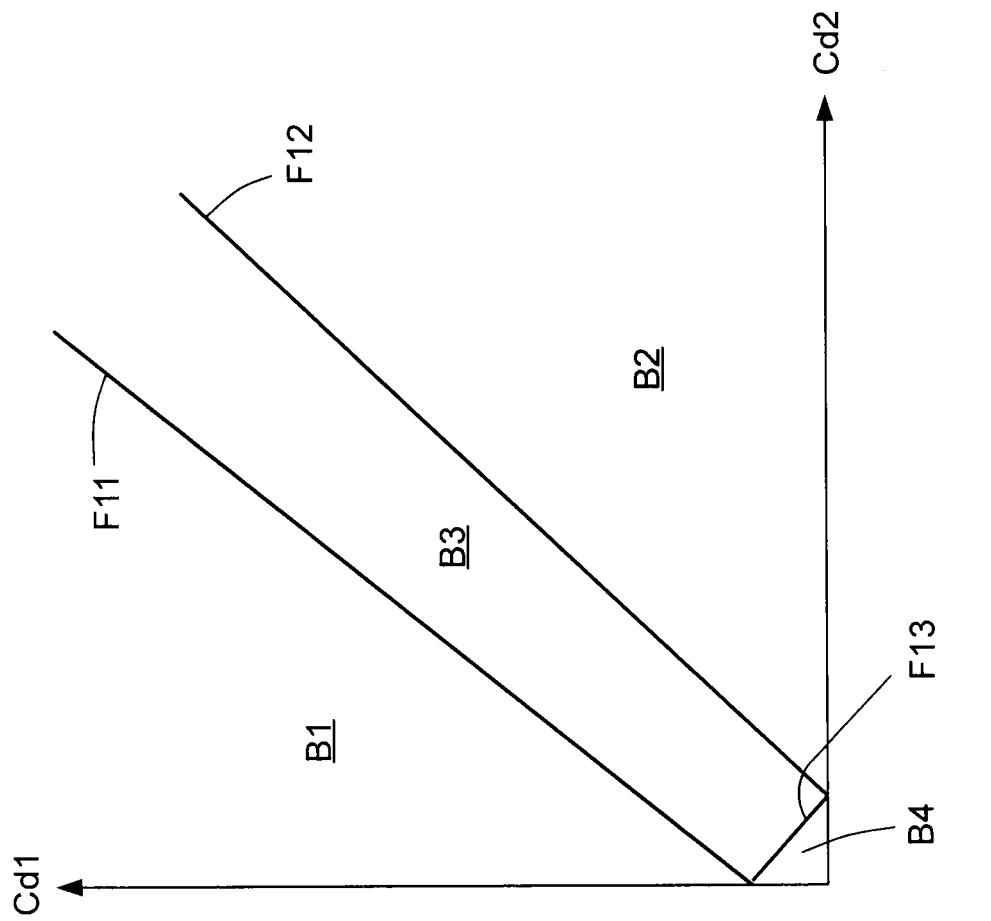
FIG. 23 is a relationship diagram determining the direction of correlation based on the correlation values Cd1 and Cd2 used for determination.

The pixel interpolation method determination unit 33 determines the correlation direction for each pixel using the determination correlation values Cv, Ch, Cd1, and Cd2 calculated through the above processing based on the relationship diagram of FIG. 22 or FIG. 23.

FIG. 22 is a diagram showing the relationship between the determination correlation values Ch and Cv and the areas A1 to A4 for determining the correlation direction. In FIG. 22, the horizontal axis (X axis) indicates the determination correlation value Ch, and the vertical axis (Y axis) indicates the determination correlation value Cv. As shown in FIG. 22, the correlation direction determination areas A1 to A4 are defined by straight lines F1 to F4. The correlation direction determination area A1 is defined by the Y axis and the straight line F1. The correlation direction determination area A2 is defined by the X axis and the straight line F2. The correlation direction determination area A3 is defined by the straight lines F1, F2, and F3. The correlation direction determination area A4 is defined by the X axis, the Y axis, and the straight line F3.

FIG. 23 is a diagram showing the relationship between the determination correlation values Cd1 and Cd2 and the areas B1 to B4 for determining the correlation direction. In FIG. 23, the horizontal axis (X axis) indicates the determination correlation value Cd2, and the vertical axis (Y axis) indicates the determination correlation value Cd1. As shown in FIG. 23, the correlation direction determination areas B1 to B4 are defined by straight lines F11 to F14. The correlation direction determination area B1 is defined by the Y axis and the straight line F11. The correlation direction determination area B2 is defined by the X axis and the straight line F12. The correlation direction determination area B3 is defined by the straight lines F11, F12, and F13. The correlation direction determination area B4 is defined by the X axis, the Y axis, and the straight line F13.

The pixel interpolation method determination unit 33 determines the correlation direction for each pixel using the determination correlation values Cv, Ch, CdA, and CdB calculated through the above processing based on the relationship diagram of FIG. 22 or FIG. 23 through the processing (1) and (2) described below.

(1) The pixel interpolation method determination unit 33 compares the four determination correlation values Cv, Ch, Cd1, and Cd2 for each pixel. When the determination correlation value Cv or the determination correlation value Ch is a minimum value among the four values, or in other words when Cv=min(Cv, Ch, Cd1, Cd2 or Ch=min(Cv, Ch, Cd1, Cd2), the pixel interpolation method determination unit 33 determines the correlation direction based on the relationship diagram of FIG. 22.

More specifically, when the point corresponding to the determination correlation value (coordinate point (Ch, Cv)) is included in the area A1, the pixel interpolation method determination unit 33 determines the correlation direction of the target pixel as the horizontal direction.

When the point corresponding to the determination correlation value (coordinate point (Ch, Cv)) is included in the area A2, the pixel interpolation method determination unit 33 determines the correlation direction of the target pixel as the vertical direction.

When the point corresponding to the determination correlation value (coordinate point (Ch, Cv)) is included in the area A4, the pixel interpolation method determination unit 33 determines that the target pixel has high correlation in both of the vertical and horizontal directions.

(2) The pixel interpolation method determination unit 33 compares the four determination correlation values Cv, Ch, Cd1, Cd2 for each pixel. When the determination correlation value Cd1 or the determination correlation value Cd2 is a minimum value of the four values, or in other words when Cd1=min(Cv, Ch, Cd1, Cd2) or when Cd2=min(Cv, Ch, Cd1, Cd2), the pixel interpolation method determination unit 33 determines the correlation direction based on the relationship diagram of FIG. 23.

When the point corresponding to the determination correlation value (coordinate point (Cd2, Cd1)) is included in the area B1, the pixel interpolation method determination unit 33 determines the correlation direction of the target pixel as the second diagonal direction (d2 direction).

When the point corresponding to the determination correlation value (coordinate point (Cd2, Cd1)) is included in the area B2, the pixel interpolation method determination unit 33 determines the correlation direction of the target pixel as the first diagonal direction (d1 direction).

When the point corresponding to the determination correlation value (coordinate point (Cd2, Cd1)) is included in the area B3, the pixel interpolation method determination unit 33 determines that the target pixel has correlation in none of the directions.

When the point corresponding to the determination correlation value (coordinate point (Cd2, Cd1)) is included in the area B4, the pixel interpolation method determination unit 33 determines that the target pixel has high correlation in both of the vertical and horizontal directions.

As described above, the determination result of the correlation direction for each pixel is output from the pixel interpolation method determination unit 33 to the interpolation unit 34.

Information about the pixel interpolation method determined for each pixel (the pixel interpolation method intended for a color image area or the pixel interpolation method intended for a grayscale image area) is also output from the pixel interpolation method determination unit 33 to the interpolation unit 34.

The above relationship diagram is a mere example, and may be a relationship diagram having areas defined by other straight lines.

1.2.4 Processing by Interpolation Unit 34

The interpolation unit 34 performs pixel interpolation processing for each pixel on an image D_raw output from the signal processing unit 2 based on (1) the correlation direction and (2) the pixel interpolation method determined for each pixel by the pixel interpolation method determination unit 33.

1.2.4.1 Pixel Interpolation Processing for Grayscale Image Area

When the pixel interpolation method for the target pixel determined by the pixel interpolation method determination unit 33 is the pixel interpolation method intended for a grayscale image area, the interpolation unit 34 performs pixel interpolation processing by using a pixel located in the correlation direction determined by the pixel interpolation method determination unit 33 without differentiating the color component of the target pixel. The specific processing for the pixel interpolation corresponding to the pixel interpolation method intended for a grayscale image area, which is performed by the interpolation unit 34, will now be described.

Area A1: Horizontal Direction Pixel Interpolation (Grayscale Image Area)

When the pixel interpolation method for the target pixel determined by the pixel interpolation method determination unit 33 is the pixel interpolation method intended for a grayscale image area and the correlation direction for the target pixel determined by the pixel interpolation method determination unit 33 is the horizontal direction, the interpolation unit 34 performs the pixel interpolation processing for the target pixel through the processing corresponding to the formula below.

$$Sout=(P21+2\times P22+P23)/4$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

Area A2: Vertical Direction Pixel Interpolation (Grayscale Image Area)

When the pixel interpolation method for the target pixel determined by the pixel interpolation method determination unit 33 is the pixel interpolation method intended for a grayscale image area and the correlation direction for the target pixel determined by the pixel interpolation method determination unit 33 is the vertical direction, the interpolation unit 34 performs the pixel interpolation processing for the target pixel through the processing corresponding to the formula below.

$$Sout=(P12+2\times P22+P32)/4$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

Area B2: First Diagonal Direction Pixel Interpolation (Grayscale Image Area)

When the pixel interpolation method for the target pixel determined by the pixel interpolation method determination unit 33 is the pixel interpolation method intended for a grayscale image area and the correlation direction for the target pixel determined by the pixel interpolation method determination unit 33 is the first diagonal direction, the interpolation unit 34 performs the pixel interpolation processing for the target pixel through the processing corresponding to the formula below.

$$Sout=(P11+2\times P22+P33)/4$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

Area B1: Second Diagonal Direction Pixel Interpolation (Grayscale Image Area)

When the pixel interpolation method for the target pixel determined by the pixel interpolation method determination unit 33 is the pixel interpolation method intended for a grayscale image area and the correlation direction for the target pixel determined by the pixel interpolation method determination unit 33 is the second diagonal direction, the interpolation unit 34 performs the pixel interpolation processing for the target pixel through the processing corresponding to the formula below.

$$Sout=(P13+2\times P22+P31)/4$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

Areas A3 and B3: Median Interpolation (Grayscale Image Area)

When the pixel interpolation method for the target pixel determined by the pixel interpolation method determination unit 33 is the pixel interpolation method intended for a grayscale image area and the target pixel is determined by the pixel interpolation method determination unit 33 to have correlation in none of the directions, the interpolation unit 34 performs the pixel interpolation processing for the target pixel through the processing corresponding to the formula below.

$$Sout=P22$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

Areas A4 and B4: Average Interpolation (Grayscale Image Area)

When the pixel interpolation method for the target pixel determined by the pixel interpolation method determination unit 33 is the pixel interpolation method intended for a grayscale image area and the target pixel is determined by the pixel interpolation method determination unit 33 to have high correlation in both of the vertical and horizontal directions, the interpolation unit 34 performs the pixel interpolation processing for the target pixel through the processing corresponding to the formula below.

$$Sout=(P11+P12+P13+P21+P22+P23+P31+P32+P33)/9$$

The interpolation unit 34 sets the value of each color component that is not contained in the target pixel as Sout. When, for example, the target pixel P22 is a G-pixel, R(P22)=B(P22)=W(P22)=Sout, where R(P22) is the value of the R-component, B(P22) is the value of the B-component, and W(P22) is the value of the W-component for the target pixel.

1.2.4.2 Pixel Interpolation Processing for Color Image Area

When the pixel interpolation method for the target pixel determined by the pixel interpolation method determination unit 33 is the pixel interpolation method intended for a color image area, the interpolation unit 34 performs pixel interpolation processing by using a pixel located in the correlation direction determined by the pixel interpolation method determination unit 33. The specific processing for the pixel interpolation will now be described.

Horizontal Direction Pixel Interpolation (Color Image Area)

When the pixel interpolation method for the target pixel determined by the pixel interpolation method determination unit 33 is the pixel interpolation method intended for a color image area and the correlation direction for the target pixel determined by the pixel interpolation method determination unit 33 is the horizontal direction, the interpolation unit 34 performs the pixel interpolation processing for the target pixel through the processing corresponding to the formula below. After the pixel interpolation processing, the target pixel will have the pixel value Wout for its W-component, the pixel value Rout for its R-component, the pixel value Gout for its G-component, and the pixel value Bout for its B-component.

H-G: When the Target Pixel is G-Pixel

When the target pixel is a G-pixel, the interpolation unit 34 obtains the values Wout, Rout, Gout, and Bout through the processing described below.

Gout:

The interpolation unit 34 sets the pixel value Gout of the G-component as the pixel value P22 of the target pixel. In other words, the interpolation unit 34 sets the value as Gout=P22.

Rout:

The interpolation unit 34 performs the processing described below to obtain the pixel value Rout of the R-component. The process for obtaining (calculating) the pixel value Rout of the R-component will now be described with reference to FIG. 24.

Figure 24:
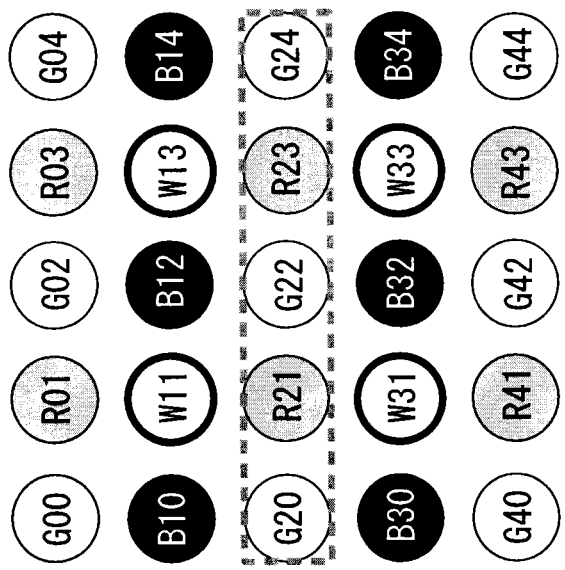
FIG. 24 is a diagram describing pixel interpolation in the horizontal direction (for a color image area) for an image area including a G-pixel in the center.

FIG. 24 shows a matrix area of 5×5 pixels including a G-pixel as its central pixel (target pixel).

The interpolation unit 34 obtains the R-component pixel value Rout using the five pixels P20 to P24 arranged in the horizontal direction with the target G-pixel 22 in the center through the processing corresponding to the formulae below.

$$t0=(P21+P23)/2$$

$$t1=(P20-2\times P22+P24)\times gain0$$

$$Rout=t0-t1$$

The meaning of the above processing will now be explained.

The G-pixel 22 has a low-frequency component G22L written below.

$$G22L=(G20+6\times G22+G24)/8.$$

Thus, the high-frequency component G22H of the G-pixel 22 is determined as written below.

$$G22H=G22-G22L=-(G20-2\times G22+G24)/8$$

The low-frequency component R22L of the red component value R22 of the pixel P22 is as written below.

$$R22L=(R21+2\times R22+R23)/4$$

Thus, the high-frequency component R22H of the red component value R22 is determined as written below.

$$R22H=R22-R22L=R22/2-(R21+R23)/4$$

When each color component for the pixel P22 is assumed to have substantially the same high-frequency component, G22H≈R22H, and thus R22/2−(R21+R23)/4≈−(G20−2×G22+G24)/8. This formula is solved for R22 as written below.

$$R22=(R21+R23)/2-(G20-2\times G22+G24)/4$$

In this formula, the term (G20−2×G22+G24) is a Laplacian component value (second order differential component value) in the horizontal direction. The red component value R22 of the pixel P22 can be calculated by subtracting the Laplacian component value multiplied by ¼ from the average of the values R21 and R23.

The interpolation unit 34 obtains the R-component pixel value Rout using the formulae below.

$$t0=(P21+P23)/2$$

$$t1=(P20-2\times P22+P24)\times \text{gain0}$$

$$Rout=t0-t1$$

When gain0 is ¼, t1 is a Laplacian component value. The interpolation unit 34 can adjust the value gain0 to adjust the Laplacian component value and thus to adjust the amount of high-frequency component of the pixel value Rout. For example, the interpolation unit 34 may adjust the value gain0 (adjust the Laplacian component value) in accordance with the optical characteristics of the imaging unit 1 (e.g., the characteristics of the optical filters included in the imaging unit 1) to perform pixel interpolation processing with a higher quality.

Bout:

The interpolation unit 34 performs the processing described below to obtain the pixel value Bout of the B-component. The process for obtaining (calculating) the pixel value Bout of the B-component will now be described with reference to FIG. 25.

Figure 25:
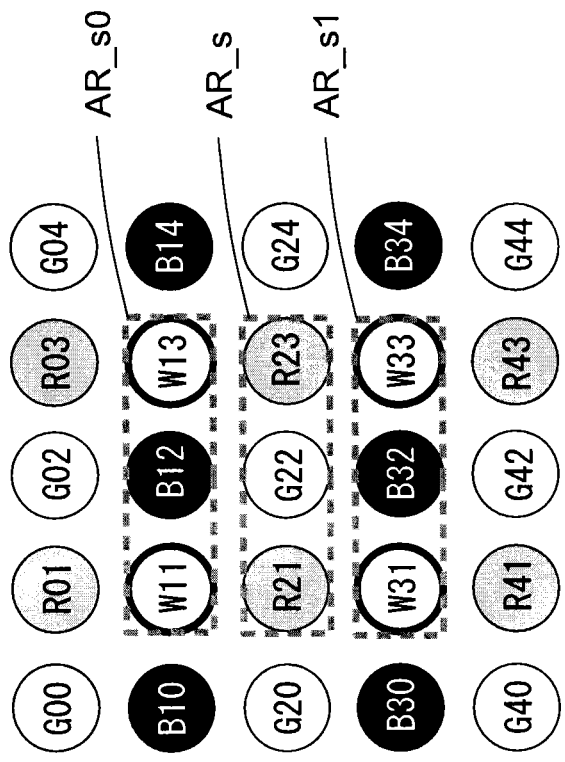
FIG. 25 is a diagram describing pixel interpolation in the horizontal direction (for a color image area) for an image area including a G-pixel in the center.

FIG. 25 shows a matrix area of 5×5 pixels including a G-pixel as its central pixel (target pixel) as in FIG. 24.

The interpolation unit 34 obtains the W−B-component value s0 of the pixel P12 using the pixels P11 to P13 included in the area AR_s0 shown in FIG. 25 through the processing corresponding to the formula below.

$$s0=-B\text{gain}\times P12+W\text{gain}\times(P11+P13)/2$$

The interpolation unit 34 also obtains the W−B-component value s (R+G-component value s) of the pixel P22 using the pixels P21 to P23 included in the area AR_s shown in FIG. 25 through the processing corresponding to the formula below.

$$s=G\text{gain}\times P22+R\text{gain}\times(P21+P23)/2$$

The interpolation unit 34 also obtains the W−B-component value s1 of the pixel P32 using the pixels P31 to P33 included in the area AR_s1 shown in FIG. 25 through the processing corresponding to the formula below.

$$s1=-B\text{gain}\times P32+W\text{gain}\times(P31+P33)/2$$

In the above formulae, Rgain, Ggain, and Bgain are gain values (the same applies hereinafter) used to calculate the value Y (luminance) from R, G, and B as written below.

$$Y=R\text{gain}\times R+G\text{gain}\times G+B\text{gain}\times B$$

$$R\text{gain}=0.299$$

$$G\text{gain}=0.587$$

$$B\text{gain}=0.114$$

In the above formula, Rgain, Ggain, and Bgain may not be completely equal to these specific values (but may be substantially equal to these values), and may allow errors depending on bit accuracy.

The interpolation unit 34 obtains the pixel value Bout of the B-component through the processing corresponding to the formulae below.

$$t0=(P12+P32)/2$$

$$t1=(s0-2\times s+s1)\times \text{gain1}$$

$$Bout=t0-t1$$

The meaning of the above processing will now be explained. For ease of explanation, a case in which the pixel value of the G-pixel 22 will be obtained when the pixel values of the pixels W21, W22, W23, G21, and G23 are known will now be described.

The W-pixel 22 has a low-frequency component W22L written below.

$$W22L=(W21+2\times W22+W23)/4.$$

Thus, the high-frequency component W22H of the W-pixel W22 is determined as written below.

$$W22H=W22-W22L=-(W21-2\times W22+W23)/4.$$

The low-frequency component G22L of the green component value G22 of the pixel P22 is as written below.

$$G22L=(G21+2\times G22+G23)/4$$

Thus, the high-frequency component G22H of the G-pixel G22 is determined as written below.

$$G22H=G22-G22L=G22/2-(G21+G23)/4$$

When each color component for the pixel P22 is assumed to have substantially the same high-frequency component, W22H≈G22H, and thus G22/2−(G21+G23)/4≈−(W21−2×W22+W23)/4. This formula is solved for G22 as written below.

$$G22=(G21+G23)/2-(W21-2\times W22+W23)/2$$

In this formula, the term (W20−2×W22+W24) is a Laplacian component value (second order differential component value) in the horizontal direction. The green component value G22 of the pixel P22 can be calculated by subtracting the Laplacian component value multiplied by ½ from the average of the values G21 and G23.

Based on the same concept, the interpolation unit 34 obtains the pixel value Bout of the B-component from the values B12, B32, s0, s, and s1.

More specifically, the interpolation unit 34 obtains the pixel value Bout of the B-component with the formulae below.

$$t0=(B12+B32)/2$$

$$t1=(s0-2\times s+s1)\times \text{gain2}$$

$$Bout=t0-t1$$

When gain2 is ½, t1 is a Laplacian component value. The interpolation unit 34 can adjust the value gain2 to adjust the Laplacian component value and thus to adjust the amount of high-frequency component in the pixel value Bout. For example, the interpolation unit 34 may adjust the value gain2 (adjust the Laplacian component value) in accordance with the optical characteristics of the imaging unit 1 (e.g., the characteristics of the optical filters included in the imaging unit 1) to perform pixel interpolation processing with a higher quality.

Wout:

The interpolation unit 34 performs the processing described below to obtain the pixel value Wout of the W-component. The process for obtaining (calculating) the pixel value Wout of the W-component will now be described with reference to FIG. 26.

Figure 26:
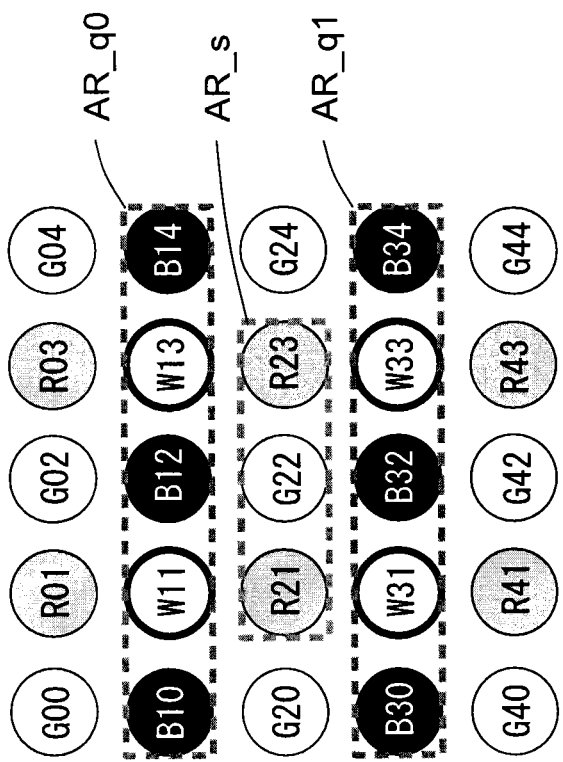
FIG. 26 is a diagram describing pixel interpolation in the horizontal direction (for a color image area) for an image area including a G-pixel in the center.

FIG. 26 shows a matrix area of 5×5 pixels including a G-pixel as its central pixel (target pixel) as in FIG. 24.

The interpolation unit 34 obtains the W-component pixel value q0 of the pixel P12 using the pixels P10 to P14 included in the area AR_q0 shown in FIG. 26 through the processing corresponding to the formula below.

$$q0=(P11+P13)/2-(B10-2\times B12+B14)\times gain3$$

The term (B10−2×B12+B14) is a Laplacian component value, and gain3 is a gain for adjusting the Laplacian component value.

The interpolation unit 34 obtains the W-component pixel value q1 of the pixel P32 using the pixels P30 to P34 included in the area AR_q1 shown in FIG. 26 through the processing corresponding to the formula below.

$$q1=(P31+P33)/2-(B30-2\times B32+B34)\times gain4$$

The term (B30−2×B32+B34) is a Laplacian component value, and gain4 is a gain for adjusting the Laplacian component value.

The interpolation unit 34 obtains the W-component pixel value Wout of the pixel P22 through the processing corresponding to the formula below.

$$Wout=(q0+q1)/2-(s0-2\times s+s1)\times gain5$$

The term (s0−2×s+s1) is a Laplacian component value, and gain5 is a gain for adjusting the Laplacian component value.

More specifically, the interpolation unit 34 obtains the W-component value Wout of the pixel P22 using the white component value q0 of the pixel P12, the white component value q1 of the pixel P32, the W−B-component value s0 of the pixel P12, the W−B-component value s of the pixel P22, and the W−B-component value s1 of the pixel P32, which are obtained based on their high correlations in the horizontal direction. The interpolation unit 34 can thus obtain an interpolated pixel value with a high accuracy (the white component value Wout of the pixel P22) using high correlations in the horizontal direction.

H-R: When the Target Pixel is R-Pixel

When the target pixel is an R-pixel, the interpolation unit 34 obtains the values Wout, Rout, Gout, and Bout through the processing described below.

Rout:

The interpolation unit 34 sets the pixel value Rout of the R-component as the pixel value P22 of the target pixel. In other words, the interpolation unit 34 sets the value as Rout=P22.

Gout:

The interpolation unit 34 performs the processing described below to obtain the pixel value Gout of the G-component. The process for obtaining (calculating) the pixel value Gout of the G-component will now be described with reference to FIG. 27.

Figure 27:
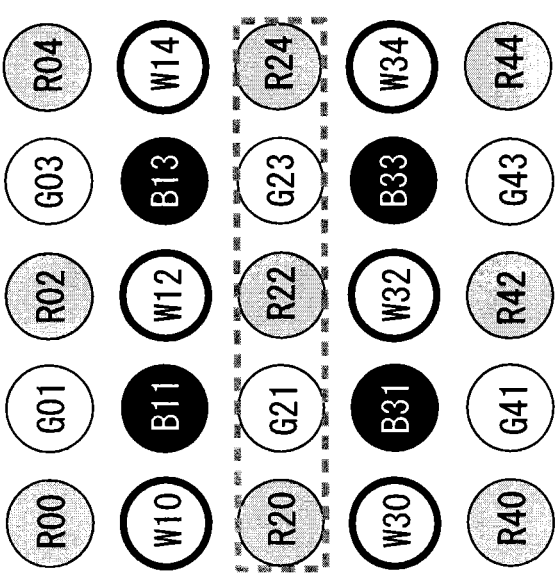
FIG. 27 is a diagram describing pixel interpolation in the horizontal direction (for a color image area) for an image area including an R-pixel in the center.

FIG. 27 shows a matrix area of 5×5 pixels including an R-pixel as its central pixel (target pixel).

The interpolation unit 34 obtains the G-component pixel value Gout of the pixel P22 using the pixels P20 to P24 through the processing described below.

$$Gout=(G21+G23)/2-(R20-2\times R22+R24)\times gain6$$

The term (R20−2×R22+R24) is a Laplacian component value, and gain6 is a gain for adjusting the Laplacian component value.

Wout:

The interpolation unit 34 obtains the W-component pixel value Wout of the pixel P22 through the processing described below.

Figure 28:
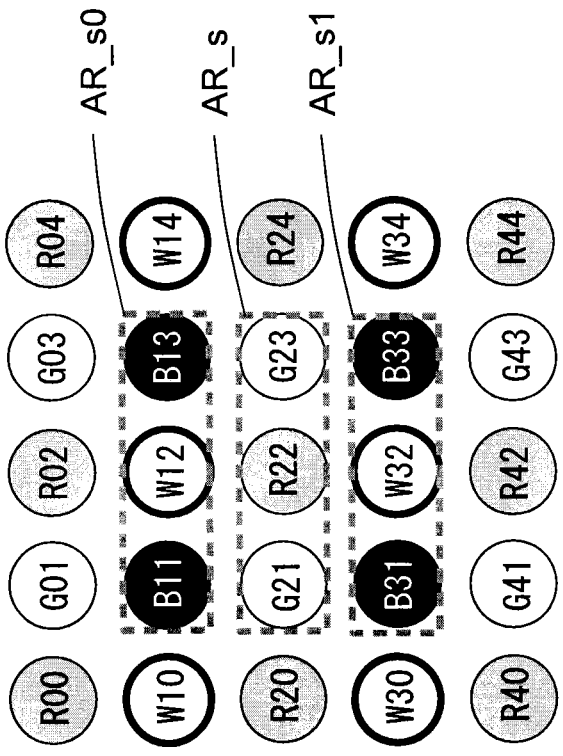
FIG. 28 is a diagram describing pixel interpolation in the horizontal direction (for a color image area) for an image area including an R-pixel in the center.

The interpolation unit 34 obtains the W−B-component value s0 of the pixel P12, the W−B-component value s of the pixel P22, and the W−B-component value s1 of the pixel P32 as shown in FIG. 28 through the processing corresponding to the formulae below.

$$s0=Wgain\times P12-Bgain\times(P11+P13)/2$$

$$s=Rgain\times P22+Ggain\times(P21+P23)/2$$

$$s1=Wgain\times P32-Bgain\times(P31+P33)/2.$$

The interpolation unit 34 obtains the W-component pixel value Wout of the pixel P22 through the processing corresponding to the formula below.

$$Wout=(W12+W32)/2-(s0-2\times s+s1)\times gain7$$

The term (s0−2×s+s1) is a Laplacian component value, and gain7 is a gain for adjusting the Laplacian component value.

Bout:

The interpolation unit 34 performs the processing described below to obtain the pixel value Bout of the B-component. The process for obtaining (calculating) the pixel value Bout of the B-component will now be described with reference to FIG. 29.

Figure 29:
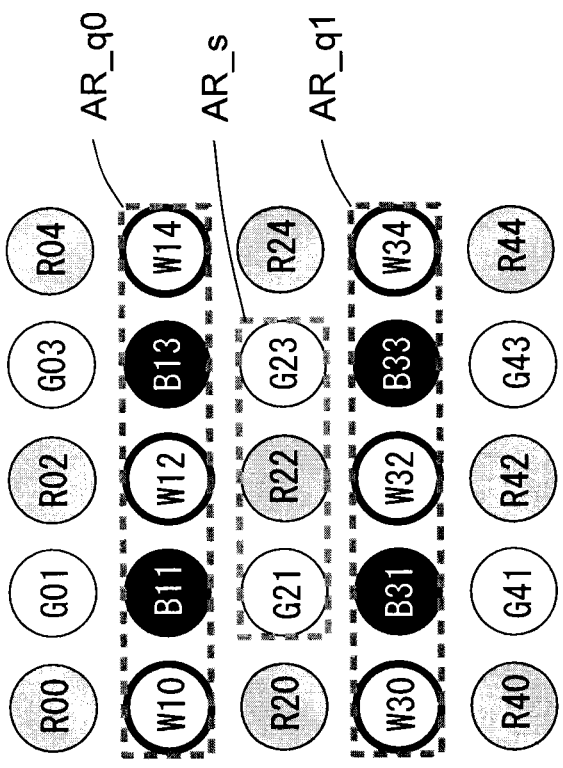
FIG. 29 is a diagram describing pixel interpolation in the horizontal direction (for a color image area) for an image area including an R-pixel in the center.

FIG. 29 shows a matrix area of 5×5 pixels including an R-pixel as its central pixel (target pixel).

The interpolation unit 34 obtains the W−B-component value s0 of the pixel P12, the W−B-component value s of the pixel P22, and the W−B-component value s1 of the pixel P32 through the processing corresponding to the formulae below.

$$s0=Wgain\times P12-Bgain\times(P11+P13)/2$$

$$s=Rgain\times P22-Ggain\times(P21+P23)/2$$

$$s1=Wgain\times P32-Bgain\times(P31+P33)/2$$

The interpolation unit 34 calculates the B-component q0 of the pixel P12 and the B-component value q1 of the pixel P32 through the processing corresponding to the formulae below.

$$q0=(B11+B13)/2-(W10-2\times W12+W14)\times gain8$$

$$q1=(B31+B33)/2-(W30-2\times W32+W34)\times gain9$$

The term (W10−2×W12+W14) is a Laplacian component value, and gain8 is a gain for adjusting the Laplacian component value. The term (W30−2×W32+W34) is a Laplacian component value, and gain9 is a gain for adjusting the Laplacian component value.

The interpolation unit 34 obtains the B-component value Bout of the pixel P22 through the processing corresponding to the formula below.

$$Bout=(q0+q1)/2-(s0-2\times s+s1)\times gain10$$

The term (s0−2×s+s1) is a Laplacian component value, and gain10 is a gain for adjusting the Laplacian component value.

H-B: When the Target Pixel is B-Pixel

When the target pixel is a B-pixel, the interpolation unit 34 obtains the values Wout, Rout, Gout, and Bout through the processing described below.

Bout:

The interpolation unit 34 sets the pixel value Bout of the B-component as the pixel value P22 of the target pixel. In other words, the interpolation unit 34 sets the value as Bout=P22.

Wout:

The interpolation unit 34 performs the processing described below to obtain the pixel value Wout of the W-component. The process for obtaining (calculating) the pixel value Wout of the W-component will now be described with reference to FIG. 30.

Figure 30:
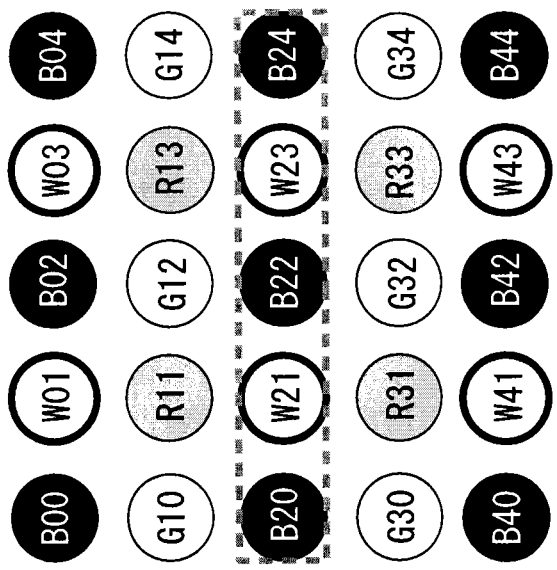
FIG. 30 is a diagram describing pixel interpolation in the horizontal direction (for a color image area) for an image area including a B-pixel in the center.

FIG. 30 shows a matrix area of 5×5 pixels including a B-pixel as its central pixel (target pixel).

The interpolation unit 34 obtains the W-component pixel value Wout of the pixel P22 using the five pixels P20 to P24 through the processing described below.

$$Wout=(W21+W23)/2-(B20-2\times B22+B24)\times gain11$$

The term (B20−2×B22+B24) is a Laplacian component value, and gain11 is a gain for adjusting the Laplacian component value.

Gout:

The interpolation unit 34 obtains the G-component value Gout of the pixel P22 through the processing described below.

Figure 31:
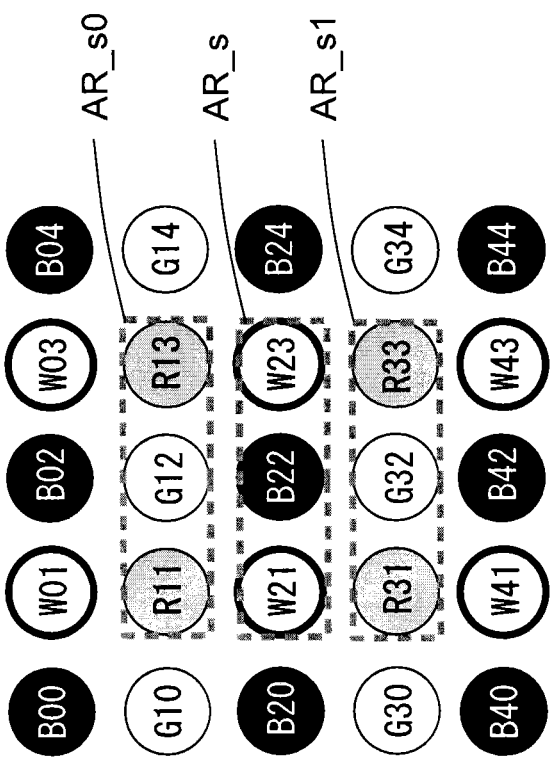
FIG. 31 is a diagram describing pixel interpolation in the horizontal direction (for a color image area) for an image area including a B-pixel in the center.

As shown in FIG. 31, the interpolation unit 34 obtains the W−B-component value s0 (R+G-component value s0) of the pixel P12, the W−B-component value s of the pixel P22, and the W−B-component value s1 (R+G-component value s1) of the pixel P32 through the processing corresponding to the formulae below.

$$s0=Ggain\times P12+Rgain\times (P11+P13)/2$$

$$s=-Bgain\times P22+Wgain\times (P21+P23)/2$$

$$s1=Ggain\times P32+Rgain\times (P31+P33)/2$$

The interpolation unit 34 obtains the G-component value Gout of the pixel P22 through the processing corresponding to the formula below.

$$Gout=(G12+G32)/2-(s0-2\times s+s1)\times gain12$$

The term (s0−2×s+s1) is a Laplacian component value, and gain12 is a gain for adjusting the Laplacian component value.

Rout:

The interpolation unit 34 performs the processing described below to obtain the R-component pixel value Rout. The process for obtaining (calculating) the R-component pixel value Rout will now be described with reference to FIG. 32.

Figure 32:
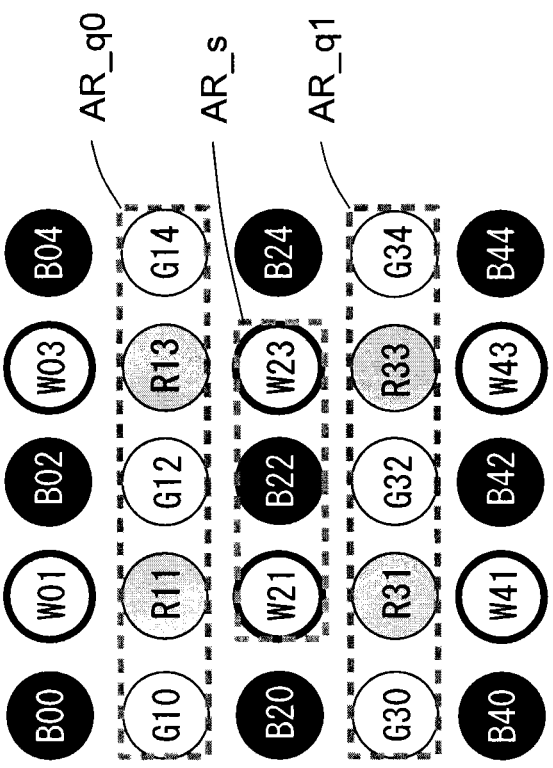
FIG. 32 is a diagram describing pixel interpolation in the horizontal direction (for a color image area) for an image area including a B-pixel in the center.

FIG. 32 shows a matrix area of 5×5 pixels including a B-pixel as its central pixel (target pixel).

The interpolation unit 34 obtains the W−B-component value s0 of the pixel P12, the W−B-component value s of the pixel P22, and the W−B-component value s1 of the pixel P32 through the processing corresponding to the formulae below.

$$s0=Ggain\times P12+Rgain\times (P11+P13)/2$$

$$s=-Bgain\times P22+Wgain\times (P21+P23)/2$$

$$s1=Ggain\times P32+Rgain\times (P31+P33)/2$$

The interpolation unit 34 calculates the R-component q0 of the pixel P12 and the R-component value q1 of the pixel P32 through the processing corresponding to the formulae below.

$$q0=(R11+R13)/2-(G10-2\times G12+G14)\times gain13$$

$$q1=(R31+R33)/2-(G30-2\times G32+G34)\times gain14$$

The term (G10−2×G12+G14) is a Laplacian component value, and gain13 is a gain for adjusting the Laplacian component value. The term (G30−2×G32+G34) is a Laplacian component value, and gain14 is a gain for adjusting the Laplacian component value.

The interpolation unit 34 obtains the R-component value Rout of the pixel P22 through the processing corresponding to the formula below.

$$Rout=(q0+q1)/2-(s0-2\times s+s1)\times gain15$$

The term (s0−2×s+s1) is a Laplacian component value, and gain15 is a gain for adjusting the Laplacian component value.

H-W: When the Target Pixel is W-Pixel

When the target pixel is a W-pixel, the interpolation unit 34 obtains the values Wout, Rout, Gout, and Bout through the processing described below.

Wout:

The interpolation unit 34 sets the pixel value Wout of the W-component as the pixel value P22 of the target pixel. In other words, the interpolation unit 34 sets the value as Wout=P22.

Bout

The interpolation unit 34 performs the processing described below to obtain the pixel value Bout of the B-component. The process for obtaining (calculating) the pixel value Bout of the B-component will now be described with reference to FIG. 33.

Figure 33:
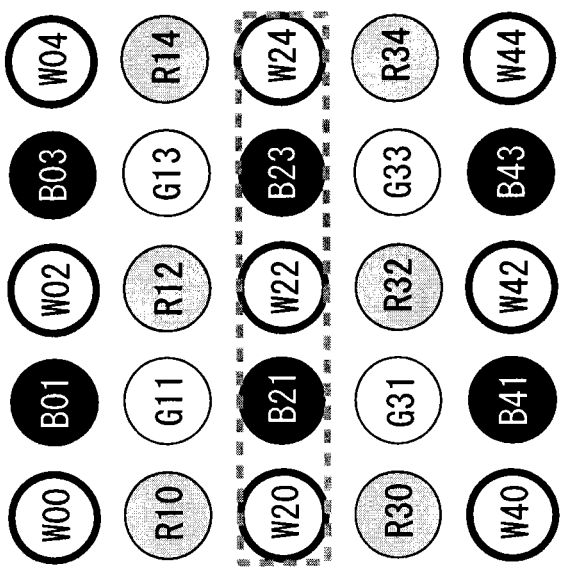
FIG. 33 is a diagram describing pixel interpolation in the horizontal direction (for a color image area) for an image area including a W-pixel in the center.

FIG. 33 shows a matrix area of 5×5 pixels including a W-pixel as its central pixel (target pixel).

The interpolation unit 34 obtains the B-component pixel value Bout of the pixel P22 using the five pixels P20 to P24 through the processing described below.

$$Bout=(B21+B23)/2-(W20-2\times W22+W24)\times gain15$$

The term (W20−2×W22+W24) is a Laplacian component value, and gain15 is a gain for adjusting the Laplacian component value.

Rout:

The interpolation unit 34 obtains the R-component value Rout of the pixel P22 through the processing described below.

Figure 34:
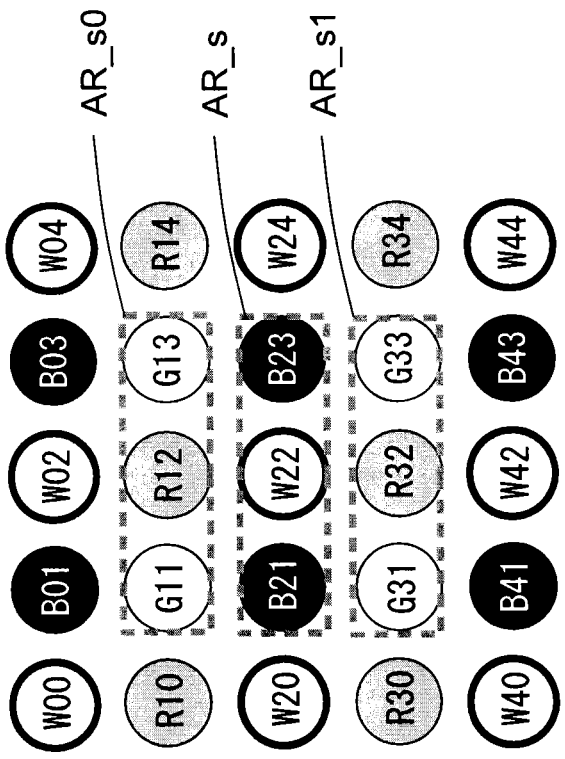
FIG. 34 is a diagram describing pixel interpolation in the horizontal direction (for a color image area) for an image area including a W-pixel in the center.

The interpolation unit 34 obtains the W−B-component value s0 (R+G-component value s0) of the pixel P12, the W−B-component value s of the pixel P22, and the W−B-component value s1 of the pixel P32 (R+G-component value s1) as shown in FIG. 34 through the processing corresponding to the formulae below.

$$s0=Rgain\times P12+Ggain\times (P11+P13)/2$$

$$s=Wgain\times P22-Bgain\times (P21+P23)/2$$

$$s1=Rgain\times P32+Ggain\times (P31+P33)/2$$

The interpolation unit 34 obtains the R-component value Rout of the pixel P22 through the processing corresponding to the formula below.

$$Rout=(R12+R32)/2-(s0-2\times s+s1)\times gain16$$

The term (s0−2×s+s1) is a Laplacian component value, and gain16 is a gain for adjusting the Laplacian component value.

Gout:

The interpolation unit 34 performs the processing described below to obtain the pixel value Gout of the G-component. The process for obtaining (calculating) the pixel value Gout of the G-component will now be described with reference to FIG. 35.

Figure 35:
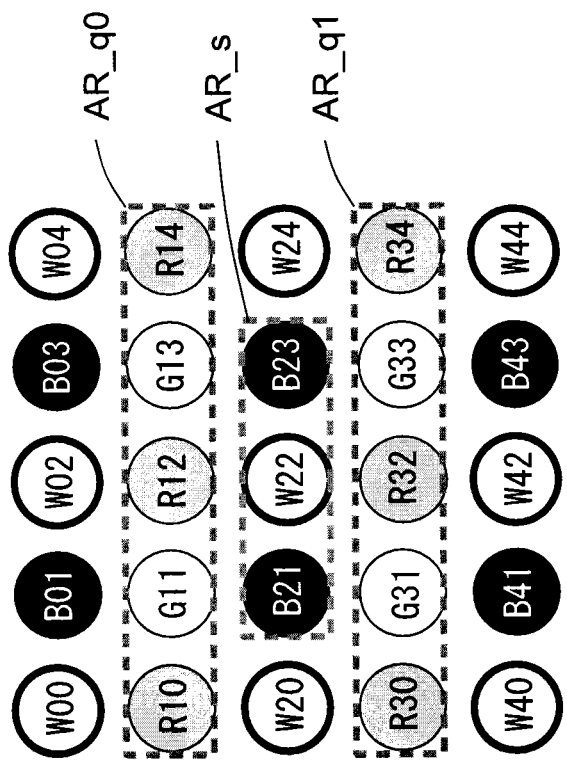
FIG. 35 is a diagram describing pixel interpolation in the horizontal direction (for a color image area) for an image area including a W-pixel in the center.

FIG. 35 shows a matrix area of 5×5 pixels including a W-pixel as its central pixel (target pixel).

The interpolation unit 34 calculates the W−B-component value s0 of the pixel P12, the W−B-component value s of the pixel P22, and the W−B-component value s1 of the pixel P32 through the processing corresponding to the formulae below.

$$s0=Rgain\times P12+Ggain\times (P11+P13)/2$$

$$s=Wgain\times P22-Bgain\times (P21+P23)/2$$

$$s1=Rgain\times P32+Ggain\times (P31+P33)/2$$

The interpolation unit 34 calculates the G-component q0 of the pixel P12 and the G-component value q1 of the pixel P32 through the processing corresponding to the formulae below.

$$q0=(G11+G13)/2-(R10-2\times R12+R14)\times gain17$$

$$q1=(G31+G33)/2-(R30-2\times R32+R34)\times gain18$$

The term (R10−2×R12+R14) is a Laplacian component value, and gain17 is a gain for adjusting the Laplacian component value. The term (R30−2×R32+R34) is a Laplacian component value, and gain18 is a gain for adjusting the Laplacian component value.

The interpolation unit 34 obtains the G-component value Gout of the pixel P22 through the processing corresponding to the formula below.

$$Gout=(q0+q1)/2-(s0-2\times s+s1)\times gain18$$

The term (s0−2×s+s1) is a Laplacian component value, and gain18 is a gain for adjusting the Laplacian component value.

Vertical Direction Pixel Interpolation (Color Image Area)

When the pixel interpolation method for the target pixel determined by the pixel interpolation method determination unit 33 is the pixel interpolation method intended for a color image area and the correlation direction for the target pixel determined by the pixel interpolation method determination unit 33 is the vertical direction, the interpolation unit 34 performs the pixel interpolation processing for the target pixel through the processing corresponding to the formulae below. After the pixel interpolation processing, the target pixel will have the pixel value Wout for its W-component, the pixel value Rout for its R-component, the pixel value Gout for its G-component, and the pixel value Bout for its B-component.

V-G: When the Target Pixel is G-Pixel

When the target pixel is a G-pixel, the interpolation unit 34 obtains the values Wout, Rout, Gout, and Bout through the processing described below.

Gout:

The interpolation unit 34 sets the pixel value Gout of the G-component as the pixel value P22 of the target pixel. In other words, the interpolation unit 34 sets the value as Gout=P22.

Bout:

The interpolation unit 34 performs the processing described below to obtain the pixel value Bout of the B-component. The process for obtaining (calculating) the pixel value Bout of the B-component will now be described with reference to FIG. 36.

Figure 36:
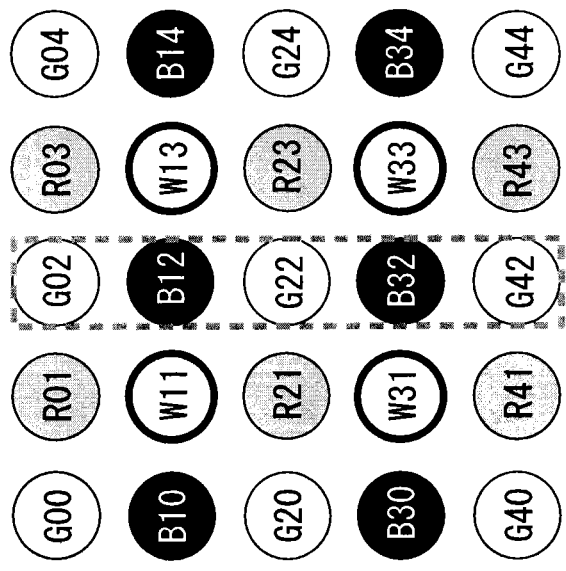
FIG. 36 is a diagram describing pixel interpolation in the vertical direction (for a color image area) for an image area including a G-pixel in the center.

FIG. 36 shows a matrix area of 5×5 pixels including a G-pixel as its central pixel (target pixel).

The interpolation unit 34 obtains the B-component value Bout of the pixel P22 using the five pixels P02, P12, P22, P32, and P42 through the processing described below.

$$Bout=(B12+B32)/2-(G02-2\times G22+G42)\times gain20$$

The term (G02−2×G22+G42) is a Laplacian component value, and gain20 is a gain for adjusting the Laplacian component value.

Rout:

The interpolation unit 34 obtains the R-component value Rout of the pixel P22 through the processing described below.

Figure 37:
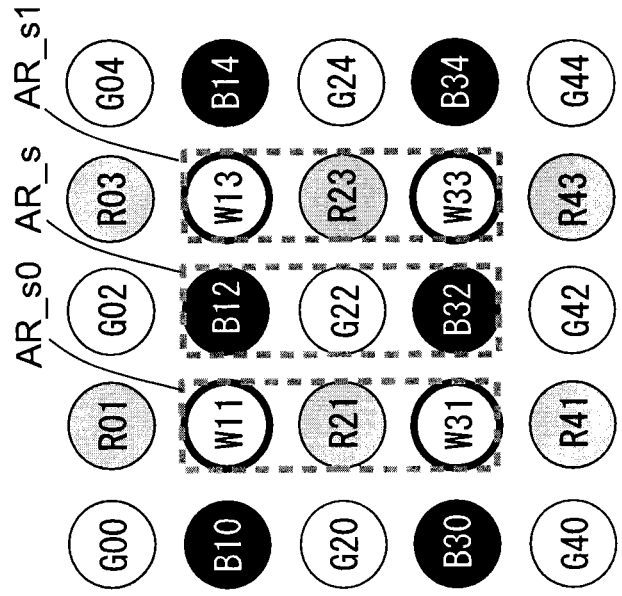
FIG. 37 is a diagram describing pixel interpolation in the vertical direction (for a color image area) for an image area including a G-pixel in the center.

The interpolation unit 34 calculates the W−R-component value s0 of the pixel P21, the W−R-component value s (B+G-component value s) of the pixel P22, and the W−R-component value s1 of the pixel P32 as shown in FIG. 37 through the processing corresponding to the formulae below.

$$s0=-Rgain\times P21+Wgain\times (P11+P31)/2$$

$$s=Ggain\times P22+Bgain\times (P12+P32)/2$$

$$s1=-Rgain\times P23+Wgain\times (P13+P33)/2$$

The interpolation unit 34 obtains the R-component value Rout of the pixel P22 through the processing corresponding to the formula below.

$$Rout=(R21+R23)/2-(s0-2\times s+s1)\times gain21$$

The term (s0−2×s+s1) is a Laplacian component value, and gain21 is a gain for adjusting the Laplacian component value.

Wout:

The interpolation unit 34 performs the processing described below to obtain the pixel value Wout of the W-component. The process for obtaining (calculating) the pixel value Wout of the W-component will now be described with reference to FIG. 38.

Figure 38:
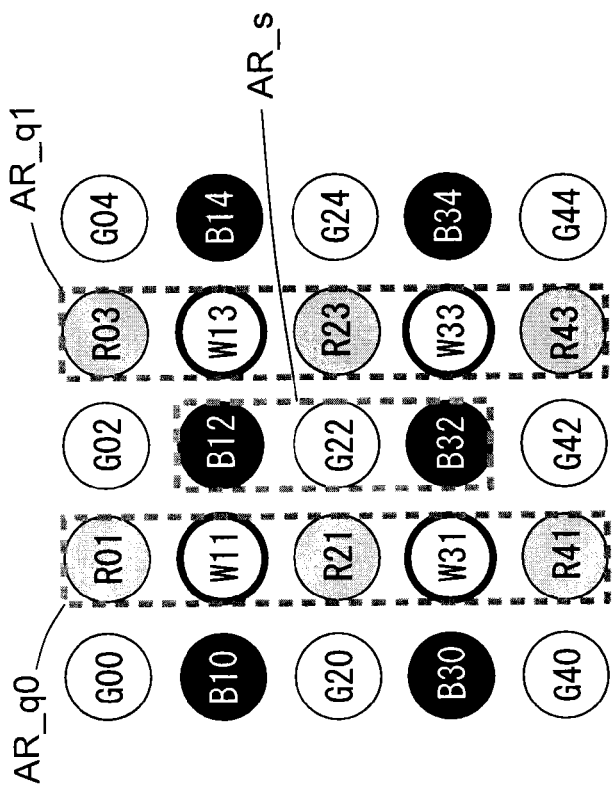
FIG. 38 is a diagram describing pixel interpolation in the vertical direction (for a color image area) for an image area including a G-pixel in the center.

FIG. 38 shows a matrix area of 5×5 pixels including a G-pixel as its central pixel (target pixel).

The interpolation unit 34 calculates the W−R-component value s0 of the pixel P21, the W−R-component value s (B+G-component value s) of the pixel P22, and the W−R-component value s1 of the pixel P32 through the processing corresponding to the formulae below.

$$s0=-Rgain\times P21+Wgain\times (P11+P31)/2$$

$$s=Ggain\times P22+Bgain\times (P12+P32)/2$$

$$s1=-Rgain\times P23+Wgain\times (P13+P33)/2$$

The interpolation unit 38 calculates the W-component q0 of the pixel P21 and the W-component value q1 of the pixel P23 through the processing corresponding to the formulae below.

$$q0=(W11+W31)/2-(R01-2\times R21+R41)\times gain22$$

$$q1=(W13+W33)/2-(R03-2\times R23+R43)\times gain23$$

The term (R01−2×R21+R41) is a Laplacian component value, and gain22 is a gain for adjusting the Laplacian component value. The term (R03−2×R23+R43) is a Laplacian component value, and gain23 is a gain for adjusting the Laplacian component value.

The interpolation unit 34 obtains the W-component value Wout of the pixel P22 through the processing corresponding to the formula below.

$$Wout=(q0+q1)/2-(s0-2\times s+s1)\times gain23$$

The term (s0−2×s+s1) is a Laplacian component value, and gain23 is a gain for adjusting the Laplacian component value.

V-R: When the Target Pixel is R-Pixel

When the target pixel is an R-pixel, the interpolation unit 34 obtains the values Wout, Rout, Gout, and Bout through the processing described below.

Rout:

The interpolation unit 34 sets the pixel value Rout of the R-component as the pixel value P22 of the target pixel. In other words, the interpolation unit 34 sets the value as Rout=P22.

Wout:

The interpolation unit 34 performs the processing described below to obtain the pixel value Wout of the W-component.

The interpolation unit 34 obtains the W-component value Wout of the pixel P22 using the five pixels P02, P12, P22, P32, and P42 through the processing described below.

$$Wout=(W12+W32)/2-(R02-2\times R22+R42)\times gain24$$

The term $(R02-2\times R22+R42)$ is a Laplacian component value, and gain24 is a gain for adjusting the Laplacian component value.

Gout:

The interpolation unit 34 obtains the G-component value Gout of the pixel P22 through the processing described below.

The interpolation unit 34 obtains the W–R-component value s0 of the pixel P21 (G+B-component value s0), the W–R-component value s of the pixel P22, and the W–R-component value s1 of the pixel P32 (G+B-component value s1) through the processing corresponding to the formulae below.

$$s0 = G\text{gain} \times P21 + B\text{gain} \times (P11+P31)/2$$

$$s = -R\text{gain} \times P22 + W\text{gain} \times (P12+P32)/2$$

$$s1 = G\text{gain} \times P23 + B\text{gain} \times (P13+P33)/2$$

The interpolation unit 34 obtains the G-component value Gout of the pixel P22 through the processing corresponding to the formula below.

$$G\text{out} = (G21+G23)/2 - (s0 - 2 \times s + s1) \times \text{gain}25$$

The term $(s0-2\times s+s1)$ is a Laplacian component value, and gain25 is a gain for adjusting the Laplacian component value.

Bout:

The interpolation unit 34 performs the processing described below to obtain the pixel value Bout of the B-component.

The interpolation unit 34 obtains the W–R-component value s0 of the pixel P21 (G+B-component value s0), the W–R-component value s of the pixel P22, and the W–R-component value s1 of the pixel P32 (G+B-component value s1) through the processing corresponding to the formulae below.

$$s0 = G\text{gain} \times P21 + B\text{gain} \times (P11+P31)/2$$

$$s = -R\text{gain} \times P22 + W\text{gain} \times (P12+P32)/2$$

$$s1 = G\text{gain} \times P23 + B\text{gain} \times (P13+P33)/2$$

The interpolation unit 38 calculates the W-component q0 of the pixel P21 and the W-component value q1 of the pixel P23 through the processing corresponding to the formulae below.

$$q0 = (B11+B31)/2 - (G01 - 2 \times G21 + G41) \times \text{gain}26$$

$$q1 = (B13+B33)/2 - (G03 - 2 \times G23 + G43) \times \text{gain}27$$

The term $(G01-2\times G21+G41)$ is a Laplacian component value, and gain26 is a gain for adjusting the Laplacian component value. The $(G03-2\times G23+G43)$ is a Laplacian component value, and gain27 is a gain for adjusting the Laplacian component value.

The interpolation unit 34 obtains the B-component value Bout of the pixel P22 through the processing corresponding to the formula below.

$$B\text{out} = (q0+q1)/2 - (s0 - 2 \times s + s1) \times \text{gain}28$$

The term $(s0-2\times s+s1)$ is a Laplacian component value, and gain28 is a gain for adjusting the Laplacian component value.

V-B: When the Target Pixel is B-Pixel

When the target pixel is a B-pixel, the interpolation unit 34 obtains the values Wout, Rout, Gout, and Bout through the processing described below.

Bout:

The interpolation unit 34 sets the pixel value Bout of the B-component as the pixel value P22 of the target pixel. In other words, the interpolation unit 34 sets the value as Bout=P22.

Gout:

The interpolation unit 34 performs the processing described below to obtain the pixel value Gout of the G-component.

The interpolation unit 34 obtains the G-component value Gout of the pixel P22 using the five pixels P02, P12, P22, P32, and P42 through the processing described below.

$$G\text{out} = (G12+G32)/2 - (B02 - 2 \times B22 + B42) \times \text{gain}29$$

The term $(B02-2\times B22+B42)$ is a Laplacian component value, and gain29 is a gain for adjusting the Laplacian component value.

Wout:

The interpolation unit 34 obtains the W-component value Wout of the pixel P22 through the processing described below.

The interpolation unit 34 obtains the W–R-component value s0 of the pixel P21, the W–R-component value s of the pixel P22 (G+B-component value s), and the W–R-component value s1 of the pixel P32 through the processing corresponding to the formulae below.

$$s0 = W\text{gain} \times P21 - R\text{gain} \times (P11+P31)/2$$

$$s = B\text{gain} \times P22 + G\text{gain} \times (P12+P32)/2$$

$$s1 = W\text{gain} \times P23 - R\text{gain} \times (P13+P33)/2$$

The interpolation unit 34 obtains the W-component value Wout of the pixel P22 through the processing corresponding to the formula below.

$$W\text{out} = (W21+W23)/2 - (s0 - 2 \times s + s1) \times \text{gain}30$$

The term $(s0-2\times s+s1)$ is a Laplacian component value, and gain30 is a gain for adjusting the Laplacian component value.

Rout:

The interpolation unit 34 performs the processing described below to obtain the R-component pixel value Rout.

The interpolation unit 34 obtains the W–R-component value s0 of the pixel P21, the W–R-component value s of the pixel P22 (G+B-component value s), and the W–R-component value s1 of the pixel P32 through the processing corresponding to the formulae below.

$$s0 = W\text{gain} \times P21 - R\text{gain} \times (P11+P31)/2$$

$$s = B\text{gain} \times P22 + G\text{gain} \times (P12+P32)/2$$

$$s1 = W\text{gain} \times P23 - R\text{gain} \times (P13+P33)/2$$

The interpolation unit 38 calculates the R-component q0 of the pixel P21 and the R-component value q1 of the pixel P23 through the processing corresponding to the formulae below.

$$q0 = (R11+R31)/2 - (W01 - 2 \times W21 + W41) \times \text{gain}31$$

$$q1 = (R13+R33)/2 - (W03 - 2 \times W23 + W43) \times \text{gain}32$$

The term $(W01-2\times W21+W41)$ is a Laplacian component value, and gain31 is a gain for adjusting the Laplacian component value. The term $(W03-2\times W23+W43)$ is a Laplacian component value, and gain32 is a gain for adjusting the Laplacian component value.

The interpolation unit 34 obtains the R-component value Rout of the pixel P22 through the processing corresponding to the formula below.

$$R\text{out} = (q0+q1)/2 - (s0 - 2 \times s + s1) \times \text{gain}33$$

The term (s0−2×s+s1) is a Laplacian component value, and gain33 is a gain for adjusting the Laplacian component value.

V-W: When the Target Pixel is W-Pixel

When the target pixel is a W-pixel, the interpolation unit 34 obtains the values Wout, Rout, Gout, and Bout through the processing described below.

Wout:

The interpolation unit 34 sets the pixel value Wout of the W-component as the pixel value P22 of the target pixel. In other words, the interpolation unit 34 sets the value as Wout=P22.

Rout:

The interpolation unit 34 performs the processing described below to obtain the R-component pixel value Rout.

The interpolation unit 34 obtains the R-component value Rout of the pixel P22 using the five pixels P02, P12, P22, P32, and P42 through the processing described below.

$$Rout=(R12+R32)/2-(W02-2\times W22+W42)\times gain34$$

The term (W02−2×W22+W42) is a Laplacian component value, and gain34 is a gain for adjusting the Laplacian component value.

Bout:

The interpolation unit 34 obtains the B-component value Bout of the pixel P22 through the processing described below.

The interpolation unit 34 obtains the W−R-component value s0 of the pixel P21 (B+G-component value s0), the W−R-component value s of the pixel P22, and the W−R-component value s1 of the pixel P32 (B+G-component value s1) through the processing corresponding to the formulae below.

$$s0=Bgain\times P21+Ggain\times(P11+P31)/2$$

$$s=Wgain\times P22-Rgain\times(P12+P32)/2$$

$$s1=Bgain\times P23+Ggain\times(P13+P33)/2$$

The interpolation unit 34 obtains the B-component value Bout of the pixel P22 through the processing corresponding to the formula below.

$$Bout=(B21+B23)/2-(s0-2\times s+s1)\times gain35$$

The term (s0−2×s+s1) is a Laplacian component value, and gain35 is a gain for adjusting the Laplacian component value.

Gout:

The interpolation unit 34 performs the processing described below to obtain the pixel value Gout of the G-component.

The interpolation unit 34 obtains the W−R-component value s0 of the pixel P21 (B+G-component value s0), the W−R-component value s of the pixel P22, and the W−R-component value s1 of the pixel P32 (B+G-component value s1) through the processing corresponding to the formulae below.

$$s0=Bgain\times P21+Ggain\times(P11+P31)/2$$

$$s=Wgain\times P22-Rgain\times(P12+P32)/2$$

$$s1=Bgain\times P23+Ggain\times(P13+P33)/2$$

The interpolation unit 38 calculates the G-component q0 of the pixel P21 and the G-component value q1 of the pixel P23 through the processing corresponding to the formulae below.

$$q0=(G11+G31)/2-(B01-2\times B21+B41)\times gain36$$

$$q1=(G13+G33)/2-(B03-2\times B23+B43)\times gain37$$

The term (B01−2×B21+B41) is a Laplacian component value, and gain36 is a gain for adjusting the Laplacian component value. The term (B03−2×B23+B43) is a Laplacian component value, and gain37 is a gain for adjusting the Laplacian component value.

The interpolation unit 34 obtains the G-component value Gout of the pixel P22 through the processing corresponding to the formula below.

$$Gout=(q0+q1)/2-(s0-2\times s+s1)\times gain38$$

The term (s0−2×s+s1) is a Laplacian component value, and gain38 is a gain for adjusting the Laplacian component value.

First Diagonal Direction Pixel Interpolation (Color Image Area)

When the pixel interpolation method for the target pixel determined by the pixel interpolation method determination unit 33 is the pixel interpolation method intended for a color image area and the correlation direction for the target pixel determined by the pixel interpolation method determination unit 33 is the first diagonal direction, the interpolation unit 34 performs the pixel interpolation processing for the target pixel through the processing corresponding to the formulae below. After the pixel interpolation processing, the target pixel will have the pixel value Wout for its W-component, the pixel value Rout for its R-component, the pixel value Gout for its G-component, and the pixel value Bout for its B-component.

D1-G: When the Target Pixel is G-Pixel

When the target pixel is a G-pixel, the interpolation unit 34 obtains the values Wout, Rout, Gout, and Bout through the processing described below.

Gout:

The interpolation unit 34 sets the pixel value Gout of the G-component as the pixel value P22 of the target pixel. In other words, the interpolation unit 34 sets the value as Gout=P22.

Wout:

The interpolation unit 34 performs the processing described below to obtain the pixel value Wout of the W-component. The process for obtaining (calculating) the pixel value Wout of the W-component will now be described with reference to FIG. 39.

Figure 39:
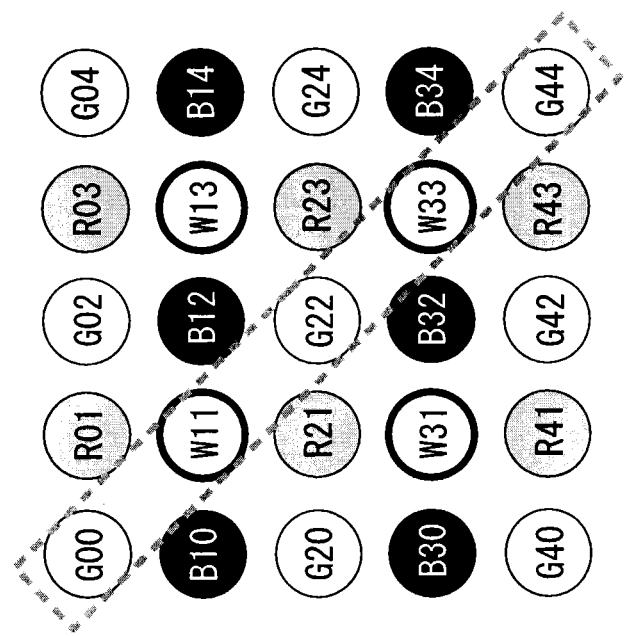
FIG. 39 is a diagram describing pixel interpolation in the first diagonal direction (for a color image area) for an image area including a G-pixel in the center.

FIG. 39 shows a matrix area of 5×5 pixels including a G-pixel as its central pixel (target pixel).

The interpolation unit 34 obtains the W-component value Wout of the pixel P22 using the five pixels P00, P11, P22, P33, and P44 through the processing described below.

$$Wout=(W11+W33)/2-(G00-2\times G22+G44)\times gain40$$

The term (G00−2×G22+G44) is a Laplacian component value, and gain40 is a gain for adjusting the Laplacian component value.

Bout:

The interpolation unit 34 obtains the B-component value Bout of the pixel P22 through the processing described below.

Figure 40A:
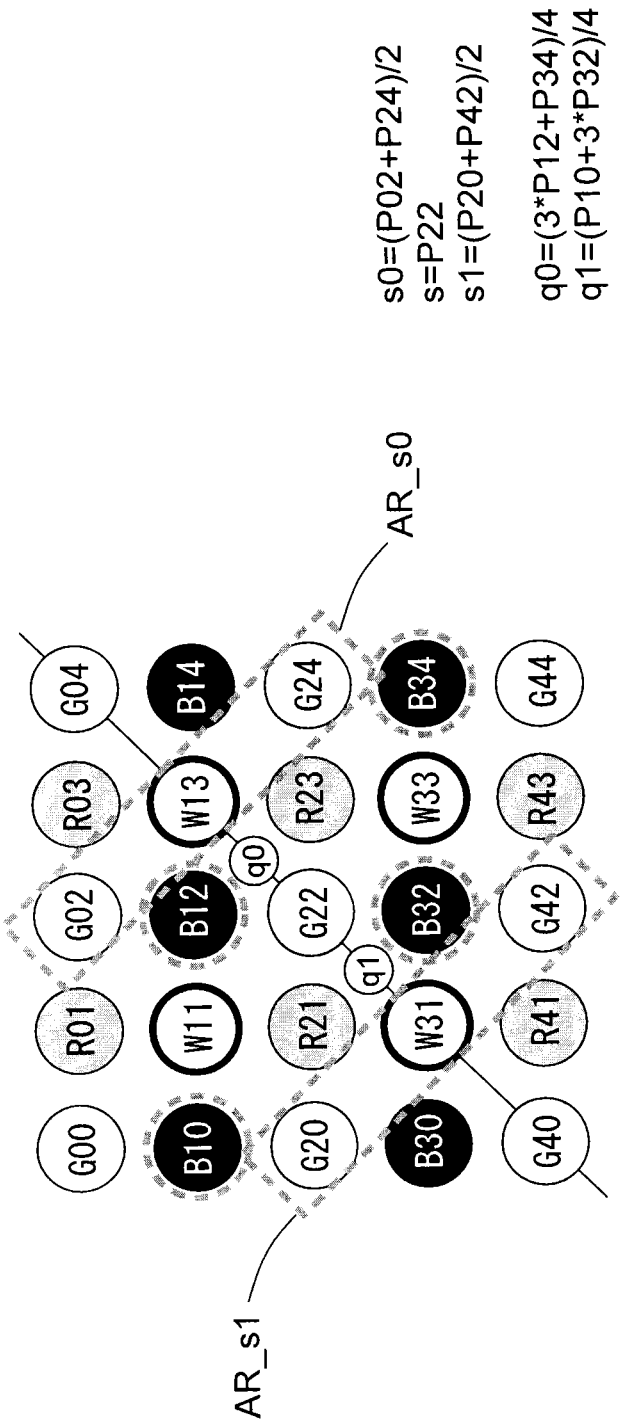
FIG. 40A is a diagram describing pixel interpolation in the first diagonal direction (for a color image area) for an image area including a G-pixel in the center.

The interpolation unit 34 calculates the G-component value s0 of the pixel P13, the G-component value s of the pixel P22, and the G-component value s1 of the pixel P31 as shown in FIG. 40A through the processing corresponding to the formulae below.

$$s0=(G02+G24)/2$$

$$s=G22$$

$$s1=(G20+G42)/2$$

The interpolation unit 34 obtains the B-component q0 of the midpoint between the pixels P13 and P22 and the B-component q1 of the midpoint between the pixels P22 and P31 as shown in FIG. 40A through the processing (internal division processing) corresponding to the formulae below.

$$q0=(3\times B12+B34)/4$$

$$q1=(B10+3\times B32)/4$$

The interpolation unit 34 obtains the B-component value Bout of the pixel P22 through the processing corresponding to the formula below.

$$Bout=(q0+q1)/2-(s0-2\times s+s1)\times gain41$$

The term (s0−2×s+s1) is a Laplacian component value, and gain41 is a gain for adjusting the Laplacian component value.

The interpolation unit 34 may obtain the B-component value Bout of the pixel P22 through the processing described below.

Figure 40B:
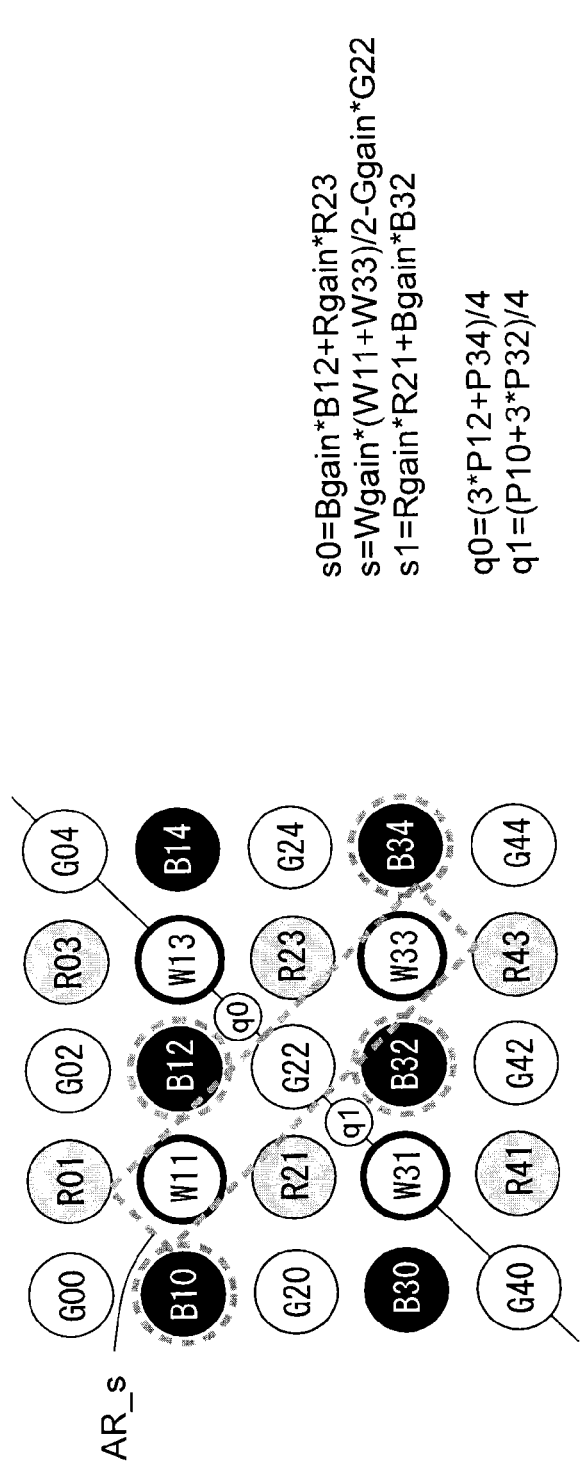
FIG. 40B is a diagram describing pixel interpolation in the first diagonal direction (for a color image area) for an image area including a G-pixel in the center.

The interpolation unit 34 calculates the W−G component value (R+B component value) s0 of the midpoint between the pixels P13 and P22, the W−G component value s of the pixel P22, and the W−G component value (R+B component value) s1 of the midpoint between the pixels P22 and P31 as shown in FIG. 40B through the processing corresponding to the formulae below.

$$s0=Bgain\times B12+Rgain\times R23$$

$$s=Wgain\times(W11+W33)/2-Ggain\times G22$$

$$s1=Rgain\times R21+Bgain\times B32$$

The interpolation unit 34 calculates the B-component q0 of the midpoint between the pixels P13 and P22 and the B-component q1 of the midpoint between the pixels P22 and P31 as shown in FIG. 40B through the processing (internal division processing) corresponding to the formulae below.

$$q0=(3\times B12+B34)/4$$

$$q1=(B10+3\times B32)/4$$

The interpolation unit 34 obtains the B-component value Bout of the pixel P22 through the processing corresponding to the formula below.

$$Bout=(q0+q1)/2-(s0-2\times s+s1)\times gain41B$$

The term (s0−2×s+s1) is a Laplacian component value, and gain41B is a gain for adjusting the Laplacian component value.

In the above processing, the interpolation unit 34 calculates the Laplacian component value by using the W−G component value (R+B component value) s0 of the midpoint between the pixels P13 and P22, the W−G component value s of the pixel P22, and the W−G component value (R+B component value) s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

Figure 41A:
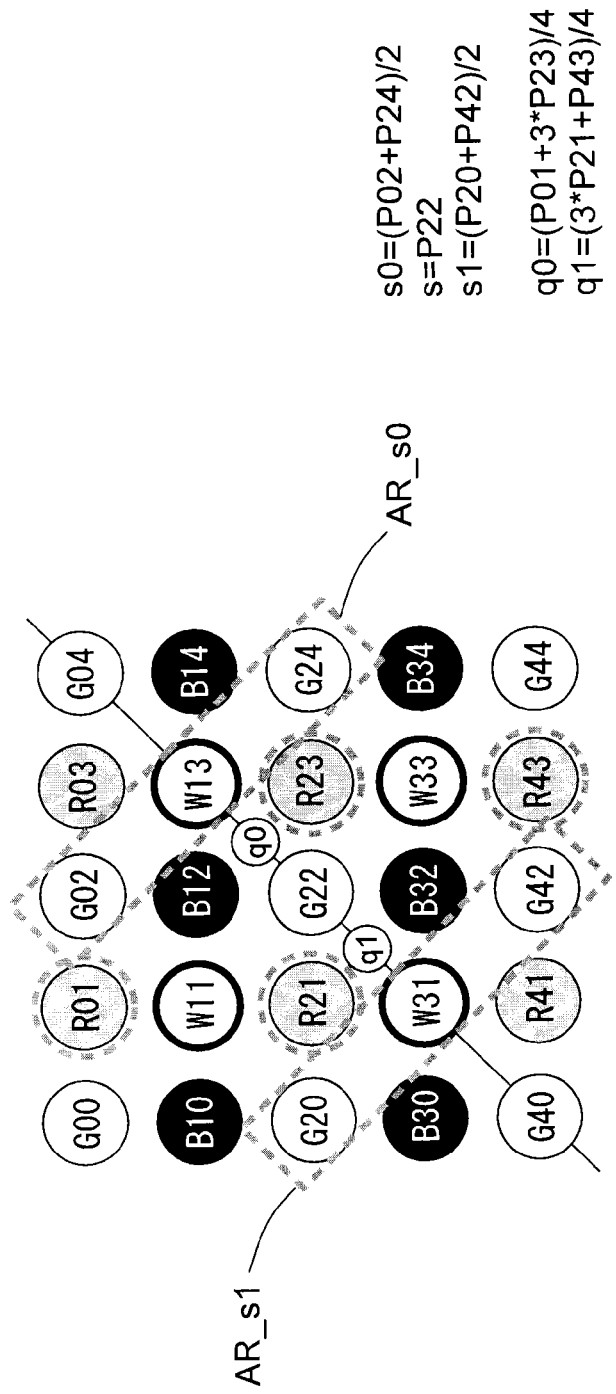
FIG. 41A is a diagram describing pixel interpolation in the first diagonal direction (for a color image area) for an image area including a G-pixel in the center.

Rout:

The interpolation unit 34 obtains the G-component value s0 of the pixel P13, the G-component value s of the pixel P22, and the G-component value s1 of the pixel P31 as shown in FIG. 41A through the processing corresponding to the formulae below.

$$s0=(G02+G24)/2$$

$$s=G22$$

$$s1=(G20+G42)/2$$

The interpolation unit 34 obtains the R-component q0 of the midpoint between the pixels P13 and P22 and the R-component q1 of the midpoint between the pixels P22 and P31 as shown in FIG. 41A through the processing (internal division processing) corresponding to the formulae below.

$$q0=(R01+3\times R23)/4$$

$$q1=(3\times R21+R43)/4$$

The interpolation unit 34 obtains the R-component value Rout of the pixel P22 through the processing corresponding to the formula below.

$$Rout=(q0+q1)/2-(s0-2\times s+s1)\times gain42$$

The term (s0−2×s+s1) is a Laplacian component value, and gain42 is a gain for adjusting the Laplacian component value.

The interpolation unit 34 may obtain the R-component value Rout of the pixel P22 through the processing described below.

Figure 41B:
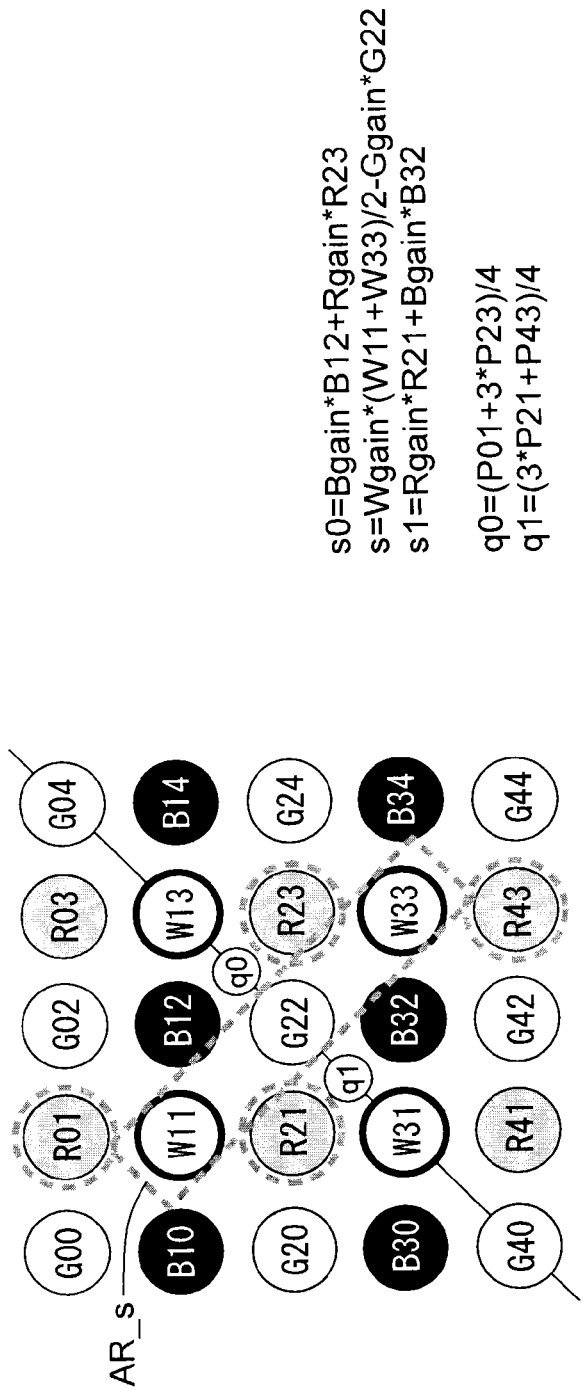
FIG. 41B is a diagram describing pixel interpolation in the first diagonal direction (for a color image area) for an image area including a G-pixel in the center.

The interpolation unit 34 calculates the W−G component value (R+B component value) s0 of the midpoint between the pixels P13 and P22, the W−G component value s of the pixel P22, and the W−G component value (R+B component value) s1 of the midpoint between the pixels P22 and P31 as shown in FIG. 41B through the processing corresponding to the formulae below.

$$s0=Bgain\times B12+Rgain\times R23$$

$$s=Wgain\times(W11+W33)/2-Ggain\times G22$$

$$s1=Rgain\times R21+Bgain\times B32$$

The interpolation unit 34 calculates the R-component value q0 of the midpoint between the pixels P13 and P22 and the R-component value q1 of the midpoint between the pixels P22 and P31 as shown in FIG. 41B through the processing (internal division processing) corresponding to the formulae below.

$$q0=(R01+3\times R23)/4$$

$$q1=(3\times R21+R43)/4$$

The interpolation unit 34 obtains the R-color component Rout of the pixel P22 through the processing corresponding to the formulae below.

$$Rout=(q0+q1)/2-(s0-2\times s+s1)\times gain42B$$

The term (s0−2×s+s1) is a Laplacian component value, and gain42B is a gain for adjusting the Laplacian component value.

In the above processing, the interpolation unit 34 calculates the Laplacian component value by using the W−G component value (R+B component value) s0 of the midpoint between the pixels P13 and P22, the W−G component value s of the pixel P22, and the W−G component value (R+B component value) s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

D1-R: When the Target Pixel is R-Pixel

When the target pixel is an R-pixel, the interpolation unit 34 obtains the values Wout, Rout, Gout, and Bout through the processing described below.

Rout:

The interpolation unit 34 sets the pixel value Rout of the R-component as the pixel value P22 of the target pixel. In other words, the interpolation unit 34 sets the value as Rout=P22.

Bout:

The interpolation unit 34 performs the processing described below to obtain the pixel value Bout of the B-component.

The interpolation unit 34 obtains the B-component value Bout of the pixel P22 using the five pixels P00, P11, P22, P33, and P44 through the processing described below.

$$Bout=(B11+B33)/2-(R00-2\times R22+R44)\times gain43$$

The term (R00−2×R22+R44) is a Laplacian component value, and gain43 is a gain for adjusting the Laplacian component value.

Wout:

The interpolation unit 34 obtains the W-component value Wout of the pixel P22 through the processing described below.

The interpolation unit 34 calculates the R-component value s0 of the pixel P13, the R-component value s of the pixel P22, and the R-component value s1 of the pixel P31 through the processing corresponding to the formulae below.

$$s0=(R02+R24)/2$$

$$s=R22$$

$$s1=(R20+R42)/2$$

The interpolation unit 34 obtains the W-component q0 of the midpoint between the pixels P13 and P22 and the W-component q1 of the midpoint between the pixels P22 and P31 through the processing (internal division processing) corresponding to the formulae below.

$$q0=(3\times W12+W34)/4$$

$$q1=(W10+3\times W32)/4$$

The interpolation unit 34 obtains the W-component value Wout of the pixel P22 through the processing corresponding to the formula below.

$$Wout=(q0+q1)/2-(s0-2\times s+s1)\times gain44$$

The term (s0−2×s+s1) is a Laplacian component value, and gain44 is a gain for adjusting the Laplacian component value.

The interpolation unit 34 may obtain the W-component value Wout of the pixel W22 through the processing described below.

The interpolation unit 34 calculates the W−G component value s0 of the midpoint between the pixels P13 and P22, the W−G component value (R+B component value) s of the pixel P22, and the W−G component value s1 of the midpoint between the pixels P22 and P31 through the processing corresponding to the formulae below.

$$s0=Wgain\times W12-Ggain\times G23$$

$$s=Bgain\times (B11+B33)/2+Rgain\times R22$$

$$s1=-Ggain\times G21+Wgain\times W32$$

The interpolation unit 34 calculates the W-component value q0 of the midpoint between the pixels P13 and P22 and the W-component value q1 of the midpoint between the pixels P22 and P31 through the processing (internal division processing) corresponding to the formulae below.

$$q0=(3\times W12+W34)/4$$

$$q1=(W10+3\times W32)/4$$

The interpolation unit 34 obtains the W-component value Wout of the pixel P22 through the processing corresponding to the formulas below.

$$Wout=(q0+q1)/2-(s0-2\times s+s1)\times gain44B$$

The term (s0−2×s+s1) is a Laplacian component value, and gain44B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, and the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs interpolation processing (processing for obtaining the value Gout by interpolation) by using the Laplacian component value representing a change ratio in units of ½ pixels (a change ratio of the W−G component value) in the direction orthogonal to the first diagonal direction pixel. This further improves the accuracy of the pixel interpolation processing performed by the interpolation unit 34.

Gout:

The interpolation unit 34 obtains the R-component value s0 of the pixel P13, the R-component value s of the pixel P22, and the R-component value s1 of the pixel P31 through the processing corresponding to the formulae below.

$$s0=(R02+R24)/2$$

$$s=R22$$

$$s1=(R20+R42)/2$$

The interpolation unit 34 calculates the G-component q0 of the midpoint between the pixels P13 and P22 and the G-component q1 of the midpoint between the pixels P22 and P31 through the processing corresponding to the formulae below.

$$q0=(G01+3\times G23)/4$$

$$q1=(3\times G21+G43)/4$$

The interpolation unit 34 obtains the G-component value Gout of the pixel P22 through the processing corresponding to the formula below.

$$Gout=(q0+q1)/2-(s0-2\times s+s1)\times gain45$$

The term (s0−2×s+s1) is a Laplacian component value, and gain45 is a gain for adjusting the Laplacian component value.

The interpolation unit 34 may obtain the G-component value Gout of the pixel W22 through the processing described below.

The interpolation unit 34 calculates the W−G component value s0 of the midpoint between the pixels P13 and P22, the W−G component value (R+B component value) s of the pixel P22, and the W−G component value s1 of the midpoint between the pixels P22 and P31 through the processing corresponding to the formulae below.

$$s0 = Wgain \times W12 - Ggain \times G23$$

$$s = Bgain \times (B11+B33)/2 + Rgain \times R22$$

$$s1 = -Ggain \times G21 + Wgain \times W32$$

The interpolation unit 34 calculates the G-component value q0 of the midpoint between the pixels P13 and P22 and the G-component value q1 of the midpoint between the pixels P22 and P31 through the processing corresponding to the formulae below.

$$q0 = (G01 + 3 \times G23)/4$$

$$q1 = (3 \times G21 + G43)/4$$

The interpolation unit 34 obtains the G-component value Gout of the pixel P22 through the processing corresponding to the formula below.

$$Gout = (q0+q1)/2 - (s0 - 2 \times s + s1) \times gain45B$$

The term (s0−2×s+s1) is a Laplacian component value, and gain45B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

D1-B: When the Target Pixel is B-Pixel

When the target pixel is a B-pixel, the interpolation unit 34 obtains the values Wout, Rout, Gout, and Bout through the processing described below.

Bout:

The interpolation unit 34 sets the pixel value Bout of the B-component as the pixel value P22 of the target pixel. In other words, the interpolation unit 34 sets the value as Bout=P22.

Rout:

The interpolation unit 34 performs the processing described below to obtain the R-component pixel value Rout.

The interpolation unit 34 obtains the R-component value Rout of the pixel P22 using the pixels P00, P11, P22, P33, and P44 through the processing described below.

$$Rout = (R11+R33)/2 - (B00 - 2 \times B22 + B44) \times gain46$$

The term (B00−2×B22+B44) is a Laplacian component value, and gain46 is a gain for adjusting the Laplacian component value.

Gout:

The interpolation unit 34 obtains the G-component value Gout of the pixel P22 through the processing described below.

The interpolation unit 34 calculates the B-component value s0 of the pixel P13, the B-component value s of the pixel P22, the B-component value s1 of the pixel P31 through the processing corresponding to the formulae below.

$$s0 = (B02+B24)/2$$

$$s = B22$$

$$s1 = (B20+B42)/2$$

The interpolation unit 34 calculates the G-component q0 of the midpoint between the pixels P13 and P22 and the G-component q1 of the midpoint between the pixels P22 and P31 through the processing (internal division processing) corresponding to the formula below.

$$q0 = (3 \times G12 + G34)/4$$

$$q1 = (G10 + 3 \times G32)/4$$

The interpolation unit 34 obtains the G-component value Gout of the pixel P22 through the processing corresponding to the formula below.

$$Gout = (q0+q1)/2 - (s0 - 2 \times s + s1) \times gain47$$

The term (s0−2×s+s1) is a Laplacian component value, and gain47 is a gain for adjusting the Laplacian component value.

The interpolation unit 34 may obtain the G-component value Gout of the pixel P22 through the processing described below.

The interpolation unit 34 calculates the W−G component value s0 of the midpoint between the pixels P13 and P22, the W−G component value (R+B component value) s of the pixel P22, and the W−G component value s1 of the midpoint between the pixels P22 and P31 through the processing corresponding to the formulae below.

$$s0 = -Ggain \times G12 + Wgain \times W23$$

$$s = Rgain \times (R11+R33)/2 + Bgain \times B22$$

$$s1 = Wgain \times W21 - Ggain \times G32$$

The interpolation unit 34 calculates the G-component value q0 of the midpoint between the pixels P13 and P22 and the G-component value q1 of the midpoint between the pixels P22 and P31 through the processing (internal division processing) corresponding to the formulae below.

$$q0 = (3 \times G12 + G34)/4$$

$$q1 = (G10 + 3 \times G32)/4$$

The interpolation unit 34 obtains the G-component value Gout of the pixel P22 through the processing corresponding to the formula below.

$$Gout = (q0+q1)/2 - (s0 - 2 \times s + s1) \times gain47B$$

The term (s0−2×s+s1) is a Laplacian component value, and gain47B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

Wout:

The interpolation unit 34 calculates the B-component value s0 of the pixel P13, the B-component value s of the pixel P22, and the B-component value s1 of the pixel P31 through the processing corresponding to the formulae below.

$$s0=(B02+B24)/2$$

$$s=B22$$

$$s1=(B20+B42)/2$$

The interpolation unit 34 calculates the W-component q0 of the midpoint between the pixels P13 and P22 and the W-component q1 of the midpoint between the pixels P22 and P31 through the processing corresponding to the formulae below.

$$q0=(W01+3\times W23)/4$$

$$q1=(3\times W21+W43)/4$$

The interpolation unit 34 obtains the W-component value Wout of the pixel P22 through the processing corresponding to the formula below.

$$Wout=(q0+q1)/2-(s0-2\times s+s1)\times gain48$$

The term (s0−2×s+s1) is a Laplacian component value, and gain48 is a gain for adjusting the Laplacian component value.

The interpolation unit 34 may obtain the W-color component Wout of the pixel P22 through the processing described below.

The interpolation unit 34 calculates the W−G component value s0 of the midpoint between the pixels P13 and P22, the W−G component value (R+B component value) s of the pixel P22, and the W−G component value s1 of the midpoint between the pixels P22 and P31 through the processing corresponding to the formulae below.

$$s0=-Ggain\times G12+Wgain\times W23$$

$$s=Rgain\times (R11+R33)/2+Bgain\times B22$$

$$s1=Wgain\times W21-Ggain\times G32$$

The interpolation unit 34 calculates the W-component value q0 of the midpoint between the pixels P13 and P22 and the W-component value q1 of the midpoint between the pixels P22 and P31 through the processing corresponding to the formulae below.

$$q0=(W01+3\times W23)/4$$

$$q1=(3\times W21+W43)/4$$

The interpolation unit 34 obtains the W-component value Wout of the pixel P22 through the processing corresponding to the formulas below.

$$Wout=(q0+q1)/2-(s0-2\times s+s1)\times gain48B$$

The term (s0−2×s+s1) is a Laplacian component value, and gain48B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

D1-W: When the Target Pixel is W-Pixel

When the target pixel is a W-pixel, the interpolation unit 34 obtains the values Wout, Rout, Gout, and Bout through the processing described below.

Wout:

The interpolation unit 34 sets the pixel value Wout of the W-component as the pixel value P22 of the target pixel. In other words, the interpolation unit 34 sets the value as Wout=P22.

Gout:

The interpolation unit 34 performs the processing described below to obtain the pixel value Gout of the G-component.

The interpolation unit 34 obtains the G-component value Gout of the pixel P22 using the five pixels P00, P11, P22, P33, and P44 through the processing described below.

$$Gout=(G11+G33)/2-(W00-2\times W22+W44)\times gain49$$

The term (W00−2×W22+W44) is a Laplacian component value, and gain49 is a gain for adjusting the Laplacian component value.

Rout:

The interpolation unit 34 obtains the R-component value Rout of the pixel P22 through the processing described below.

The interpolation unit 34 calculates the W-component value s0 of the pixel P13, the W-component value s of the pixel P22, and the W-component value s1 of the pixel P31 through the processing corresponding to the formulae below.

$$s0=(W02+W24)/2$$

$$s=W22$$

$$s1=(W20+W42)/2$$

The interpolation unit 34 obtains the R-component q0 of the midpoint between the pixels P13 and P22 and the R-component q1 of the midpoint between the pixels P22 and P31 through the processing (internal division processing) corresponding to the formulae below.

$$q0=(3\times R12+R34)/4$$

$$q1=(R10+3\times R32)/4$$

The interpolation unit 34 obtains the R-component value Rout of the pixel P22 through the processing corresponding to the formula below.

$$Rout=(q0+q1)/2-(s0-2\times s+s1)\times gain50$$

The term (s0−2×s+s1) is a Laplacian component value, and gain50 is a gain for adjusting the Laplacian component value.

The interpolation unit 34 may obtain the R-component value Rout of the pixel P22 through the processing described below.

The interpolation unit 34 calculates the W−G component value (R+B component value) s0 of the midpoint between the pixels P13 and P22, the W−G component value s of the pixel P22, and the W−G component value (R+B component value) s1 of the midpoint between the pixels P22 and P31 through the processing corresponding to the formulae below.

$$s0 = R\text{gain} \times R12 + B\text{gain} \times B23$$

$$s = -G\text{gain} \times (G11+G33)/2 + W\text{gain} \times W22$$

$$s1 = B\text{gain} \times B21 + R\text{gain} \times R32$$

The interpolation unit 34 calculates the R-component value q0 of the midpoint between the pixels P13 and P22 and the R-component value q1 of the midpoint between the pixels P22 and P31 through the processing (internal division processing) corresponding to the formulae below.

$$q0 = (3 \times R12 + R34)/4$$

$$q1 = (R10 + 3 \times R32)/4$$

The interpolation unit 34 obtains the R-color component Rout of the pixel P22 through the processing corresponding to the formulae below.

$$\text{Rout} = (q0+q1)/2 - (s0 - 2 \times s + s1) \times \text{gain50}B$$

The term (s0−2×s+s1) is a Laplacian component value, and gain50B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

Bout:

The interpolation unit 34 obtains the W-component value s0 of the pixel P13, the W-component value s of the pixel P22, and the W-component value s1 of the pixel P31 through the processing corresponding to the formulae below.

$$s0 = (W02 + W24)/2$$

$$s = W22$$

$$s1 = (W20 + W42)/2$$

The interpolation unit 34 calculates the B-component q0 of the midpoint between the pixels P13 and P22 and the B-component q1 of the midpoint between the pixels P22 and P31 through the processing corresponding to the formulae below.

$$q0 = (B01 + 3 \times B23)/4$$

$$q1 = (3 \times B21 + B43)/4$$

The interpolation unit 34 obtains the B-component value Bout of the pixel P22 through the processing corresponding to the formula below.

$$\text{Bout} = (q0+q1)/2 - (s0 - 2 \times s + s1) \times \text{gain51}$$

The term (s0−2×s+s1) is a Laplacian component value, and gain51 is a gain for adjusting the Laplacian component value.

The interpolation unit 34 may obtain the B-component value Bout of the pixel P22 through the processing described below.

The interpolation unit 34 calculates the W−G component value (R+B component value) s0 of the midpoint between the pixels P13 and P22, the W−G component value s of the pixel P22, and the W−G component value (R+B component value) s1 of the midpoint between the pixels P22 and P31 through the processing corresponding to the formulae below.

$$s0 = R\text{gain} \times R12 + B\text{gain} \times B23$$

$$s = -G\text{gain} \times (G11+G33)/2 + W\text{gain} \times W22$$

$$s1 = B\text{gain} \times B21 + R\text{gain} \times R32$$

The interpolation unit 34 calculates the B-component value q0 of the midpoint between the pixels P13 and P22 and the B-component value q1 of the midpoint between the pixels P22 and P31 through the processing corresponding to the formulae below.

$$q0 = (B01 + 3 \times B23)/4$$

$$q1 = (3 \times B21 + B43)/4$$

The interpolation unit 34 obtains the B-component value Bout of the pixel P22 through the processing corresponding to the formula below.

$$\text{Bout} = (q0+q1)/2 - (s0 - 2 \times s + s1) \times \text{gain51}B$$

The term (s0−2×s+s1) is a Laplacian component value, and gain51B is a gain for adjusting the Laplacian component value.

In the above processing, the interpolation unit 34 calculates the Laplacian component value by using the W−G component value s0 of the midpoint between the pixels P13 and P22, the W−G component value s of the pixel P22, and the W−G component value s1 of the midpoint between the pixels P22 and P31. More specifically, the interpolation unit 34 obtains the W−G component value (=the R+B component value) by performing color space conversion at the midpoint between the pixels P13 and P22, at the pixel P22, and at the midpoint between the pixels P22 and P31. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the first diagonal direction. This further improves the accuracy of the pixel interpolation processing performed by the interpolation unit 34.

Second Diagonal Direction Pixel Interpolation (Color Image Area)

When the pixel interpolation method for the target pixel determined by the pixel interpolation method determination unit 33 is the pixel interpolation method intended for a color image area and the correlation direction for the target pixel determined by the pixel interpolation method determination unit 33 is the second diagonal direction, the interpolation unit 34 performs the pixel interpolation processing for the target pixel through the processing corresponding to the formulae below. After the pixel interpolation processing, the target pixel will have the pixel value Wout for its W-component, the pixel value Rout for its R-component, the pixel value Gout for its G-component, and the pixel value Bout for its B-component.

D2-G: When the Target Pixel is G-Pixel

When the target pixel is a G-pixel, the interpolation unit 34 obtains the values Wout, Rout, Gout, and Bout through the processing described below.

Gout:

The interpolation unit 34 sets the pixel value Rout of the G-component as the pixel value P22 of the target pixel. In other words, the interpolation unit 34 sets the value as Gout=P22.

Wout:

The interpolation unit 34 performs the processing described below to obtain the pixel value Wout of the W-component. The processing for obtaining (calculating) the pixel value Wout of the W-component will now be described with reference to FIG. 42.

Figure 42:
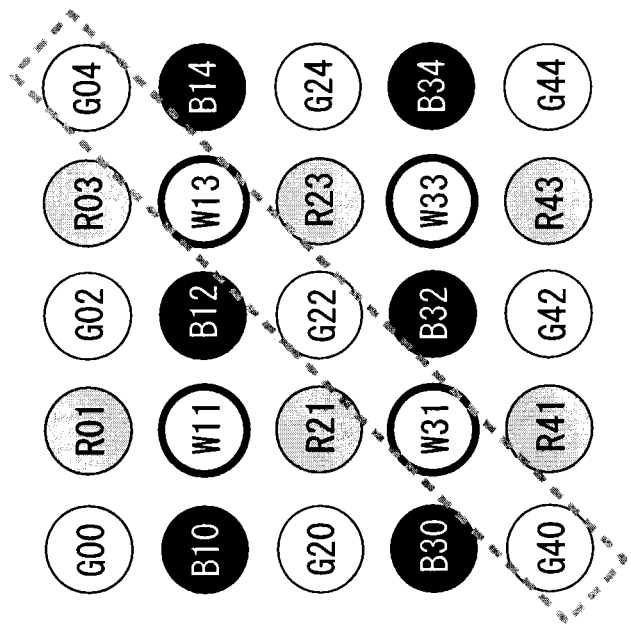
FIG. 42 is a diagram describing pixel interpolation in the second diagonal direction (for a color image area) for an image area including a G-pixel in the center.

FIG. 42 shows a matrix area of 5×5 pixels including a G-pixel as its central pixel (target pixel).

The interpolation unit 34 obtains the W-component value Wout of the pixel P22 using the five pixels P04, P13, P22, P31, and P40 through the processing described below.

$$Wout=(W13+W31)/2-(G04-2\times G22+G40)\times gain60$$

The term (G04−2×G22+G40) is a Laplacian component value, and gain60 is a gain for adjusting the Laplacian component value.

Bout:

The interpolation unit 34 obtains the B-component value Bout of the pixel P22 through the processing described below.

The interpolation unit 34 obtains the G-component value s0 of the pixel P11, the G-component value s of the pixel P22, and the G-component value s1 of the pixel P33 as shown in FIG. 43A through the processing corresponding to the formulae below.

$$s0=(G02+G20)/2$$

$$s=G22$$

$$s1=(G24+G42)/2$$

The interpolation unit 34 calculates the B-component q0 of the midpoint between the pixels P11 and P22 and the B-component q1 of the midpoint between the pixels P22 and P33 as shown in FIG. 43A through the processing corresponding to the formulae below.

$$q0=(3\times B12+B30)/4$$

$$q1=(B14+3\times B32)/4$$

The interpolation unit 34 obtains the B-component value Bout of the pixel P22 through the processing corresponding to the formula below.

$$Bout=(q0+q1)/2-(s0-2\times s+s1)\times gain61$$

The term (s0−2×s+s1) is a Laplacian component value, and gain61 is a gain for adjusting the Laplacian component value.

The interpolation unit 34 may obtain the B-component value Bout of the pixel P22 through the processing described below.

The interpolation unit 34 calculates the W−G component value (R+B component value) s0 of the midpoint between the pixels P11 and P22, the W−G component value s of the pixel 22, and the W−G component value (R+B component value) s1 of the midpoint between the pixels P22 and P33 as shown in FIG. 43B through the processing corresponding to the formulae below.

$$s0=Bgain\times B12+Rgain\times R21$$

$$s=Wgain\times(W13+W31)/2-Ggain\times G22$$

$$s1=Rgain\times R23+Bgain\times B32$$

The interpolation unit 34 calculates the B-component value q0 of the midpoint between the pixels P11 and P22 and the B-component value q1 of the midpoint between the pixels P22 and P33 as shown in FIG. 43B through the processing (internal division processing) corresponding to the formulae below.

$$q0=(3\times B12+B30)/4$$

$$q1=(B14+3\times B32)/4$$

The interpolation unit 34 obtains the B-component value Bout of the pixel P22 through the processing corresponding to the formula below.

$$Bout=(q0+q1)/2-(s0-2\times s+s1)\times gain61B$$

The term (s0−2×s+s1) is a Laplacian component value, and gain61B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

Figure 44A:
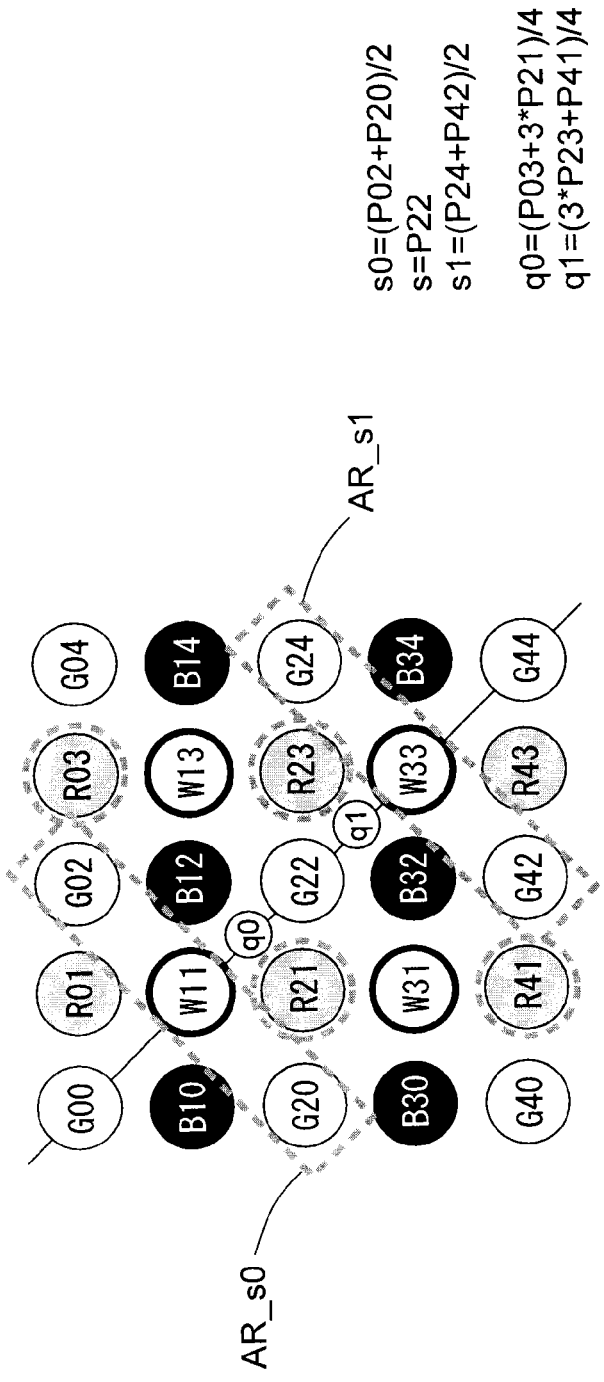
FIG. 44A is a diagram describing pixel interpolation in the second diagonal direction (for a color image area) for an image area including a G-pixel in the center.

Rout:

The interpolation unit 34 obtains the G-component value s0 of the pixel P11, the G-component value s of the pixel P22, and the G-component value s1 of the pixel P33 as shown in FIG. 44A through the processing corresponding to the formulae below.

$$s0=(G02+G20)/2$$

$$s=G22$$

$$s1=(G24+G42)/2$$

The interpolation unit 34 calculates the R-component q0 of the midpoint between the pixels P11 and P22 and the R-component q1 of the midpoint between the pixels P22 and P33 as shown in FIG. 44A through the processing corresponding to the formulae below.

$$q0=(R03+3\times R21)/4$$

$$q1=(3\times R23+R41)/4$$

The interpolation unit 34 obtains the R-component value Rout of the pixel P22 through the processing corresponding to the formula below.

$$Rout=(q0+q1)/2-(s0-2\times s+s1)\times gain62$$

The term (s0−2×s+s1) is a Laplacian component value, and gain62 is a gain for adjusting the Laplacian component value.

The interpolation unit 34 may obtain the R-component value Rout of the pixel P22 through the processing described below.

Figure 44B:
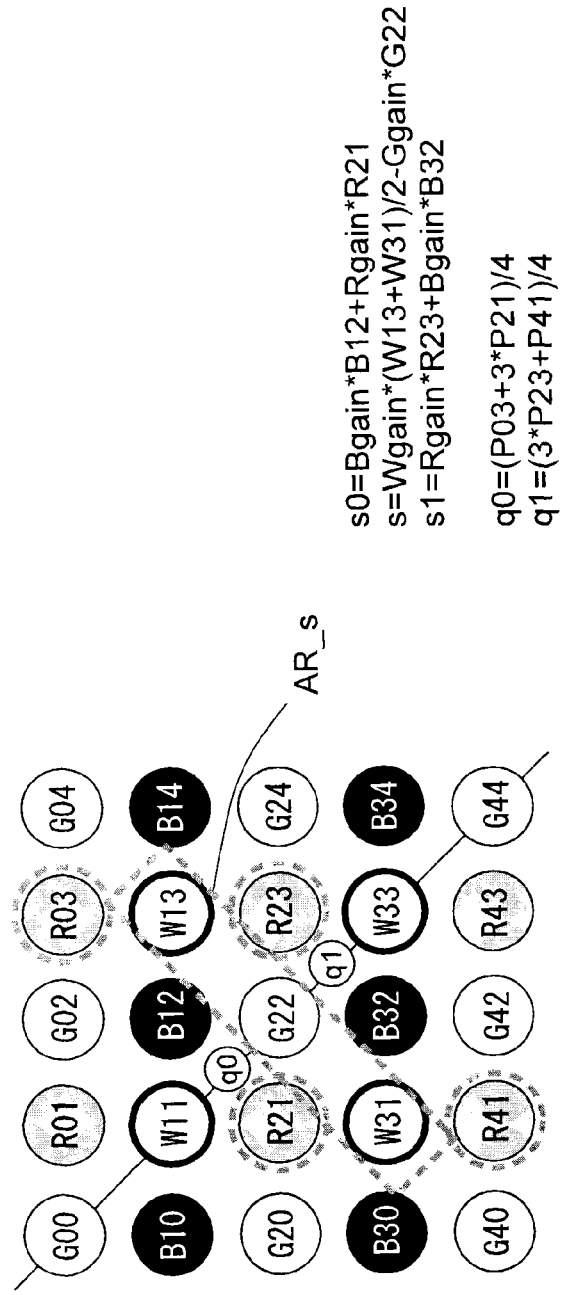
FIG. 44B is a diagram describing pixel interpolation in the second diagonal direction (for a color image area) for an image area including a G-pixel in the center.

The interpolation unit 34 calculates the W−G component value (R+B component value) s0 of the midpoint between the pixels P11 and P22, the W−G component value s of the pixel 22, and the W−G component value (R+B component value) s1 of the midpoint between the pixels P22 and P33 as shown in FIG. 44B through the processing corresponding to the formulae below.

$$s0 = Bgain \times B12 + Rgain \times R21$$

$$s = Wgain \times (W13+W31)/2 - Ggain \times G22$$

$$s1 = Rgain \times R23 + Bgain \times B32$$

The interpolation unit 34 calculates the R-component value q0 of the midpoint between the pixels P11 and P22 and the R-component value q1 of the midpoint between the pixels P22 and P33 as shown in FIG. 44B through the processing (internal division processing) corresponding to the formulae below.

$$q0 = (R03 + 3 \times R21)/4$$

$$q1 = (3 \times R23 + R41)/4$$

The interpolation unit 34 obtains the R-color component Rout of the pixel P22 through the processing corresponding to the formulae below.

$$Rout = (q0+q1)/2 - (s0-2 \times s+s1) \times gain62B$$

The term (s0−2×s+s1) is a Laplacian component value, and gain62B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

D2-R: When the Target Pixel is R-Pixel

When the target pixel is an R-pixel, the interpolation unit 34 obtains the values Wout, Rout, Gout, and Bout through the processing described below.

Rout:

The interpolation unit 34 sets the pixel value Rout of the R-component as the pixel value P22 of the target pixel. In other words, the interpolation unit 34 sets the value as Rout=P22.

Bout:

The interpolation unit 34 performs the processing described below to obtain the pixel value Bout of the B-component.

The interpolation unit 34 obtains the B-component value Bout of the pixel P22 using the five pixels P04, P13, P22, P31, and P40 through the processing described below.

$$Bout = (B13+B31)/2 - (R04 - 2 \times R22 + R40) \times gain63$$

The term (R04−2×R22+R40) is a Laplacian component value, and gain63 is a gain for adjusting the Laplacian component value.

Wout:

The interpolation unit 34 obtains the W-component value Wout of the pixel P22 through the processing described below.

The interpolation unit 34 obtains the R-component value s0 of the pixel P11, the R-component value s of the pixel P22, and the R-component value s1 of the pixel P33 through the processing corresponding to the formulae below.

$$s0 = (R02+R20)/2$$

$$s = R22$$

$$s1 = (R24+R42)/2$$

The interpolation unit 34 obtains the W-component q0 of the midpoint between the pixels P11 and P22 and the W-component q1 of the midpoint between the pixels P22 and P33 through the processing (internal division processing) corresponding to the formulae below.

$$q0 = (3 \times W12 + W30)/4$$

$$q1 = (W14 + 3 \times W32)/4$$

The interpolation unit 34 obtains the W-component value Wout of the pixel P22 through the processing corresponding to the formula below.

$$Wout = (q0+q1)/2 - (s0 - 2 \times s + s1) \times gain64$$

The term (s0−2×s+s1) is a Laplacian component value, and gain64 is a gain for adjusting the Laplacian component value.

The interpolation unit 34 may obtain the W-color component Wout of the pixel P22 through the processing described below.

The interpolation unit 34 calculates the W−G component value s0 of the midpoint between the pixels P11 and P22, the W−G component value (R+B component value) s of the pixel P22, and the W−G component value s1 of the midpoint between the pixels P22 and P33 through the processing corresponding to the formulae below.

$$s0 = Wgain \times W12 - Ggain \times G21$$

$$s = Bgain \times (B13+B31)/2 + Rgain \times R22$$

$$s1 = -Ggain \times G23 + Wgain \times W32$$

The interpolation unit 34 calculates the W-component value q0 of the midpoint between the pixels P11 and P22 and the W-component value q1 of the midpoint between the pixels P22 and P33 through the processing (internal division processing) corresponding to the formulae below.

$$q0 = (3 \times W12 + W30)/4$$

$$q1 = (W14 + 3 \times W32)/4$$

The interpolation unit 34 obtains the W-component value Wout of the pixel P22 through the processing corresponding to the formulas below.

$$Wout = (q0+q1)/2 - (s0 - 2 \times s + s1) \times gain64B$$

The term (s0−2×s+s1) is a Laplacian component value, and gain64B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

Gout:

The interpolation unit 34 obtains the R-component value s0 of the pixel P11, the R-component value s of the pixel P22, and the R-component value s1 of the pixel P33 through the processing corresponding to the formulae below.

$$s0=(R02+R20)/2$$

$$s=R22$$

$$s0=(R24+R42)/2$$

The interpolation unit 34 obtains the G-component q0 of the midpoint between the pixels P11 and P22 and the G-component q1 of the midpoint between the pixels P22 and P33 through the processing corresponding to the formulae below.

$$q0=(G03+3\times G21)/4$$

$$q1=(3\times G23+G41)/4$$

The interpolation unit 34 obtains the G-component value Gout of the pixel P22 through the processing corresponding to the formula below.

$$\text{Gout}=(q0+q1)/2-(s0-2\times s+s1)\times \text{gain}65$$

The term (s0−2×s+s1) is a Laplacian component value, and gain65 is a gain for adjusting the Laplacian component value.

The interpolation unit 34 may obtain the G-component value Gout of the pixel P22 through the processing described below.

The interpolation unit 34 calculates the W−G component value s0 of the midpoint between the pixels P11 and P22, the W−G component value (R+B component value) s of the pixel P22, and the W−G component value s1 of the midpoint between the pixels P22 and P33 through the processing corresponding to the formulae below.

$$s0=W\text{gain}\times W12-G\text{gain}\times G21$$

$$s=B\text{gain}\times (B13+B31)/2+R\text{gain}\times R22$$

$$s1=-G\text{gain}\times G23+W\text{gain}\times W32$$

The interpolation unit 34 calculates the G-component value q0 of the midpoint between the pixels P11 and P22 and the G-component value q1 of the midpoint between the pixels P22 and P33 through the processing corresponding to the formulae below.

$$q0=(G03+3\times G21)/4$$

$$q1=(3\times G23+G41)/4$$

The interpolation unit 34 obtains the G-component value Gout of the pixel P22 through the processing corresponding to the formula below.

$$\text{Gout}=(q0+q1)/2-(s0-2\times s+s1)\times \text{gain}65B$$

The term (s0−2×s+s1) is a Laplacian component value, and gain65B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

D2-B: When the Target Pixel is B-Pixel

When the target pixel is a B-pixel, the interpolation unit 34 obtains the values Wout, Rout, Gout, and Bout through the processing described below.

Bout:

The interpolation unit 34 sets the pixel value Bout of the B-component as the pixel value P22 of the target pixel. In other words, the interpolation unit 34 sets the value as Bout=P22.

Rout:

The interpolation unit 34 performs the processing described below to obtain the R-component pixel value Rout.

The interpolation unit 34 obtains the R-component value Rout of the pixel P22 using the five pixels P04, P13, P22, P31, and P40 through the processing described below.

$$\text{Rout}=(R13+R31)/2-(B04-2\times B22+B40)\times \text{gain}66$$

The term (B04−2×B22+B40) is a Laplacian component value, and gain66 is a gain for adjusting the Laplacian component value.

Gout:

The interpolation unit 34 obtains the G-component value Gout of the pixel P22 through the processing described below.

The interpolation unit 34 obtains the B-component value s0 of the pixel P11, the B-component value s of the pixel P22, and the B-component value s1 of the pixel P33 through the processing corresponding to the formulae below.

$$s0=(B02+B20)/2$$

$$s=B22$$

$$s1=(B24+B42)/2$$

The interpolation unit 34 obtains the G-component q0 of the midpoint between the pixels P11 and P22 and the G-component q1 of the midpoint between the pixels P22 and P33 through the processing (internal division processing) corresponding to the formulae below.

$q0=(3\times G12+G30)/4$ $q1=(G14+3\times G32)/4$

The interpolation unit 34 obtains the G-component value Gout of the pixel P22 through the processing corresponding to the formula below.

Gout=$(q0+q1)/2-(s0-2\times s+s1)\times$gain67

The term $(s0-2\times s+s1)$ is a Laplacian component value, and gain67 is a gain for adjusting the Laplacian component value.

The interpolation unit 34 may obtain the G-component value Gout of the pixel P22 through the processing described below.

The interpolation unit 34 calculates the W–G component value s0 of the midpoint between the pixels P11 and P22, the W–G component value (R+B component value) s of the pixel P22, and the W–G component value s1 of the midpoint between the pixels P22 and P33 through the processing corresponding to the formulae below.

$s0=-G$gain$\times G12+W$gain$\times W21$ $s=R$gain$\times(R13+R31)/2+B$gain$\times B22$ $s1=W$gain$\times W23-G$gain$\times G32$ The interpolation unit 34 calculates the G-component value q0 of the midpoint between the pixels P11 and P22 and the G-component value q1 of the midpoint between the pixels P22 and P33 through the processing (internal division processing) corresponding to the formulae below.

$q0=(3\times G12+G30)/4$ $q1=(G14+3\times G32)/4$

The interpolation unit 34 obtains the G-component value Gout of pixel P22 through the processing corresponding to the formula below.

Gout=$(q0+q1)/2-(s0-2\times s+s1)\times$gain67B

The term $(s0-2\times s+s1)$ is a Laplacian component value, and gain67B is a gain for adjusting the Laplacian component value.

In the above processing, the interpolation unit 34 calculates the Laplacian component value by using the W–G component value s0 of the midpoint between the pixels P11 and P22, the W–G component value s of the pixel P22, and the W–G component value s1 of the midpoint between the pixels P22 and P33. More specifically, the interpolation unit 34 obtains the W–G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W–G component value) in the direction orthogonal to the second diagonal direction. This further improves the accuracy of the pixel interpolation processing performed by the interpolation unit 34.

Wout:

The interpolation unit 34 obtains the B-component value s0 of the pixel P11, the B-component value s of the pixel P22, and the B-component value s1 of the pixel P33 through the processing corresponding to the formulae below.

$s0=(B02+B20)/2$ $s=B22$ $s1=(B24+B42)/2$

The interpolation unit 34 obtains the W-component q0 of the midpoint between the pixels P11 and P22 and the W-component q1 of the midpoint between the pixels P22 and P33 through the processing corresponding to the formulae below.

$q0=(W03+3\times W21)/4$ $q1=(3\times W23+W41)/4$

The interpolation unit 34 obtains the W-component value Wout of the pixel P22 through the processing corresponding to the formulae below.

Wout=$(q0+q1)/2-(s0-2\times s+s1)\times$gain68

The term $(s0-2\times s+s1)$ is a Laplacian component value, and gain68 is a gain for adjusting the Laplacian component value.

The interpolation unit 34 may obtain the W-color component Wout of the pixel P22 through the processing described below.

The interpolation unit 34 calculates the W–G component value s0 of the midpoint between the pixels P11 and P22, the W–G component value (R+B component value) s of the pixel P22, and the W–G component value s1 of the midpoint between the pixels P22 and P33 through the processing corresponding to the formulae below.

$s0=-G$gain$\times G12+W$gain$\times W21$ $s=R$gain$\times(R13+R31)/2+B$gain$\times B22$ $s1=W$gain$\times W23-G$gain$\times G32$ The interpolation unit 34 calculates the W-component value q0 of the midpoint between the pixels P11 and P22 and the W-component value q1 of the midpoint between the pixels P22 and P33 through the processing corresponding to the formulae below.

$q0=(W03+3\times W21)/4$ $q1=(3\times W23+W41)/4$

The interpolation unit 34 obtains the W-component value Wout of the pixel P22 through the processing corresponding to the formulas below.

Wout=$(q0+q1)/2-(s0-2\times s+s1)\times$gain68B

The term $(s0-2\times s+s1)$ is a Laplacian component value, and gain68B is a gain for adjusting the Laplacian component value.

In the above processing, the interpolation unit 34 calculates the Laplacian component value by using the W–G component value s0 of the midpoint between the pixels P11 and P22, the W–G component value s of the pixel P22, and the W–G component value s1 of the midpoint between the pixels P22 and P33. More specifically, the interpolation unit 34 obtains the W–G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W–G component value) in the direction orthogonal to the second diagonal direction. This further improves the accuracy of the pixel interpolation processing performed by the interpolation unit 34.

D2-W: When the Target Pixel is W-Pixel

When the target pixel is a W-pixel, the interpolation unit 34 obtains the values Wout, Rout, Gout, and Bout through the processing described below.

Wout:

The interpolation unit 34 sets the pixel value Wout of the W-component as the pixel value P22 of the target pixel. In other words, the interpolation unit 34 sets the value as Wout=P22.

Gout:

The interpolation unit 34 performs the processing described below to obtain the pixel value Gout of the G-component.

The interpolation unit 34 obtains the G-component value Gout of the pixel P22 using the pixels P04, P13, P22, P31, and P40 through the processing described below.

$$Gout=(G13+G31)/2-(W04-2\times W22+W40)\times gain69$$

The term (W04−2×W22+W40) is a Laplacian component value, and gain69 is a gain for adjusting the Laplacian component value.

Rout:

The interpolation unit 34 obtains the R-component value Rout of the pixel P22 through the processing described below.

The interpolation unit 34 obtains the W-component value s0 of the pixel P11, the W-component value s of the pixel P22, and the W-component value s1 of the pixel P33 through the processing corresponding to the formulae below.

$$s0=(W02+W20)/2$$

$$s=W22$$

$$s1=(W24+W42)/2$$

The interpolation unit 34 obtains the R-component q0 of the midpoint between the pixels P11 and P22 and the R-component q1 of the midpoint between the pixels P22 and P33 through the processing (internal division processing) corresponding to the formulae below.

$$q0=(3\times R12+R30)/4$$

$$q1=(R14+3\times R32)/4$$

The interpolation unit 34 obtains the R-component value Rout of the pixel P22 through the processing corresponding to the formula below.

$$Rout=(q0+q1)/2-(s0-2\times s+s1)\times gain70$$

The term (s0−2×s+s1) is a Laplacian component value, and gain70 is a gain for adjusting the Laplacian component value.

The interpolation unit 34 may obtain the R-component value Rout of the pixel P22 through the processing described below.

The interpolation unit 34 calculates the W−G component value (R+B component value) s0 of the midpoint between the pixels P11 and P22, the W−G component value s of the pixel 22, and the W−G component value (R+B component value) s1 of the midpoint between the pixels P22 and P33 through the processing corresponding to the formulae below.

$$s0=Rgain\times R12+Bgain\times B21$$

$$s=-Ggain\times (G13+G31)/2+Wgain\times W22$$

$$s1=Bgain\times B23+Rgain\times R32$$

The interpolation unit 34 calculates the R-component value q0 of the midpoint between the pixels P11 and P22 and the R-component value q1 of the midpoint between the pixels P22 and P33 through the processing (internal division processing) corresponding to the formulae below.

$$q0=(3\times R12+R30)/4$$

$$q1=(R14+3\times R32)/4$$

The interpolation unit 34 obtains the R-color component Rout of the pixel P22 through the processing corresponding to the formulae below.

$$Rout=(q0+q1)/2-(s0-2\times s+s1)\times gain70B$$

The term (s0−2×s+s1) is a Laplacian component value, and gain70B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

Bout:

The interpolation unit 34 obtains the W-component value s0 of the pixel P11, the W-component value s of the pixel P22, and the W-component value s1 of the pixel P33 through the processing corresponding to the formulae below.

$$s0=(W02+W20)/2$$

$$s=W22$$

$$s1=(W24+W42)/2$$

The interpolation unit 34 obtains the B-component q0 of the midpoint between the pixels P11 and P22 and the B-component q1 of the midpoint between the pixels P22 and P33 through the processing corresponding to the formulae below.

$$q0=(B03+3\times B21)/4$$

$$q1=(3\times B23+B41)/4$$

The interpolation unit 34 obtains the B-component value Bout of the pixel P22 through the processing corresponding to the formulae below.

$$Bout=(q0+q1)/2-(s0-2\times s+s1)\times gain71$$

The term (s0−2×s+s1) is a Laplacian component value, and gain71 is a gain for adjusting the Laplacian component value.

The interpolation unit 34 may obtain the B-component value Bout of the pixel P22 through the processing described below.

The interpolation unit 34 calculates the W−G component value (R+B component value) s0 of the midpoint between the pixels P11 and P22, the W−G component value s of the pixel 22, and the W−G component value (R+B component value)

s1 of the midpoint between the pixels P22 and P33 through the processing corresponding to the formulae below.

$$s0 = Rgain \times R12 + Bgain \times B21$$

$$s = -Ggain \times (G13+G31)/2 + Wgain \times W22$$

$$s1 = Bgain \times B23 + Rgain \times R32$$

The interpolation unit 34 calculates the B-component value q0 of the midpoint between the pixels P11 and P22 and the B-component value q1 of the midpoint between the pixels P22 and P33 through the processing corresponding to the formulae below.

$$q0 = (B03 + 3 \times B21)/4$$

$$q1 = (3 \times B23 + B41)/4$$

The interpolation unit 34 obtains the B-component value Bout of the pixel P22 through the processing corresponding to the formula below.

$$Bout = (q0+q1)/2 - (s0 - 2 \times s + s1) \times gain71B$$

The term (s0−2×s+s1) is a Laplacian component value, and gain71B is a gain for adjusting the Laplacian component value.

In the above processing, the interpolation unit 34 calculates the Laplacian component value by using the W−G component value s0 of the midpoint between the pixels P11 and P22, the W−G component value s of the pixel P22, and the W−G component value s1 of the midpoint between the pixels P22 and P33. More specifically, the interpolation unit 34 obtains the W−G component value (=the R+B component value) by performing color space conversion at the midpoint between the pixels P11 and P22, at the pixel P22, and at the midpoint between the pixels P22 and P33 through the above processing. The interpolation unit 34 performs pixel interpolation processing (processing for obtaining the value Gout by interpolation) by using the Laplacian component value representing a change ratio in units of ½ pixels (a change ratio of the W−G component value) in the direction orthogonal to the second diagonal direction. This further improves the accuracy of the pixel interpolation processing performed by the interpolation unit 34.

Median Interpolation (Color Image Area)

When the pixel interpolation method for the target pixel determined by the pixel interpolation method determination unit 33 is the pixel interpolation method for a color image area and the target pixel is determined by the pixel interpolation method determination unit 33 to have correlation in none of the directions, the interpolation unit 34 performs the pixel interpolation processing for the target pixel through the processing corresponding to the formula below. After the pixel interpolation processing, the target pixel will have the pixel value Wout for its W-component, the pixel value Rout for its R-component, the pixel value Gout for its G-component, and the pixel value Bout for its B-component.

M-G: When the Target Pixel is G-Pixel

When the target pixel (central pixel) is a G-pixel, the interpolation unit 34 obtains the values Bout, Rout, Gout, and Wout through the processing corresponding to the formulae below.

$$Bout = medium(B12, B32, (B10+B30+B12+B32)/4, (B12+B32+B14+B34)/4)$$

$$Rout = medium(R21, R23, (R01+R03+R21+R23)/4, (R21+R23+R41+R43)/4)$$

$$Gout = G22$$

$$Wout = medium(W11, W13, W31, W33)$$

In these formulae, medium( ) is a function that returns a median value. The function medium( ) returns the average of the two values in the middle in numerical order when the number of elements is an even number.

M-R: When the Target Pixel is R-Pixel

When the target pixel (central pixel) is an R-pixel, the interpolation unit 34 obtains the values Bout, Rout, Gout, and Wout through the processing corresponding to the formulae below.

$$Wout = medium(W12, W32, (W10+W30+W12+W32)/4, (W12+W32+W14+W34)/4)$$

$$Gout = medium(G21, G23, (G01+G03+G21+G23)/4, (G21+G23+G41+G43)/4)$$

$$Gout = R22$$

$$Bout = medium(B11, B13, B31, B33)$$

M-B: When the Target Pixel is B-Pixel

When the target pixel (central pixel) is a B-pixel, the interpolation unit 34 obtains the values Bout, Rout, Gout, and Wout through the processing corresponding to the formulae below.

$$Gout = medium(G12, G32, (G10+G30+G12+G32)/4, (G12+G32+G14+G34)/4)$$

$$Wout = medium(W21, W23, (W01+W03+W21+W23)/4, (W21+W23+W41+W43)/4)$$

$$Bout = B22$$

$$Rout = medium(R11, R13, R31, R33)$$

M-W: When the Target Pixel is W-Pixel

When the target pixel (central pixel) is a W-pixel, the interpolation unit 34 obtains the values Bout, Rout, Gout, and Wout through the processing corresponding to the formulae below.

$$Rout = medium(R12, R32, (R10+R30+R12+R32)/4, (R12+R32+R14+R34)/4)$$

$$Bout = medium(B21, B23, (B01+B03+B21+B23)/4, (B21+B23+B41+B43)/4)$$

$$Wout = W22$$

$$Gout = medium(G11, G13, G31, G33)$$

Average Interpolation (Color Image Area)

When the pixel interpolation method for the target pixel determined by the pixel interpolation method determination unit 33 is the pixel interpolation method intended for a color image area and the target pixel is determined by the pixel interpolation method determination unit 33 to have high correlation in both of the vertical and horizontal directions, the interpolation unit 34 performs the pixel interpolation processing for the target pixel through the processing corresponding to the formulae below. After the pixel interpolation processing, the target pixel will have the pixel value Wout for its W-component, the pixel value Rout for its R-component, the pixel value Gout for its G-component, and the pixel value Bout for its B-component.

Ave-G: When the Target Pixel is G-Pixel

When the target pixel (central pixel) is a G-pixel, the interpolation unit 34 calculates the values Bout, Rout, Gout, and Wout through the processing corresponding to the formulae below.

$$Bout=(B12+B32)/2$$

$$Rout=(R21+R23)/2$$

$$Gout=G22$$

$$Wout=(W11+W13+W31+W33)/4$$

Ave-R: When the Target Pixel is R-Pixel

When the target pixel (central pixel) is an R-pixel, the interpolation unit 34 calculates the values Bout, Rout, Gout, and Wout through the processing corresponding to the formulae below.

$$Wout=(W12+W32)/2$$

$$Gout=(G21+G23)/2$$

$$Rout=R22$$

$$Bout=(B11+B13+B31+B33)/4$$

Ave-B: When the Target Pixel is B-Pixel

When the target pixel (central pixel) is a B-pixel, the interpolation unit 34 calculates the values Bout, Rout, Gout, and Wout through the processing corresponding to the formulae below.

$$Gout=(G12+G32)/2$$

$$Wout=(W21+W23)/2$$

$$Bout=B22$$

$$Rout=(R11+R13+R31+R33)/4$$

Ave-W: When the Target Pixel is W-Pixel

When the target pixel (central pixel) is a G-pixel, the interpolation unit 34 calculates the values Bout, Rout, Gout, and Wout through the processing corresponding to the formulae below.

$$Rout=(R12+R32)/2$$

$$Bout=(B21+B23)/2$$

$$Wout=W22$$

$$Gout=(G11+G13+G31+G33)/4$$

Through the above processing, the interpolation unit 34 obtains the values Rout, Gout, Bout, and Wout for each pixel. An image formed using the values Rout, Gout, Bout, and Wout (image signals having the four color component values for each pixel, or the W-component value, the R-component value, the G-component value, and the B-component value) is output from the interpolation unit 34 to the color space conversion unit 35 as an image D1.

The color space conversion unit 35 converts the image signals D1 in the WRGB color space, which are output from the interpolation unit 34, into image signals Dout in the YCbCr color space. The specific processing performed by the color space conversion unit 35 will now be described.

Figure 1B:
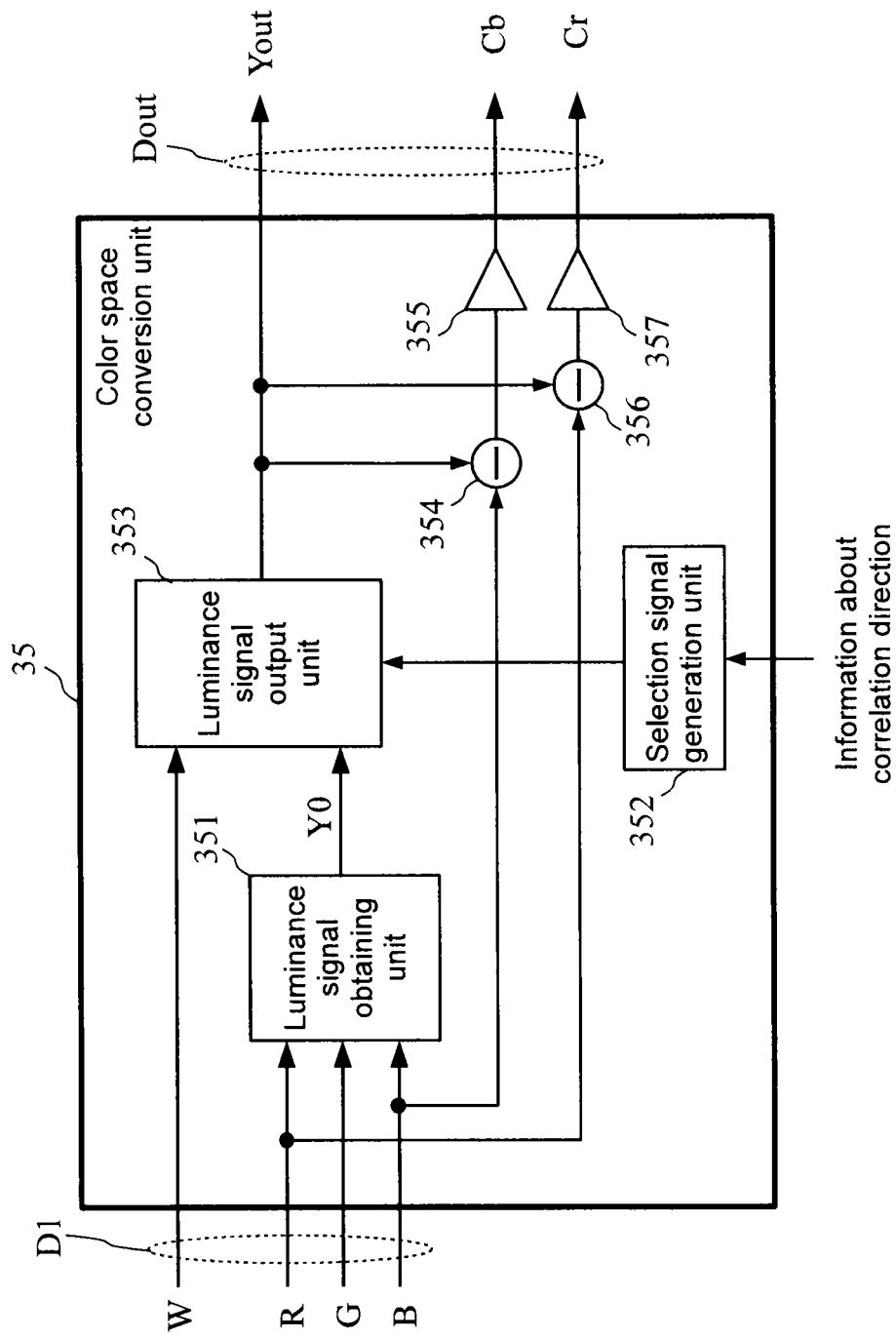
FIG. 1B is a schematic diagram of a color space conversion unit 35 according to the first embodiment.

As shown in FIG. 1B, the luminance signal obtaining unit 351 in the color space conversion unit 35 receives the R-component signal, the G-component signal, and the B-component signal output from the interpolation unit 34. The luminance signal obtaining unit 351 outputs the luminance signal Y0 through the processing corresponding to the formula below.

$$Yout=0.299 \times R+0.587 \times G+0.114 \times B$$

In this formula, R, G, and B are the R-component value, the G-component value, and the B-component value, respectively, for the target pixel.

The selection signal generation unit 352 generates a selection signal based on information about the correlation direction and the pixel interpolation method for each pixel output from the pixel interpolation method determination unit 33. More specifically, the selection signal is generated in the manner described below. Although not shown in FIG. 1A, information about the color component of the target pixel (processing target pixel) is input into the selection signal generation unit 352.

(1) For a G-pixel as the target pixel, the selection signal is generated to select a W-signal in the luminance signal output unit 353 when the correlation direction is the first diagonal direction or the second diagonal direction. When the correlation direction is other than the above direction, the selection signal is generated to select a Y0-signal in the luminance signal output unit 353.

(2) For an R-pixel as the target pixel, the selection signal is generated to select a W-signal in the luminance signal output unit 353 when the correlation direction is the vertical direction. When the correlation direction is other than the above direction, the selection signal is generated to select a Y0-signal in the luminance signal output unit 353.

(3) For a B-pixel as the target pixel, the selection signal is generated to select a W-signal in the luminance signal output unit 353 when the correlation direction is the horizontal direction. When the correlation direction is other than the above direction, the selection signal is generated to select a Y0-signal in the luminance signal output unit 353.

(4) For a W-pixel as the target pixel, the selection signal is generated to always select a W-signal in the luminance signal output unit 353.

(5) When no correlation is detected for the target pixel in any of the directions (when median interpolation is performed as the pixel interpolation processing), the selection signal is generated to select the average of the W-signal and the Y0-signal as the output from the luminance signal output unit 353.

The luminance signal output unit 353 generates a Yout-signal from the W-signal and the Y0-signal in accordance with the selection signal generated as described above, and outputs the generated signal.

(1) For a G-pixel as the target pixel, the luminance signal output unit 353 sets Yout as Yout=W when the correlation direction is the first diagonal direction or the second diagonal direction, and sets Yout as Yout=Y0 when the correlation direction is neither the first diagonal direction nor the second diagonal direction.

(2) For an R-pixel as the target pixel, the luminance signal output unit 353 sets Yout as Yout=W when the correlation direction is the vertical direction, and sets Yout as Yout=Y0 when the correlation direction is not the vertical direction.

(3) For a B-pixel as the target pixel, the luminance signal output unit 353 sets Yout as Yout=W when the correlation direction is the horizontal direction, and sets Yout as Yout=Y0 when the correlation direction is not the horizontal direction.

(4) For a W-pixel as the target pixel, the luminance signal output unit 353 always sets Yout as Yout=W.

(5) When no correlation is detected for the target pixel in any of the directions (when median interpolation is performed as the pixel interpolation processing), the luminance signal output unit 353 sets Yout as Yout=(W+Y0)/2.

As described above, the color space conversion unit 35 uses the W-component signal as the Y-component signal (Yout-signal) when the W-component value of the target pixel is obtained using the W-pixel. In any other cases, the color space conversion unit 35 uses the luminance signal Y0, which is obtained by conversion using the R-component value, the G-component value, and the B-component value, as the Y-component signal (Yout-signal). The color space conversion unit 35 can thus obtain a highly accurate luminance signal component (Y component signal).

The color space conversion unit 35 further obtains a Cb-component signal and a Cr-component signal from the Yout-signal, the R-component signal, and the B-component signal using the subtracters 354 and 356 and the gain adjustment units 355 and 357. In this manner, the highly accurate Yout-signal is used to obtain the Cb-component signal and the Cr-component signal. The Cb-component signal and the Cr-component signal are thus highly accurate.

As described above, the imaging apparatus 1000, using an image signal (Raw image) obtained by a single-chip image sensor with the WRGB array of color filters, calculates the degrees of correlation for a plurality of pairs in two directions orthogonal to each other using pixel data in an area around a target pixel, and performs pixel interpolation processing using the calculated degree of correlation as a criterion for determination in the pixel interpolation processing. The imaging apparatus 1000 selectively uses a luminance signal generated from an R-component signal, a G-component signal, and a B-component signal, and a luminance signal generated from a W-component signal to perform pixel interpolation processing with a higher accuracy and obtain a YCbCr signal with a higher accuracy.

The imaging apparatus 1000 calculates a color saturation evaluation value for an area around a target pixel, and selects a correlation determination method and a pixel interpolation method based on the color saturation evaluation value. The imaging apparatus 1000 performs the process for calculating a color saturation evaluation value optimum for the WRGB array to prevent erroneous determination of the correlation direction and erroneous interpolation. The imaging apparatus 1000 thus reduces false colors occurring in the pixel interpolation processing.

The imaging apparatus 1000 obtains a first change ratio in a direction having a high correlation using the pixel value of a second-color component pixel when a color component pixel with a color identical to the color of a color component pixel subjected to pixel interpolation and a second-color component pixel are located in a direction having a high correlation, and obtains a first-color component pixel value of the target pixel based on a first-color component pixel located in the direction having the high correlation and the obtained first change ratio, thereby performing pixel interpolation processing on the target pixel. More specifically, the imaging apparatus 1000 performs pixel interpolation processing in a manner to reflect the ratio of change of the correlation direction (direction having a high correlation) calculated by using a color component pixel different from the color component pixel subjected to pixel interpolation. Thus, the imaging apparatus 1000 performs pixel interpolation processing with higher accuracy than when pixel interpolation processing is performed by using the average of the color component pixel values of the same color in the correlation direction (direction having a high correlation).

When the color component pixel with the same color as the color component pixel subjected to pixel interpolation is not located in the direction having the high correlation, the imaging apparatus 1000 obtains a second change ratio in a direction orthogonal to the direction having the high correlation using a pixel value resulting from color space conversion in the direction orthogonal to the direction having the high correlation, and performs pixel interpolation processing on the target pixel based on the second change ratio. More specifically, the imaging apparatus 1000 obtains a second change ratio in a direction orthogonal to the direction having the high correlation by performing color space conversion. The pixel interpolation apparatus performs pixel interpolation processing using the obtained second change ratio, and thus performs pixel interpolation processing with high accuracy even when the color component pixel with the color identical to the color of the color component pixel subjected to pixel interpolation is not located in the direction having the high correlation.

As described above, the imaging apparatus 1000 allows appropriate pixel interpolation processing on an image signal obtained by a single-chip image sensor having four color filters, such as the WRGB array of color filters.

Other Embodiments

Although the above embodiment describes the pixel interpolation processing that may use calculations with real numbers, the pixel interpolation processing may use calculations with integers. The pixel interpolation processing may include gain adjustment or clipping as needed when using limited predetermined numbers of bits or performing the processing within predetermined dynamic ranges.

Although the above embodiment describes a case in which the luminance signal output unit 353 that generates a luminance signal Yout in accordance with a selection signal, the embodiment should not be limited to this case (this structure). For example, the luminance signal output unit 353 may receive an input of a control signal, and may always set Yout as Yout=(Y0+W)/2 in accordance with the control signal for an image containing much noise.

In accordance with the control signal, the luminance signal output unit 353 may always output a W-signal. The luminance signal output unit 353 may always output a Y0-signal in accordance with the control signal.

Although the above embodiment describes the use of the WRGB color filter array 11 having an array pattern in which green filters and red filters are arranged alternately in the order of G, R, G, R, . . . in one row and blue filters and white filters (no filters) are arranged alternately in the order of B, W, B, W, . . . in the next row as shown in FIG. 2, the embodiment should not be limited to this structure. For example, the WRGB color filter array 11 may have any of the array patterns described below.

(1) The filters are arranged in the order of G, B, G, B, . . . in one row, and R, W, R, W, . . . in the next row.

(2) The filters are arranged in the order of G, R, G, R, . . . in one row, and W, B, W, B, . . . in the next row.

(3) The filters are arranged in the order of G, B, G, B, . . . in one row, and W, R, W, R, . . . in the next row.

(4) The filters are arranged in the order of G, W, G, W, . . . in one row, and B, R, B, R, . . . in the next row.

(5) The filters are arranged in the order of G, W, G, W, . . . in one row, and R, B, R, B, . . . in the next row.

The pixel interpolation processing described in the above embodiment is applicable to the above array patterns of the WRGB color filter array 11. The pixel interpolation apparatus of the present invention can perform the same pixel interpolation processing as described in the above embodiment not only for the array pattern of the WRGB color filter array 11 shown in FIG. 2 but also for the other patterns of color filters.

Although the above embodiment describes the pixel interpolation processing performed for the WRGB array, the embodiment should not be limited to this case. For example, the present invention is also applicable to the array of W, M, Ye, and Cy filters. The above embodiment describes the case in which the imaging apparatus 1000 in the above embodiment obtains a second change ratio in a direction orthogonal to the direction having the high correlation using a pixel value resulting from color space conversion when the color component pixel with the color identical to the color of the color component pixel subjected to pixel interpolation is not located in the direction having the high correlation. In the above embodiment, the imaging apparatus obtains the color component pixel value of the same hue, such as the W–R component pixel value, the W–G component pixel value, or the W–B component pixel value by performing color space conversion, and performs pixel interpolation processing on a target pixel based on the change ratio (Laplacian component value) of the obtained color component pixel value. This can be applied to the W, M, Ye, and Cy array. In this case, the color component pixel with the same hue is obtained in the same manner as for the WRGB array. The apparatus performs pixel interpolation processing on the target pixel based on the change ratio of the color component pixel value (Laplacian component value). For the W, M, Ye, and Cy array, pixel interpolation processing may be performed by using the change ratio of the color component pixel value with the same hue for the W–Ye component value, the W–M component value, and the W–Cy component value.

The present invention is also applicable to the color filters in an array different from the above example. For the color filters of any array, color space conversion is performed at a position near the target pixel based on the correlation direction to obtain the color component pixel value with the same hue. Pixel interpolation processing is then performed based on the change ratio of the obtained color component pixel value with the same hue.

All or part of the imaging apparatus according to the above embodiment may be an integrated circuit (e.g., an LSI (large scale integrated) circuit or a system LSI).

All or part of the processes performed by the functional blocks described in the above embodiment may be implemented using programs. All or part of the processes performed by the functional blocks described in the above embodiment may be implemented by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware. When the imaging apparatus of the above embodiment is implemented by hardware, the apparatus needs timing adjustment for its processes. For ease of explanation, the timing adjustment associated with various signals used in an actual hardware design is not described in detail in the above embodiment.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray Disc (BD), or a semiconductor memory.

The computer program may not be recorded on the recording medium but may be transmitted with an electric communication line, a wireless or wired communication line, or a network such as the Internet.

The specific structures of the present invention should not be limited to the above embodiment, and may be changed and modified variously without departing from the scope and the spirit of the invention.

REFERENCE SIGNS LIST 1000 imaging apparatus
1 imaging unit
2 signal processing unit
3 pixel interpolation processing unit (pixel interpolation apparatus)
31 color saturation evaluation value calculation unit (color saturation evaluation value obtaining unit)
32 correlation value calculation unit (correlation obtaining unit)
33 pixel interpolation method determination unit
34 interpolation unit
35 color space conversion unit

What is claimed is:

1. A pixel interpolation apparatus that performs pixel interpolation processing on an image obtained by an imaging unit, the imaging unit having color filters of four different colors arranged in a predetermined pattern, the apparatus comprising:
   a color saturation evaluation value obtaining unit configured to evaluate a color saturation of a predetermined image area of the image and obtain a color saturation evaluation value of the image area;
   a correlation degree obtaining unit configured to obtain degrees of correlation for a plurality of pairs in two directions orthogonal to each other in the image using pixel data for an area around a target pixel;
   a pixel interpolation method determination unit configured to determine a pixel interpolation method for the target pixel based on the color saturation evaluation value obtained by the color saturation evaluation value obtaining unit and the degree of correlation obtained by the correlation degree obtaining unit; and
   an interpolation unit configured to perform pixel interpolation processing on the image with the pixel interpolation method determined by the pixel interpolation method determination unit, and obtain image data in a predetermined color space,
   wherein, in a case where a direction having a high correlation has been detected based on the degree of correlation, the interpolation unit
      (1) obtains, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtains a pixel value of a first-color component pixel of the target pixel based on a first-color component pixel located in the direction having the high correlation and the obtained first change ratio and performs pixel interpolation processing on the target pixel, and (2) obtains, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and perform pixel interpolation processing on the target pixel based on the obtained second change ratio.

2. The pixel interpolation apparatus according to claim 1, wherein
the correlation degree obtaining unit obtains a degree of correlation in a horizontal direction, a degree of correlation in a vertical direction, a degree of correlation in a first diagonal direction, and a degree of correlation in a second diagonal direction orthogonal to the first diagonal direction in the image.

3. The pixel interpolation apparatus according to claim 1, wherein
the color saturation evaluation value obtaining unit evaluates color saturation of an image area of 5×5 pixels including a central target pixel, and obtains a color saturation evaluation value for the image area, and
the correlation degree obtaining unit obtains the degree of correlation in the image area of 5×5 pixels including the central target pixel.

4. The pixel interpolation apparatus according to claim 1, wherein when a color component pixel with a color identical to a color of a color component pixel subjected to pixel interpolation is not located in the direction having the high correlation, the interpolation unit obtains a color component pixel value having an identical hue by performing color space conversion in a direction orthogonal to the direction having the high correlation, obtains a change ratio of the obtained color component pixel value in the direction orthogonal to the direction having the high correlation as the second change ratio, and performs pixel interpolation processing on the target pixel based on the obtained second change ratio.

5. The pixel interpolation apparatus according to claim 4, wherein
the interpolation unit calculates the second change ratio of the color component pixel value having the identical hue obtained by performing color space conversion based on a Laplacian component value of the color component pixel value.

6. The pixel interpolation apparatus according to claim 5, wherein
when a color component pixel with a color identical to a color of a first color component pixel subjected to pixel interpolation is not located in the direction having the high correlation, the interpolation unit obtains a first color component value Pout of the target pixel by using the formula below:

$$Pout = (P1+P2)/2 - Lap \times gain,$$

where, in the direction orthogonal to the correlation direction, pos1 is a position of the target pixel, pos0 and pos2 are positions across the target pixel, P1 is a first-color component pixel value at the position pos0, P2 is a first-color component pixel value at the position pos2, Lap is a Laplacian component value calculated from a pixel value of a color component pixel other than a first-color component pixel calculated from the positions pos0, pos1, and pos2, and gain is a gain for adjusting the Laplacian component value.

7. The pixel interpolation apparatus according to claim 1, wherein
the color filters are in a WRGB array,
when a color component pixel with a color identical to a color of a color component pixel subjected to pixel interpolation is not located in the direction having the high correlation, the interpolation unit performs color space conversion in a direction orthogonal to the direction having the high correlation to obtain a color component pixel value of one of a W–R component pixel value, a W–G component pixel value, and a W–B component pixel value, and obtains a change ratio of the obtained color component pixel value in the direction orthogonal to the direction having the high correlation as the second change ratio, and performs pixel interpolation processing on the target pixel based on the obtained second change ratio.

8. The pixel interpolation apparatus according to claim 7, wherein
the interpolation unit calculates the second change ratio of the color component pixel value of one of the W–R component pixel value, the W–G component pixel value, and the W–B component pixel value based on a Laplacian component value of the color component pixel value.

9. The pixel interpolation apparatus according to claim 1, wherein
the interpolation unit interpolates a pixel value with the first color component of the target pixel by subtracting a Laplacian component value calculated from pixel values of a plurality of pixels with the second color component arranged in a correlation direction having a high degree of correlation determined by the pixel interpolation method determination unit from an average of pixel values of two pixels with the first color component that are adjacent across the target pixel in the correlation direction.

10. The pixel interpolation apparatus according to claim 9, wherein
the interpolation unit interpolates the pixel value with the first color component of the target pixel by subjecting the Laplacian component value to gain adjustment, and subtracting the Laplacian component value that has undergone the gain adjustment from the average of the pixel values of the two pixels with the first color component that are adjacent across the target pixel.

11. An imaging apparatus, comprising:
an imaging unit having color filters of four different colors arranged in a predetermined pattern, the imaging unit being configured to obtain an image signal from subject light; and
the pixel interpolation apparatus according to claim 1 configured to perform pixel interpolation processing on the image signal.

12. A pixel interpolation processing method for performing pixel interpolation on an image obtained by an imaging unit, the imaging unit having color filters of four different colors arranged in a predetermined pattern,
the method comprising:
evaluating a color saturation of a predetermined image area of the image and obtaining a color saturation evaluation value of the image area;
obtaining degrees of correlation for a plurality of pairs in two directions orthogonal to each other in the image using pixel data for an area around a target pixel;

determining a pixel interpolation method for the target pixel based on the color saturation evaluation value obtained by the step of obtaining the color saturation evaluation value and the degree of correlation obtained by the step of obtaining the correlation degree; and performing pixel interpolation processing on the image with the pixel interpolation method determined by the step of determining the pixel interpolation method, and obtaining image data in a predetermined color space, wherein, in a case where a direction having a high correlation has been detected based on the degree of correlation, the step of performing pixel interpolation processing includes (1) obtaining, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtaining a pixel value of a first-color component pixel of the target pixel based on a first-color component pixel located in the direction having the high correlation and the obtained first change ratio and performing pixel interpolation processing on the target pixel, and (2) obtaining, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and performing pixel interpolation processing on the target pixel based on the obtained second change ratio.

13. An integrated circuit that performs pixel interpolation processing on an image obtained by an imaging unit, the imaging unit having color filters of four different colors arranged in a predetermined pattern, the integrated circuit comprising:

a color saturation evaluation value obtaining unit configured to evaluate a color saturation of a predetermined image area of the image and obtain a color saturation evaluation value of the image area;

a correlation degree obtaining unit configured to obtain degrees of correlation for a plurality of pairs in two directions orthogonal to each other in the image using pixel data for an area around a target pixel;

a pixel interpolation method determination unit configured to determine a pixel interpolation method for the target pixel based on the color saturation evaluation value obtained by the color saturation evaluation value obtaining unit and the degree of correlation obtained by the correlation degree obtaining unit; and an interpolation unit configured to perform pixel interpolation processing on the image with the pixel interpolation method determined by the pixel interpolation method determination unit, and obtain image data in a predetermined color space, wherein, in a case where a direction having a high correlation has been detected based on the degree of correlation, the interpolation unit (1) obtains, when a color component pixel with a color identical to a color of a first-color component pixel subjected to pixel interpolation and a second-color component pixel are located in the direction having the high correlation, a change ratio in the direction having the high correlation as a first change ratio by using a pixel value of the second-color component pixel, and obtains a pixel value of a first-color component pixel of the target pixel based on a first-color component pixel located in the direction having the high correlation and the obtained first change ratio and performs pixel interpolation processing on the target pixel, and (2) obtains, when a color component pixel with a color identical to a color of a color component pixel subjected to pixel interpolation is not located in the direction having the high correlation, a change ratio in a direction orthogonal to the direction having the high correlation as a second change ratio by using a pixel value resulting from color space conversion in the direction orthogonal to the direction having the high correlation and performs pixel interpolation processing on the target pixel based on the obtained second change ratio.

14. A non-transitory computer readable storage medium storing a program enabling a computer to implement the pixel interpolation processing method according to claim 12.

* * * * *